(12) United States Patent
Chen et al.

(10) Patent No.: US 12,299,550 B1
(45) Date of Patent: May 13, 2025

(54) MODEL DRIVEN CONFIGURATION OF SOFTWARE INSTALLATION OPERATING STATES

(71) Applicant: Splunk Inc., San Francisco, CA (US)

(72) Inventors: Yanpei Chen, Sunnyvale, CA (US); Archana Ganapathi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 17/589,577

(22) Filed: Jan. 31, 2022

Related U.S. Application Data

(60) Provisional application No. 63/143,545, filed on Jan. 29, 2021.

(51) Int. Cl.
*G06F 9/44* (2018.01)
*G06F 8/61* (2018.01)
*G06F 9/445* (2018.01)
*G06F 9/455* (2018.01)
*G06N 20/10* (2019.01)

(52) U.S. Cl.
CPC .............. *G06N 20/10* (2019.01); *G06F 8/61* (2013.01)

(58) Field of Classification Search
CPC .................................. G06N 20/10; G06F 8/61
See application file for complete search history.

(56) References Cited

U.S. PATENT DOCUMENTS

| | | | |
|---|---|---|---|
| 10,380,498 B1 * | 8/2019 | Chaoji | G06N 7/01 |
| 10,715,387 B1 * | 7/2020 | Tutuianu | H04L 41/5054 |
| 11,348,029 B1 * | 5/2022 | Turow | G06N 5/01 |
| 11,410,111 B1 * | 8/2022 | Washam | G06N 20/00 |
| 2015/0278407 A1 | 10/2015 | Vennelakanti et al. | |
| 2017/0308573 A1 | 10/2017 | Brisebois et al. | |
| 2018/0268293 A1 | 9/2018 | Noda | |
| 2019/0370684 A1 * | 12/2019 | Gunes | G06N 20/00 |
| 2020/0097810 A1 * | 3/2020 | Hetherington | G06N 20/20 |
| 2020/0302234 A1 | 9/2020 | Walters et al. | |
| 2021/0012244 A1 * | 1/2021 | Taniguchi | G06N 20/20 |

(Continued)

FOREIGN PATENT DOCUMENTS

WO  WO-2019182590 A1 * 9/2019 ........... G06K 9/6264

OTHER PUBLICATIONS

Faruk Pasic, Model-Driven Development of Condition Monitoring Software, 2018, pp. 1-6. https://dl.acm.org/doi/pdf/10.1145/3270112.3275338 (Year: 2018).*

(Continued)

*Primary Examiner* — Mongbao Nguyen
(74) *Attorney, Agent, or Firm* — Rutan & Tucker, LLP; Kyle M. St. James

(57) ABSTRACT

Product usage may be modeled based on large volume, machine generated product usage data to optimize product pricing and operations. Specifically, the systems and methods described herein may utilize methods with key components to select the maximum number of dimensions that can be modeled based on the number of data points, use a logarithm kernel function to normalize machine data with long-tailed statistical distributions on different numerical scales, compare a large number of candidate models with different candidate dimensions and different structures, and quantify the amount of change and drift in models over time.

20 Claims, 29 Drawing Sheets

(56) References Cited

U.S. PATENT DOCUMENTS

| | | | | |
|---|---|---|---|---|
| 2021/0241164 | A1* | 8/2021 | Powley | G06N 5/01 |
| 2022/0027778 | A1* | 1/2022 | Kochura | G06F 11/3447 |
| 2022/0083897 | A1* | 3/2022 | Saha | G06F 16/2477 |
| 2022/0114019 | A1* | 4/2022 | Sathe | G06F 9/5094 |
| 2022/0179769 | A1* | 6/2022 | Wan | G06F 9/3822 |
| 2022/0180178 | A1* | 6/2022 | Tasinga | G06F 9/5011 |
| 2022/0188241 | A1* | 6/2022 | Prasanna | G06F 18/00 |
| 2022/0206774 | A1* | 6/2022 | Arora | G06F 8/34 |
| 2022/0210028 | A1* | 6/2022 | Chen | H04L 41/0896 |

OTHER PUBLICATIONS

Caitlin A. Owen, Characterizing Genetic Programming Error Through Extended Bias and Variance Decomposition, 2020, pp. 1164-0075. https://ieeexplore.ieee.org/stamp/stamp.jsp?tp=&arnumber=9080104 (Year: 2018).*

Carlos A. Duchanoy, ASAMS: An Adaptive Sequential Sampling and Automatic Model Selection for Artificial Intelligence, 2020, pp. 1-25. https://www.mdpi.com/1424-8220/20/18/5332 (Year: 2020).*

Non Final Office Action received for U.S. Appl. No. 17/589,534 dated Jul. 21, 2023, 13 pages.

Final Office Action received for U.S. Appl. No. 17/589,534 dated Feb. 8, 2024, 16 pages.

Notice of Allowance received for U.S. Appl. No. 17/589,534 dated Jul. 10, 2024, 7 pages.

Advisory Action received for U.S. Appl. No. 17/589,534 dated May 8, 2024, 3 pages.

* cited by examiner

15. COHORTS OF SIMILAR CLOUD STACKS IN SCALE DIMENSIONS (SET E)

| COHORT | CLOUD STACKS | DAILY SEARCHES | NUMBER OF 3RD PARTY APPS INSTALLED | USER CREATED INDEXES |
|---|---|---|---|---|
| LARGEST STACKS | 277 | 169754.59 | 97.47 | 131.11 |
| LARGER STACKS | 635 | 32928.52 | 65.75 | 60.27 |
| MEDIUM STACKS | 440 | 21938.51 | 40.10 | 14.49 |
| SMALLER STACKS | 437 | 3668.01 | 34.83 | 16.15 |
| SMALLEST STACKS | 263 | 704.41 | 28.68 | 3.68 |

16. COHORTS OF SIMILAR CLOUD STACKS IN SCALE DIMENSIONS (SET F)

| COHORT ⇔ | CLOUD STACKS ⇔ | DAILY SEARCHES ⇔ | MONTHLY PAGE VIEWS ⇔ | USER CREATED INDEXES ⇔ |
|---|---|---|---|---|
| LARGEST STACKS | 305 | 12972.62 | 8477.17 | 128.48 |
| LARGER STACKS | 714 | 28173.52 | 1341.00 | 39.75 |
| MEDIUM STACKS | 345 | 1463.97 | 129.99 | 20.86 |
| SMALLER STACKS | 164 | 1850.60 | 9.94 | 6.22 |
| SMALLEST STACKS | 329 | 1772.74 | 340.74 | 7.69 |

COHORTS OF SIMILAR ACCOUNTS -- UP TO FY21 Q2

| DESCRIPTION OF COHORT | # OF CPUS | CUSTOMER AGE | HISTORICAL #CPUS | PRODUCTS BOUGHT |
|---|---|---|---|---|
| >898K # OF CPUS, MANY YEARS WITH XYZ COMPANY, ~898 HISTORICAL CPUS | 1,303.64 | 8.13 YEARS | 84.4 | 3.45 |
| ~898K # OF CPUS, ~2 YEARS WITH XYZ COMPANY, <27 HISTORICAL CPUS | 805.54 | 2.15 YEARS | 2.0 | 1.64 |
| <898K # OF CPUS, ~5 USE CASES, <180 HISTORICAL CPUS | 262.77 | 4.07 YEARS | 14.2 | 2.53 |
| <898K # OF CPUS, MANY YEARS WITH XYZ COMPANY, <90 HISTORICAL CPUS | 134.21 | 9.02 YEARS | 5.6 | 1.96 |
| <30K # OF CPUS, <2 USE CASES, <18 HISTORICAL CPUS | 30.69 | 5.73 YEARS | 1.3 | 1.35 |
| <9K # OF CPUS, <2 USE CASES, <9 HISTORICAL CPUS | 2.83 | 2.11 YEARS | .7 | 1.28 |

FIG. 14

COHORTS OF SIMILAR ACCOUNTS – UP TO FY21-Q2 (CONTINUED)

| DESCRIPTION OF COHORT | USE CASES BOUGHT | % SHARE OF ACCOUNTS | % SHARE OF # OF CPUS | % SHARE OF TOTAL YEARLY CPU USAGE | ANNUAL CPUS AS % ACCOUNTS # OF CPUS |
|---|---|---|---|---|---|
| >800K # OF CPUS, MANY YEARS WITH XYZ COMPANY, ~800 HISTORICAL CPUS | 9.46 | 6.43% | 16.06% | 55.66% | 0.007% |
| ~800K # OF CPUS, ~2 YEARS WITH XYZ COMPANY, <27 HISTORICAL CPUS | 1.65 | 19.66% | 42.15% | 5.55% | 0.001% |
| <800K # OF CPUS, ~5 USE CASES, <180 HISTORICAL CPUS | 5.18 | 13.66% | 16.06% | 21.51% | 0.012% |
| <800K # OF CPUS, MANY YEARS WITH XYZ COMPANY, <80 HISTORICAL CPUS | 3.06 | 16.03% | 16.18% | 12.37% | 0.005% |
| <80K # OF CPUS, <2 USE CASES, <18 HISTORICAL CPUS | 1.77 | 25.33% | 8.28% | 3.49% | 0.007% |
| <8K # OF CPUS, <2 USE CASES, <8 HISTORICAL CPUS | 1.58 | 18.90% | 0.04% | 1.42% | 0.109% |

GENERATE A FIRST NUMBER (N) OF PREPROCESSED DATA POINTS FROM N DATA POINTS, EACH DATA POINT OF THE N DATA POINTS HAVING DATA FOR A SECOND NUMBER (C) OF DIMENSIONS, BY TAKING A LOGARITHM OF THE DATA FOR EACH DIMENSION OF THE C DIMENSIONS FOR EACH DATA POINT OF THE N DATA POINTS
1602

DETERMINE, BASED ON A PREDETERMINED THRESHOLD AND THE N PREPROCESSED DATA POINTS, A THIRD NUMBER (D) OF DIMENSIONS OF THE C DIMENSIONS, D BEING LESS THAN C
1604

SELECT, FROM THE C DIMENSIONS, D DIMENSIONS TO USE FOR MODELING
1606

GENERATE A MODEL BASED ON THE SELECTED D DIMENSIONS OF THE N PREPROCESSED DATA POINTS
1608

RECEIVE A REQUEST TO IDENTIFY A PREDICTED VALUE FOR AN ADDITIONAL DATA POINT
1610

BASED ON THE ADDITIONAL DATA POINT AND THE GENERATED MODEL, RESPOND TO THE REQUEST WITH THE PREDICTED VALUE
1612

```
┌─────────────────────────────────────────────────────────────┐
│ DETERMINE A PLURALITY OF MODELS BASED ON N DATA POINTS, EACH│
│   DATA POINT OF THE N DATA POINTS HAVING DATA IN C DIMENSIONS│
│                          1702                                │
└─────────────────────────────────────────────────────────────┘
                              │
                              ▼
┌─────────────────────────────────────────────────────────────┐
│      FOR EACH MODEL IN THE PLURALITY OF MODELS, DETERMINE A │
│                    MEDIAN MODEL ERROR                        │
│                          1704                                │
└─────────────────────────────────────────────────────────────┘
                              │
                              ▼
┌─────────────────────────────────────────────────────────────┐
│  CAUSE A USER INTERFACE TO BE PRESENTED ON A DISPLAY DEVICE,│
│   THE USER INTERFACE COPMRISING THE MEDIAN MODEL ERROR OF AT│
│            LEAST A SUBSET OF THE PLURALITY OF MODELS         │
│                          1706                                │
└─────────────────────────────────────────────────────────────┘
```

```
┌─────────────────────────────────────────────────────────────┐
│ SELECT, BASED ON DATA FOR A CUSTOMER, A MODEL FROM AMONG A  │
│                    PLURALITY OF MODELS                       │
│                           1802                               │
└─────────────────────────────────────────────────────────────┘
                              ↓
┌─────────────────────────────────────────────────────────────┐
│  DETERMINE A FIRST QUANTITY OF COMPUTING RESOURCES FOR THE  │
│   CUSTOMER BASED ON TIME SERIES ANALYSIS OF THE CUSTOMER'S  │
│  RECENT QUANTITY OF COMPUTING RESOURCES USING THE SELECTED  │
│                            MODEL                             │
│                           1804                               │
└─────────────────────────────────────────────────────────────┘
                              ↓
┌─────────────────────────────────────────────────────────────┐
│    DETERMINE A SECOND QUANTITY OF COMPUTING RESOURCES FOR   │
│       THE CUSTOMER BASED ON STATIC CUSTOMER DATA             │
│                           1806                               │
└─────────────────────────────────────────────────────────────┘
                              ↓
┌─────────────────────────────────────────────────────────────┐
│ DETERMINE A THIRD QUANTITY OF COMPUTING RESOURCES BASED ON  │
│  THE FIRST QUANTITY OF COMPUTING RESOURCES AND THE SECOND   │
│              QUANTITY OF COMPUTING RESOURCES                 │
│                           1808                               │
└─────────────────────────────────────────────────────────────┘
                              ↓
┌─────────────────────────────────────────────────────────────┐
│ CAUSE A USER INTERFACE TO BE PRESENTED ON A DISPLAY DEVICE, │
│    THE USER INTERFACE COMPRISING AN INDICATION OF THE       │
│      DETERMINED THIRD QUANTITY OF COMPUTING RESOURCES       │
│                           1810                               │
└─────────────────────────────────────────────────────────────┘
```

FIG. 18

MODEL DRIVEN CONFIGURATION OF SOFTWARE INSTALLATION OPERATING STATES

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data. ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 10 is a diagram illustrating data, according to an example, labeled "Set E.
"
FIG. 12 is a diagram illustrating data, according to an example, labeled "Set F.
"
FIG. 14 is a diagram illustrating a user interface, according to an example, for viewing data of cohorts of similar accounts.
FIG. 15 is a diagram illustrating a user interface, according to an example, for viewing data of cohorts of similar accounts.
FIG. 16 is a flowchart illustrating an example process for generating a model from data points and identifying a predicted value for an additional data point.
FIG. 17 is a flowchart illustrating an example process for determining models from data points and causing display of a user interface with information about the determined models.
FIG. 18 is a flowchart illustrating an example process for determining computing resources for a customer and causing display of a user interface with information about the determined computer resources.

DETAILED DESCRIPTION

Figure 1:
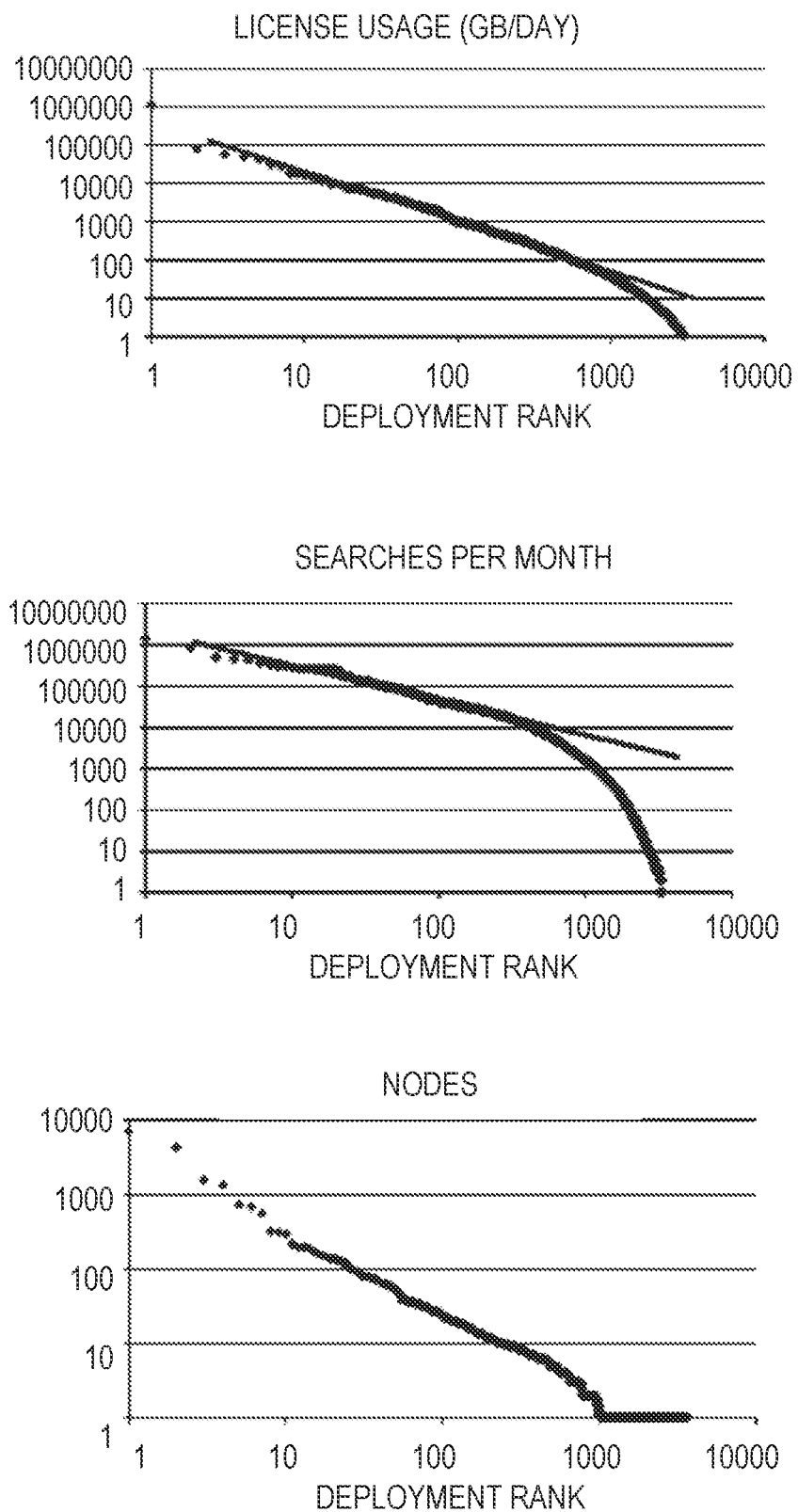
FIG. 1 is a set of three graphs drawn on logarithmic axes.

This document discloses methods and systems for modeling product usage. The methods and systems include improved methods to model product usage and practical applications of the improved methods. In one practical application, the systems and methods may be utilized to model product usage based on large volume, machine-generated product usage data to optimize product pricing and operations. For example, the large volume, machine-generated product usage data, may be generated by and received from an XYZ Company. Specifically, the systems and methods described herein may utilize key components to select the maximum number of dimensions that can be modeled based on the number of data points, use a logarithm kernel function to normalize machine data with long-tailed statistical distributions on different numerical scales, compare a large number of candidate models with different candidate dimensions and different structures, and quantify the amount of change and drift in models over time After a model is constructed, the model's outputs drive concrete action via additional automated methods. For example, the model may be used to size customers and calculate price for long term contracts based on the model and modeling error, calculate and visualize charge back by each customer, calculate and visualize charge back within a customer by applications, workload groups, or users, or dynamically size customers and adjust customer hardware configurations based on the model and modeling error. As another example, the model may be used to determine operation states based on the sizing outputs for the customer, and cause the customer's software installations to be configured with the operation states.

The model generation system may take as input a large dataset of product usage data automatically generated by customers using a software product. The dataset may have a high volume initially, potentially billions of data points. When input into the model, the data may be aggregated and condensed into far fewer data points, potentially hundreds, thousands, or tens of thousands. The model may predict and output numerical values of one of the product usage dimensions using one or more of the other product usage dimensions. For example, the model may predict hardware CPU utilization as a function of time using data ingestion volume and number of searches as functions of time. In general, the example models may show small differences between the predicted and actual measured numerical values (e.g., small differences between CPU utilization predicted versus CPU utilization actual measured).

1.0 Selecting Combinations of Input Dimensions

Real world semantics and constraints aggregate potentially billions of raw data points into a potentially far smaller number of data points for model input. Concurrently, models involving more inputs may capture more descriptive and complex behaviors. However, if an excessive number of model dimensions are included given the number of data points, the model constructed becomes "overfitted." For example, it may become "overfitted" in the sense that the model specifically fits each of the statistical variations in the input data but fails to capture the general behavior of the real-life systems and behaviors being modeled.

For example, if there are 100 data points, and a model of 100 inputs is constructed, then a degenerate and perfectly-fit model may be constructed where each of the input corresponds to a data point. However, such a model will not be effective at predicting additional behavior of the systems involved. That said, what if there are, for example, 100 data points, and 10 model inputs are desired, is that too many? What about 3 model inputs? What about 5? A method is disclosed to systemically answer this category of questions.

For illustration, assume there are N data points. The disclosed method addresses these questions: If the N data points are spread across D model input dimensions, is there enough information in each of the D dimensions?

The described techniques construct a solution in reverse. If there are D dimensions, and each carries one bit of information (e.g., a true/false or high/low), then there are $2^1=2$ values in each dimension, and $(2^1)^D=2^D$ data points in total. Generalizing, if each of D dimensions carries B bits of information, there are $2^B$ values in each dimension, and $2^{BD}$ data points in total. So, if there are N data points across D dimensions, that means each dimension will have $$B = \frac{1}{D}\log2(N)$$

bits of information.

A threshold value B_threshold may be set such that if B<B_threshold, the method will recommend not proceeding with model construction, because the available N data points do not carry enough information to support the D proposed model dimensions.

Existing model generation methods generally assume (1) an abundance of data and (2) the number of model input dimensions are small and well-known (e.g., predict height of individuals based on data for height, gender, and age for a large population). Where there is initial limited data, existing practices assume that either a larger population may be surveyed, or a longer observational period can generate more data. Hence, there has been no systematic prior exploration by the existing techniques regarding the problem of determining the appropriate number of model input dimensions based on the amount of available data.

The disclosed systems and methods may be utilized to model XYZ Company cloud hardware utilization in units of virtual compute, which is an abstract aggregation of actual hardware CPU utilization. As an example, assume there at ten or more candidate input dimensions, and it is not clear which set of input dimensions will be appropriate. Additionally, adding more input dimensions will always result in some increment of "additional fit." Further, XYZ Company cloud may have 2000 or more stacks, which translates into 10,000 or more data points of stack-days upon monitoring all cloud customers XYZ Company for a few days in one example. The desire to have timely models means a model is constructed using only a few days' data. Additionally, the desire to construct different models based on different cohorts of customers further decreases the number of data points available for each model.

In one example, the available number of data points can be as few as 1113 for one customer cohort, and evaluation of 8 candidate dimensions is desired Using the disclosed method and setting B_threshold=2.58=log 2(6)=no fewer than 6 data points per dimension, the following parameters for model construction are recommended:

$$D = 1, B = \frac{1}{1}\log2(1113) = 10.1 > B$$

threshold, model acceptable $$D = 2, B = \frac{1}{2}\log2(1113) = 5.1 > B$$

threshold, model acceptable $$D = 3, B = \frac{1}{3}\log 2(1113) = 3.4 > B$$

threshold, model acceptable $$D = 4, B = \frac{1}{4}\log 2(1113) = 2.5 < B$$

threshold, model inappropriate and will overfit

The disclosed method selects D=3 as the maximum number of modeled dimensions. Given the 8 candidate dimensions available, this may require a comparison of different candidate models generated with different groups of candidate dimensions, further described below, 2.0 Normalization for Long-Tailed Distributions The input data to the model is machine generated, therefore different dimensions of monitored product usage often have vastly different numerical scales. Sometimes one dimension will have numerical values that are millions of times larger than those of other dimensions. Left in their original form, small statistical fluctuations in a dimension with large numerical values may completely hide signals in dimensions with smaller numerical values. Hence there is a need to bring the different numerical dimensions to approximately the same numerical range, a process called "normalization."

The existing techniques are insufficient in this regard because a review of the use of machine generated data in the existing techniques often appears in long-tail distributions, where the largest outliers in any dimension are far larger than the most common data points in the same dimension, and thus normalization is not applied to the data. Disclosed herein is a method and practical application for normalization to address this issue.

A base-10 logarithm function may be applied to normalize data in all dimensions. In other words, for each dimension of each data point, values_normalized=log 10(values_raw) is calculated, and the values_normalized is used as input for the model.

In the disclosed techniques, for dimensions of different numerical ranges and different numerical offsets, increases of the same multiple between two pairs of values will be normalized to the same value. For example, if dimension D1 has range of 0 to 1000, dimension D2 has range of 1,000,000 to 100,000,000, an increase from of 10× from, for example, 5 to 50 in D and 10,000,000 to 100,000,000 in D2 will both become a difference of log 10(50)–log 10(5)=log 10(100, 000,000)–log 10(10,000,000)=log 10(50/5)=log 10(100, 000,000/10,000,000)=log 10(10)=1. This property is highly desirable because it encodes the view that increases or decreases of the same multiple are "equal," regardless of the range and offset of data values in each dimension.

This represents a significant advance over the existing modeling techniques. The standard normalization method in the existing techniques uses the "standard score" construct (i.e., value_normalized=(value_raw−mean)/standard_deviation, where mean and standard_deviation are respectively the numerical mean and standard deviation of each dimension).

While the "standard score" works well for most everyday data and data that closely resemble the Gaussian (Normal) distribution, and hence the name "normalization," this method utterly fails for long tailed distributions. For long tailed distributions, such as an empirically common Zipf distribution, the mean and standard deviation are determined by the largest few outliers, and normalization using the standard score construct in the existing techniques will result in the vast majority of the data points bunched together into a small numerical range with little variation, and a few outliers occupying the vast majority of the numerical range.

The described logarithm kernel function overcomes this shortcoming by spreading data points of all ranges evenly. For example, raw values of common data points from 1 to 10 will occupy the same normalized range as raw values of outliers from 1,000,000 to 10,000,00.

The logarithm kernel function used to normalize model inputs represents a specific example of the general category of "positive definite kernel functions." The properties and applications of these functions are areas of active research in machine learning and general mathematics. As such, the described systems and methods represent advances over the existing techniques by: (1) requiring a kernel function for normalization prior to model building, and (2) utilizing the logarithm function as the most appropriate kernel function.

FIG. 1 illustrates a set of three graphs drawn on logarithmic axes. Many product usage data follow long-tailed statistical distributions, such as the Zipf distribution. For example, the graphs shown in FIG. 1 on logarithmic axes of rank versus size for some product usage dimensions show the tell-tale signatures of a Zipf distribution, straight-line under logarithmic axes.

Figure 2:
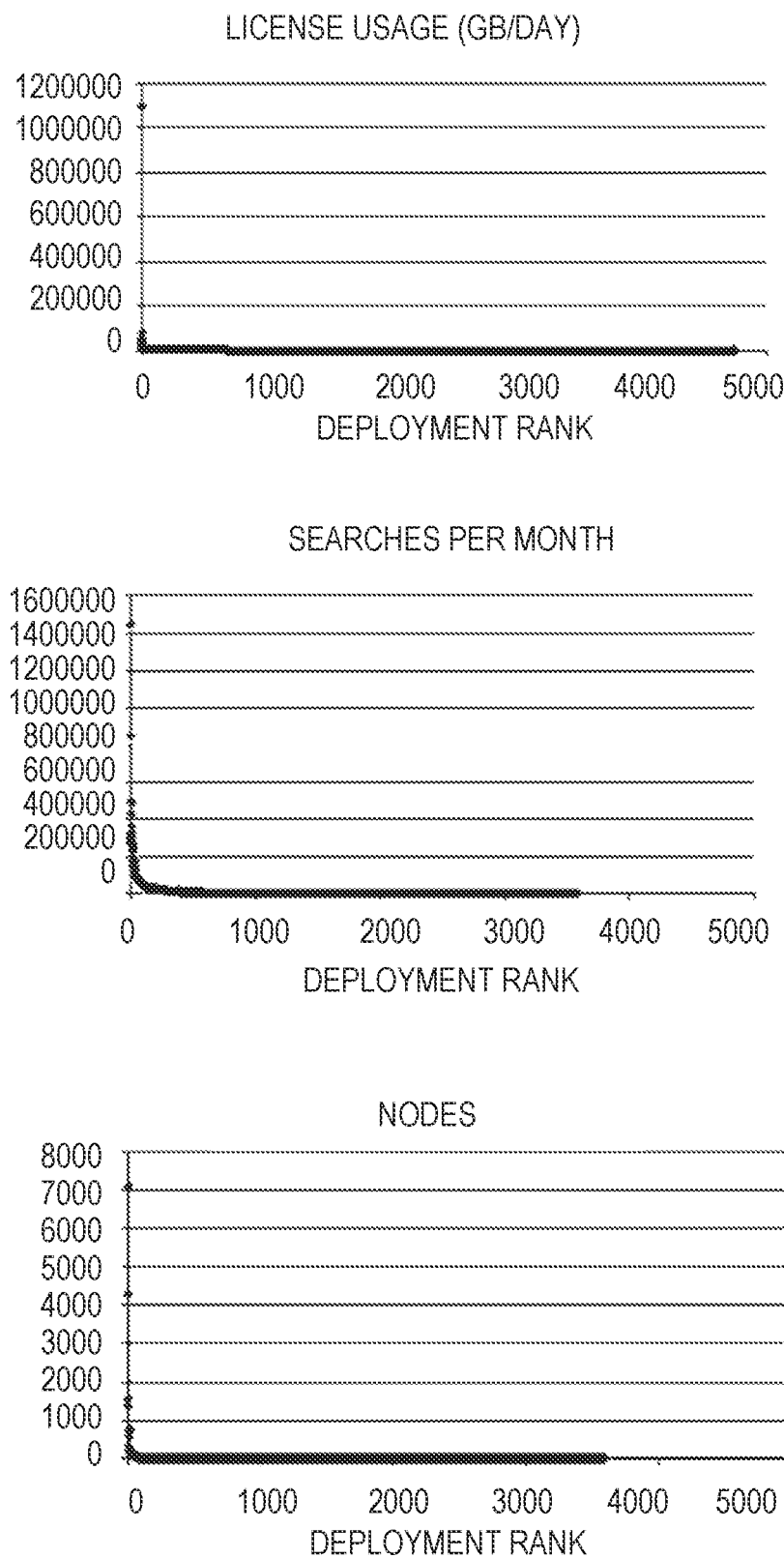
FIG. 2 is a set of three graphs drawn on linear axes.

FIG. 2 is a set of the same three graphs drawn on linear axes. These graphs make it visually obvious that these data distributions are nothing like the more familiar Gaussian distributions. Viewed in linear space used by the "standard score" algorithms in the existing techniques, there is no structure and no signals. However, viewed in logarithmic space used by the disclosed methods, the structures in the data distributions emerge.

3.0 Evaluation of Trained Candidate Models

After the number of modeling dimensions are selected and the input data for all the candidate dimensions are normalized using the logarithm kernel function, multiple candidate models may be constructed or trained, each with a different set of candidate dimensions. Additionally, polynomial regression models of different degrees can be constructed, both in the logarithm normalized space, as well as in the raw, un-normalized space. A large number of candidate models may be constructed, and the choice of the most appropriate model requires a method to compare the model error of all the candidate models. Additionally, the "average error," "bad case error," and "worst case error" of a model informs whether that model may be selected. A method is disclosed herein to enumerate all the candidate models, construct them, quantify their error, and compare the candidate models such that an appropriate model may be selected based on a combination of factors. An appropriate candidate model may be selected based on various model quality measures based on analysis of the generated models as discussed below.

3.1 Enumeration of Possible Candidate Models

The modeling method takes one or more of the following parameters as inputs:
 1. The dimension to be predicted/output (one dimension)
 2. The candidate dimensions to be input (list of dimensions)
 3. The number of model input dimensions (integer)
 4. Whether to include un-normalized polynomial models for comparison (Boolean)

5. Highest polynomial order of variables to include (integer)

Of these, Parameters 1 and 2 are basic information required to define the model, Parameter 3 may be selected using the disclosed method described earlier. Parameter 4,, if selected, includes comparison models constructed without the logarithm kernel normalization, to see if the underlying systems have behavior that more simple, un-normalized models can capture. Parameter 5, if greater than 1, will include higher-order terms of a full polynomial model (e.g., if the value 2 is entered, the modeling method will include quadratic terms in the model, i.e., $X=aY+bZ+cY^2+dYZ+eZ^2+f$)

For illustration purposes, suppose there is a list of C candidate dimensions (Parameter 2), of which a subset of $D \leq C$ dimensions can be included in the model at once (Parameter 3), that un-normalized polynomial models should be included for comparison (Parameter 4), and that the higher polynomial order to include is 0 (Parameter 5). The method enumerates the candidate models thus:

All $\binom{C}{1}$ candidate linear, logarithm normalized models using 1 of the C candidate dimensions All $\binom{C}{2}$ candidate linear, logarithm normalized models using 2 of the C candidate dimensions All $\binom{C}{3}$ candidate linear, logarithm normalized models using 3 of the C candidate dimensions

. . .

All $\binom{C}{D}$ candidate linear, logarithm normalized models using D of the C candidate dimensions Repeat each of the above using linear un-normalized models Repeat each of the above using polynomial order 2 (quadratic), logarithm normalized, then un-normalized models Repeat each of the above using polynomial order 3 (cubic), logarithm normalized, then un-normalized models, e.g., $X=aY+bZ+cY^2+dYZ+eZ^2+fY^3+gYZ^2+hY^2Z+iZ^3+j$

. . .

Repeat each of the above using polynomial order O, logarithm normalized, then un-normalized models In the above, the notation $\binom{n}{k}$ represents binomial coefficients "n choose k."

In an embodiment, the described system then constructs each of the enumerated candidate models, and computes the median (50th percentile), 60th percentile, and 80th percentile, and maximum model error for each candidate model. These error measures are purposefully selected. The model predictions, by definition, are extracted from the center of the data distribution. The model predictions plus or minus the median error cover the "center 50%" of the data distribution. Hence the upper bound of this range, model prediction plus median error, would cover 75% or a clear majority of the data. Likewise, model predictions plus the 60th percentile and 80th percentile would respectively cover 80% and 90% of the data. These, combined with the max error, give a systemic gradation of the safety margins required above the model predictions to cover "increasing majorities" of the data.

At this point, the disclosed methods may have a potentially large table, one row for each of the potentially hundreds of candidate models, and one column for each of the median (50th percentile), 60th percentile, and 80th percentile and maximum model error measures.

Finally, the disclosed methods allow sorting of the candidate models by the size of each error measure, both for a whole table, and within each subcategory of candidate models. For example, sort within all $\binom{C}{3}$ candidate linear, logarithm normalized models using three of the C candidate dimensions, by ascending value of the 60th percentile error, then sort again by the max error, then sort all candidate models by the 60th percentile error. From this interactive user interface, the best model for the problem at hand can be determined.

The described systems and methods provide enumeration of candidate models, which is not previously done in existing methods. The behavior of software systems in the problem space is complex, not well characterized, and subject to potentially change based on changes in software design and customer behavior. Hence, existing methods are unable to know which combinations of the candidate input dimensions will model the predicted dimension well. It is also not known whether the underlying behaviors are best captured linearly or by some higher-order polynomial. Additionally, potential changes in software design or customer behavior could significantly alter the structure of the model and which combinations of candidate inputs are best (e.g., software changes that elevates certain functionality, customer behavior changes that over time moves away from some old features). Hence, the need to enumerate and compare all potentially relevant models is not well understood in the art, and the disclosed systems and methods fill a gap in existing techniques.

The described systems and methods also provide increased model robustness and explainability. The approach described herein is a nuanced and significant advance over existing techniques. An example variant that is relatively recent utilizes "hidden features" to address the problem when the best model inputs are unknown. These hidden features are extracted and utilized in several advanced machine learning and deep learning techniques, including some that use, in different fashions, the concept of "kernel functions" described earlier. However, the existing techniques in this category of approaches acknowledge a potentially unbridgeable gap in model explainability and therefore model robustness. For example, if a neural network model extracts some "hidden features" within the network, those features are entirely abstract and arguably impossible to explain in tangible concepts. Therefore, it is not known how much and in what fashion the models extracted may be overfitted to the underlying data. Some well-known examples of model failures in this category include a horse photo recognition algorithm unable to recognize a zebra until a sufficient number of zebra photos are included in the model input dataset, or facial recognition algorithms developed primarily with photographs of mostly Caucasian individuals working less well for individuals from more diverse demographic groups.

The approach described herein to solving this problem completely eschews "hidden features." By compelling the models to be constrained on normalized or raw values of tangible measures of software product usage and enumerating a large number of possible structures and combinations of candidate input dimensions, the model is guaranteed by construction to be tied to tangible measures. Then, as long as the set of candidate model input dimensions remain valid and important measure of software product usage, only the best model will change upon underlying changes in software design and customer usage. By analogy, the approach of the described systems and methods to horse photo recognition would seek to, for example, extract and quantify different measures of animal morphology, with color being one of the candidate input dimensions. Then upon the introduction of "zebra" as a "new kind of horse," the color candidate dimension will still confuse the constructed model, but the other tangible dimensions of animal morphology will compensate. In this way, the disclosed systems and methods are also a nuanced and significant advance on the existing techniques in terms of model robustness and explainability.

The described systems and methods provide improved quantification of model error. The concepts of average, median, maximum, and various percentile model errors are generally known. However, there is no prescription on which of the measures should take precedence and why. For example, it is completely arbitrary that, for example, 75th percentile or 90th percentile errors are selected, but 80th percentile or 99th percentile errors are not selected.

In one embodiment of the disclosed methods, the average error should be ignored as it is distorted by outliers, and the median, maximum, 60th percentile, and 80th percentile errors should be the focus, with strong rationale around the "model plus safety margin" concept.

The described systems and methods also provide an improved overall schema for model comparison. For example, model comparison done under existing techniques involves comparing a handful number or at most 10-20 candidate models under arbitrary measures of model error. In contrast, the disclosed methods enumerate and compare a large number, potentially hundreds or even thousands of candidate models, under prescriptive model error measures backed by strong rationale, and allows identification of the best models within clearly delineated subcategories of models. The disclosed methods are a significant advance over existing techniques.

In one disclosed example, the described systems and methods are used to compare candidate models with eight (8) candidate input dimensions, combinations of up to three (3) input dimensions, with and without logarithm normalized data, and up to polynomials of order 2. In one embodiment, the total number of models compared are:

$(_1^8)=8$ candidate models with 1 input dimensions
$(_2^8)=28$ candidate models with 2 input dimensions
$(_3^8)=56$ candidate models with 3 input dimensions
Repeat above without logarithm normalized data
Repeat above for polynomial order 2 (quadratic) models The above adds up to a total of (8+28+56)*2*2=368 candidate models. With this full exploration, logarithm normalization is essential, and polynomial order 2 models add no significant improvement. Even with trimming, there are (8+28+56)=92 candidate models to compare.

If there are incrementally nine (9) candidate dimensions, and enough data to support up to four input dimensions, then at a minimum, the number of models to compare are:

$(_1^9)=9$ candidate models with 1 input dimension
$(_2^9)=36$ candidate models with 2 input dimensions
$(_3^9)=84$ candidate models with 3 input dimensions
$(_4^9)=126$ candidate models with 4 input dimensions Thus, this will be a total of 255 candidate models at minimum for comparison. No existing technique allows enumerating and comparing such large numbers of candidate models, nor do existing techniques eschew hidden features, and narrow down to a small number of model error measures.

3.2 Quantifying Differences Between Models

For models constructed at a given point in time, the model errors tend to increase over time as the underlying software system and customer behaviors change. Typically, models are retrained on a regular, arbitrarily determined cadence to reflect recent behavior. However, it is important to know whether the frequency of model retraining is sufficient, and given a period of time, quantify how much a given model has changed or drifted over time. Once that is known, additional machine and business processes may be adjusted and automated.

Disclosed are systems and methods to quantify the change between two models. The described systems and methods may also be configured to quantify and visualize changes in a given model over time Such techniques may also be applied to quantify and visualize differences between the candidate models. As will be further described, FIGS. 4-9 illustrate examples of such visualizations of model outputs.

Figure 3:
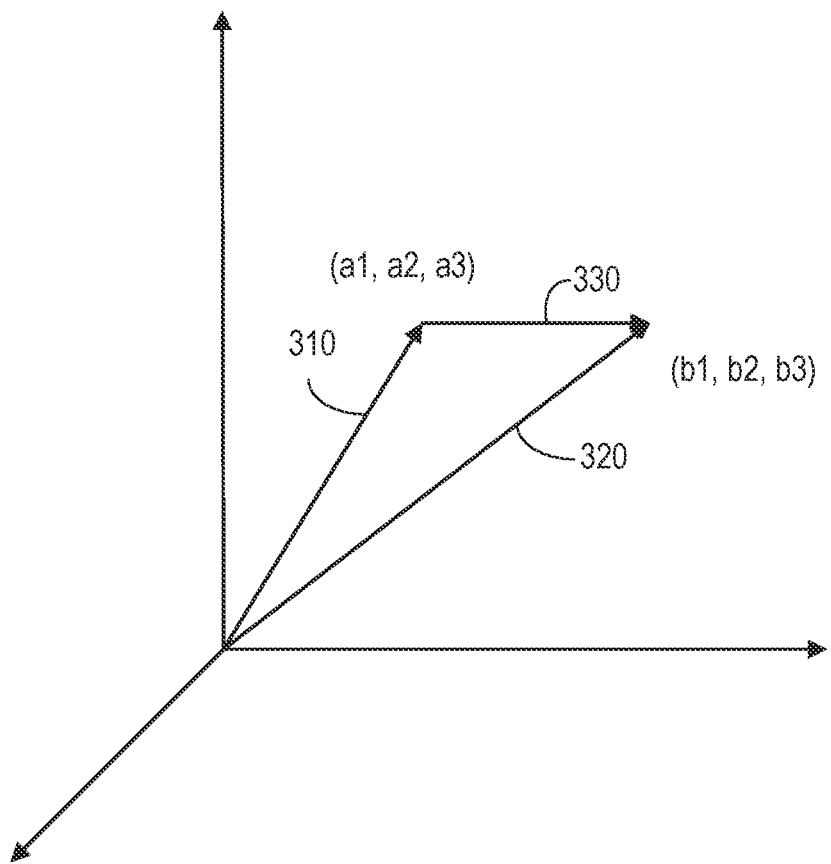
FIG. 3 illustrates a fractional change between two models.

FIG. 3 illustrates a fractional change between two models. FIG. 3 includes a coefficient vector 310 for a first model, a coefficient vector 320 for a second model, and a change vector 330 determined from the coefficient vectors 310 and 320. For an arbitrary polynomial model $X1=\bar{a}Y$, where $\bar{a}$ is a vector of coefficients, and $Y$ is a vector of polynomial terms of one or more variables, $X2=\bar{b}Z$, where $\bar{b}$ is a vector of coefficients, and $Z$ is a vector of polynomial terms of the same variables, the fractional change or drift between the two models is $$\frac{|\bar{a}-\bar{b}|}{|\bar{a}|},$$

i.e., the Euclidean (L2) distance between the two coefficient vectors, divided by the Euclidean (1.2) magnitude of the initial coefficient vector.

In expanded and more understandable terms, if X1=a1 Y1+a2 Y2+a3, and X2=b1 Y1+b2 Y2+b3, then the fractional change between the two models is |(a1, a2, a3)−(b1, b2, b3)|/|(a1, a2, a3)|. Graphically speaking, if the coefficients are plotted as coordinates space, the numerator will be the "straight-line distance" between the two sets of coefficient coordinates (e.g., the length of the change vector 330), and the denominator will be the "straight-line distance" between origin and the coefficient coordinates of the initial model (e.g., the length of the coefficient vector 310).

A few examples to illustrate properties of this model drift measure:

1. For (a1, a2, a3) !=0, if (b1, b2, b3)=0, then the fractional drift in the model is l=100%.
2. If all coefficients double in value, i.e., if b1=2*a1, b2=2*a2, b3=2*a3, then the fractional drift in the model is l=100%.
3. If (b1, b2, b3) represents an infinitesimally small difference to (a1, a2, a3), the fractional drift is likewise infinitesimally small.
4. If a1=a2=a3, and b1=b2=a1=a2, and b3=2*a3, then the fractional drift will be $1/\sqrt{3}$.
5. All models with fractional drift of ½=50% form a sphere centered on (a1, a2, a3), with a diameter equal to the distance between origin and (a1, a2, a3).
6. All models with fractional drift of l=100% form a sphere centered on (a1, a2, a3), with a radius equal to the distance between origin and (a1, a2, a3).

The calculations for higher order polynomial models will proceed in an analogous fashion. The illustrative examples likewise proceed analogously, with Examples 1, 2, and 3 being unchanged, the fractional change in Example 4 above being replaced by $1/\sqrt{n}$, where n is the total number of polynomial coefficients, and the 3-dimensional spheres in Examples 5 and 6 above being replaced by n dimensional hyper-spheres.

Existing techniques evaluate the need to retrain models based on the increased size of model errors over time, or arbitrarily configures the models to be retrained at a fixed regular cadence. However, there is no existing technique to quantify the difference between two models of the same structure and different coefficients, and hence no method to quantify the change in models over time.

The amount of drift occurring between models computed using data from different time periods within in a year can be measured. In one example, use of the "size of model error" approach was uninformative. The size of model error did increase using models constructed in May to predict product usage behavior according to inputs in December. However, no precise statement could be made about how much the model has changed.

Using the disclosed methods, the fractional change in different models may be quantified, with the numerical coefficients being actual coefficients from the following example models:

Model 1, constructed in 2020 May: X=0.6342 Y1+0.1954 Y2−0.8772

Model 2, constructed in 2020 August: X=0.6338 Y1+0.1586 Y2−0.6896

Model 3, constructed in 2020 November: X=0.6059 Y1+0.1524 Y2−0.6980

Going from Model 1 to Model 2, the model change is |(0.6342, 0.1954, 0.8772)−(0.6338, 0.1586, −0.6896)|/|(0.6342, 0.1954, 0.8772)|=0.1911/1.1000=0.174=17.4%.

Going from Model 2 to Model 3, the model change is |(0.6338, 0.1586, −0.6896)−(0.6059, 0.1524, −0.6980)|/|(0.6338, 0.1586, −0.6896)|=0.0298/0.9499=0.031=3.1%.

This shows that the underlying system and customer behavior changed relatively more in the May to August time frame versus the August to December timeframe. There may be other signals unrelated to the model that indicate such a change was indeed the case, and various combinations of business, operational, and customer changes may also be considered to account for the observed behavior change.

4.0 Configuration of Customer Software System Installations

It is important for enterprise software contracts to be sized correctly. Under sizing may result in an insufficient number of product licenses being sold, and customers having to go through potentially disruptive budgeting processes when the licenses run out forcing additional purchases. Over sizing may result in the customer potentially experiencing "sticker shock" and declining the purchase altogether, or under-utilizing their purchase, putting future product sales at risk. Added to the fact that enterprise software contracts are often long term, the impact of wrongly sizing a contract may be long felt.

Given a licensing metric X of an enterprise software product, the previously described systems and methods may be used to construct a model of X as a function of one or more product usage metrics. Based on the anticipated product usage of a customer, the anticipated amount of license X that may be required is calculated. Subsequently, based on the customer's preference to consider a purchase that covers "Z % of scenarios," a safety margin is added on modeled X corresponding to the (2*(Z−50))th percentile of the fractional model error. If Z<50, the safety margin is subtracted from modeled X.

For example, an embodiment of the described systems and methods may operate as follows:
1. The particular cohort to which a customer belongs is provided. The particular cohort may be automatically determined using a trained model. FIGS. 10-15, described below, show example cohorts definitions generated by a trained model. As another example, the particular cohort may be input at a user interface. Supposed the model X=a1 Y1+a2 Y2+a3 Y3+a4 is constructed for all customers in that particular cohort, with Y1, Y2, Y3 being dimensions of product usage, and a1, a2, a3, a4 being, model coefficients,
2. The customer's anticipated product usage may then be input: Y1_anticipated, Y2_anticipated, Y3_anticipated.
3. The value of X_modeled is calculated, and is presented to a user interface that allows adjustment of the safety margin to cover Z % of historical customer scenarios.
4. A value of Z may then be provided or determined.
5. A safety margin is then calculated based on the (2*(Z−50))th percentile of the fractional model error. If, for example, Z is selected to be 80%, then the (2*(Z−50))=(2*30)=60th percentile model error is retrieved, and if, for example, the 60th percentile model error is z % of the modeled value, then the safety margin to be added is X_modeled*z %. If Z<50, the safety margin is subtracted from modeled X.
6. Lastly, both X_modeled and safety margin=X_modeled*z % are displayed to the user.

Some relatively successful models have been constructed of relatively simple software systems such as traditional relational databases running online transactional processing workloads, web servers running traditional webpage serving workloads, or search-engine like systems serving relatively homogeneous search-like workloads. These models all deal with a combination of relatively simple systems running relatively homogeneous workloads (note that much of the complexity of search engines lie in the search index construction, while the search serving part is relatively simple by comparison). The models tend to comprise a small number (e.g., one or two) of obvious input dimensions, and the workload is sufficiently simple and homogenous that only a small number (e.g., one or two) of workload dimensions are available.

In contrast, enterprise data analytics systems exhibit a greater level of system and behavior complexity, while servicing significantly more heterogeneous workloads. For example, database queries of the transactional processing genre are simple and similar to one another, but queries of the general analytical processing genre may be arbitrarily complex. For these more complex software systems serving more heterogenous workloads, there are a large number of workload dimensions, with the number of dimensions available limited only by the measurement capabilities of the particular systems involved. Under these conditions, simple models do not exist.

Disclosed are modeling methods that confront these limitations head on, and the modeling methods described earlier allow the extraction of high quality models for complex software systems running heterogenous workloads. The model method's ability to overcome the limitations represent a significant advance over the existing techniques.

The described systems and methods provide advantages over current sizing methods based on time series analyses. Sizing based on time series analysis by-passes the need to construct a model based on product workload and usage, and instead treats the time series behavior of the license usage as an abstract time series. Time series analysis techniques such as SARIMA (seasonal, auto-regressive, integrative, moving averages) are then brought to bear to try to extrapolate a customer's license into the future.

This approach carries critical flaws that makes it unworkable for sizing long term contracts for enterprise software products. First, SARIMA-style extrapolation fundamentally cannot extrapolate across underlying changes in software, configurations, and customer usage. For example, suppose a customer expanded their product usage to cover a major new use case. Doing so can alter the structure of one or more of the seasonal, auto-regressive, integrative, and moving average components, such that the SARIMA model parameterized to accurately "predict" historical behavior will irrecoverably fail to predict future behavior until manual tuning and analysis is repeated to tune the model.

Second, the error in SARIMA style extrapolation is less accurate on a long time horizon. At the time scale of enterprise software contracts, which are often year-plus in advance, SARIMA extrapolations become uninformative except for customers with stable historical and stable anticipated product usage. For example, good SARIMA tools show an "envelope of prediction error" that increases over time. At the time scale of one or two weeks in advance, the envelope remains informative. Going beyond to a year or more in advance, the envelope often becomes several multiples of license usage (i.e., from zero to several times current license usage). An error range that size is uninformative for sizing future long term contracts.

Third, SARIMA extrapolations need to be trained and parameterized for each of the customer's license usage time series. This is because the seasonal, auto-regressive, integrative, and moving average components of each time series are vastly different, with the only similarities being aspects of any weekly or monthly patterns. Retraining and re-parameterizing for each customer is unscalable and impractical for enterprise software businesses with thousands or more customers.

The present disclosure addresses these concerns and represents a significant advance over the existing techniques of this genre. The models disclosed herein lend themselves to be constructed and applied on entire cohorts of customers. This avoids the need to re-train for individual customers, and in extremis the entire set of customers can be considered to be an all-encompassing cohort.

Additionally, the models capture the collective behavior for all variations in configurations and usage across a customer cohort. This allows the model to survive changes of a particular customer's configurations and usage—as long as similar behavior is observed elsewhere within the customer cohort, which occurs often, the model is already constructed to encapsulate the new behavior.

Further, the model extracts the relationship between license usage and different dimensions of other product usage. The described model comparison methods allows selection of a model whose input dimensions can be anticipated with some insight in the future. This allows the anticipated future product usage to be input, and the license usage to be subsequently calculated.

The described systems and methods also provide advantages over another common approach to size enterprise software contracts based on laboratory performance tests. This approach tests and measures software behavior under a large variety of laboratory conditions and produce laboratory guidelines around anticipated license consumption given anticipated product usage. This may be the best existing technique. However, this approach still falls short, as the empirical heterogeneity of customer workloads, customer data, and customer configurations far exceed that captured in laboratory conditions. For example, even if a customer's historical workload, data, and configurations are exactly reproduced, the laboratory test results could become grossly inaccurate upon alterations in the customer's future workload, data, and configurations. In fact, the inaccuracies in this approach are such that actual deal sizing often reverts back to the "guess and estimate" method, despite the laboratory test method being far more technically grounded.

Again, the described model methods overcome these concerns and represent a significant advance over existing methods. The model methods look at the collective empirical behavior of a cohort of customers. The models capture both the empirical center line and the range of behavior of all customers within a cohort. Laboratory test results, by their limited nature, represent a small subset of the potential input and output of the disclosed models.

One important feature of enterprise software products is to display for users their organization's license usage. The obvious and standard method found in the existing techniques is to display the measured value of a customer's license usage. This approach has some subtle constraints. The disclosed systems and methods overcome such constraints.

Disclosed is a license usage display method that forms a part of the software product used by the customer, and operates as follows:
1. Determine the cohort to which a particular customer belongs. This may be done using different methods: direct encoding as a part of the product license file itself, self-inspection and self-analysis of product usage, or issue a query containing an identifier and receive the answer via an Application Processing Interface (API).
2. Retrieve the most recent license usage model for the customer's cohort. This may be done using different methods: direct encoding within the software code of the product itself or issue a query and receive the answer via an Application Processing Interface (API).
3. Suppose the model for the customer cohort is X=a1 Y1+a2 Y2+a3 Y3+a4, with Y1, Y2, Y3 being dimensions of product usage, and a1, a2, a3, a4 being model coefficients. Calculate and display as a function over time X_modeled(t)=a1 Y1_measured(t)+a2 Y2_measured(t) a3 Y3_measured(t)+a4, where Y1_measured(t), Y2_measured(t), and Y3_measured(t) are the over-time measurements of the product usage dimensions.

FIGS. 4-9 illustrate examples of such visualizations of model outputs. The described user interfaces may be displayed at a computing device of a deployed computer system of a customer.

The described systems and methods provide advantages over current methods based on displaying the measured license usage. The constraints of measured license usage are:
1. Limits the license usage metric to those that are measurable on a per-customer basis. This is a critical constraint tinder fully-elastic, multi-tenant software architectures, where software execution containers from different customers may be co-located on shared underlying hardware, and therefore the split between measured hardware usage is fundamentally impossible.
2. Precludes abstract or virtual license metrics not directly tied to measurable quantities.
3. Creates customer friction for outlier use cases that either over-use or under-use license compared with cohort-wide averages.
4. Perception of license usage being detached from dimensions more closely matched with customer perception of "value." For example, measured license usage may go up due to various automation tasks invisible to the customer, leaving the customer potentially perplexed if all of the customer visible dimensions of product usage remain unchanged.

The described systems and methods address these shortcomings and represent a significant advance over existing methods as follows:
1. By displaying modeled license usage instead of measured, the license usage metric is expanded to metrics that are measurable on a cohort-aggregated basis. Specifically, under fully-elastic, multi-tenant software architectures with software execution containers from different customers co-located on shared underlying hardware, the disclosed modeled method attributes license usage according to a combination of dimensions of product usage, which are often directly measurable on a per-customer basis.
2. By displaying modeled license usage instead of measured, abstract or virtual license metrics not directly tied to measurable quantities are accommodated.
3. By displaying license usage according to a per-customer-cohort model, the cohort-wide average behavior is incorporated, thus removing friction with customers who might be significantly over-use or under-use their license due to the specific details of their use case.
4. By displaying modeled license usage, the model comparison methods described earlier may be used to select models with input dimensions of product usage metrics that more closely align with customers' perception of value. For example, if all dimensions of a customer's visible product usage remain unchanged, then by construction, modeled and displayed license usage will remain unchanged, regardless of what additional automated tasks that may take place invisible to the user.

Another important feature for enterprise software products is to display the license usage attributable to different applications, workload groups, or users within a customer. The purpose behind this attribution is so that the cost of any enterprise-wide software license can be attributed back to different organizations or sub-entities within a customer. The standard existing technique is to either constrain the license metric to ones that are easily measurable at the application, workload group, or user level, or to attribute license usage via indirect proxies that are not guaranteed to have close correlations with license usage, Again, by applying the described model methods, systems and methods are provided that address these shortcomings.

A method is disclosed to display license usage at a within-customer level, and it forms a part of the software product used by the customer. The method may operate as follows:
1. A list of sub-customer entities is provided around which to calculate and attribute license usage. These entities are collections of one or more applications, workload categories, users, or other units of grouping.
2. Determine the cohort to which a particular customer belongs. This may be done using different methods: direct encoding as a part of the product license file itself, self-inspection and self-analysis of product usage, or issue a query containing an identifier and receive the answer via an Application Processing Interface (API).
3. Retrieve the most recent license usage model for the customer's cohort. This may be done using different methods: direct encoding within the software code of the product itself or issue a query and receive the answer via an Application Processing Interface (API).
4. Suppose the model for the customer cohort is X=a1 Y1+a2 Y2+a3 Y3+a4, with Y1, Y2, Y3 being dimensions of product usage, and a1, a2, a3, a4 being model coefficients. Calculate as a function over time at the whole-customer level X_modeled_customer(t)=a1 Y1_measured_customer(t)+a2 Y2_measured_customer(t)+a3 Y3_measured_customer(t)+a4, where Y1 measured_customer(t), Y2_measured_customer(t), and Y3_measured_customer(t) are the over-time measurements of the total product usage for the customer.
5. Calculate for each sub-customer entity X_weighted_entity(t)=a1 Y1_measured_entity(t)+a2 Y2_measured_entity(t)+a3 Y3_measured_entity(t), where Y1 measured_entity(t), Y2_measured(t)_entity, and Y3_measured_entity(t) are the over-time measurements of the product usage dimensions at the sub-customer entity level.
6. Calculate sum(X_weighted_entity(t)) across all entities. If the customer has not specified a list of entities that cover all product usage activities, the unincluded applications, workload categories, users, or other units of grouping is treated as a collective "Others" entity.
7. Display for each sub-customer entity X_modeled_entity(t)=X_modeled_customer(t)*X_weighted_entity(t)/sum(X_weighted_entity(t))*, where X_modeled_customer(t) is from Step 4, X_weighted_entity(t) is from Step 5, and sum(X_weighted_entity(t)) is from Step 6.
8. Display in addition X_modeled_customer(t).

In the above, Steps 2 and 3 are the same as that for calculating and displaying customer-level license usage.

If Y1, Y2, Y3 are dimensions of additive product usage (i.e., the sum across all sub-customer entities of Y1, Y2, Y3 add up respectively to the total Y1, Y2, Y3 of the customer), then at any point t, the sum across all entities of displayed X_modeled_entity(t) is equal to X_modeled_customer(t) for the customer as a whole.

This construction has the property that the product usage independent term in the model, a4, is spread fairly across different entities according to the ratio of weighted sums of sub-customer entity level models.

One important capability of fully elastic, multi-tenant software architectures is the ability to change hardware and software configuration dynamically at a time granularity of hours or even less. This capability ensures that the hardware and software configurations supplied to the customer are optimal for what the customer is doing with the product at that point in time. Of these, the most critical is the ability to determine whether the customer is correctly sized or has just enough computing resources for their product usage at a point in time.

Methods are disclosed to dynamically determine the right size of the customer at hourly or sub-hour time granularity. The output of the disclosed methods are fed into other systems that adjust the provided computing resources for customers via adjustments in hardware or software configurations.

The disclosed methods include an orchestration of multiple methods in sizing.

For illustration's sake, suppose the dimension of sizing is X. The following is done for each customer:
1. Determine the appropriate size of the customer by methods for stack provisioning: X_static_provisioned.
2. Determine the appropriate size of the customer based on the software performance of the customer: X_reactive_thresholds.
3. Determine the appropriate size of the customer based on cohort-wide ARIMA (auto-regressive, integrated, moving average) time series analysis of the customer's recent historical size: X_arima.

4. Determine the appropriate size of the customer based on models of product usage constructed using the model construction and comparison methods earlier: X_modeled.
5. Feed the output of each of the above plus the current size of the customer X_current into a function f(X_current, X_static_provisioned, X_reactive_thresholds, X_arima, X_modeled), where the function outputs the adjusted size of the customer X_adjusted.

The function can be configured to encode several key structures. One structure can be any configurable overriding priority among the outputs of Steps 1 to 4. For example, business conditions fundamentally beyond the knowledge of the modeling method may require that either X_static_provisioned or X_reactive_thresholds carry strict precedence for increasing customer size (i.e., outputting X_adjusted>X_current). A second structure can be a vote threshold N for agreement between the methods. Specifically, if, for example, N is set to be 3, then 3 or more of X_static_provisioned, X_reactive_thresholds, X_arima, or N_modeled being greater than N_current will trigger an assessment that X_adjusted should be greater than X_current. Inversely, N or more of X_static_provisioned, X_reactive_thresholds, X_arima, or X_modeled being less than X_current will trigger an assessment that X_adjusted should be less than X_current. Other similar structures can be encoded as appropriate.

An output selection option among the methods, one of (max, min, or median), is also encoded. If max is selected, then X_adjusted is set to the maximum of all the N or more indicators that voted in agreement above. For example, if N=3, and only X_static_provisioned, X_reactive_thresholds, and X_modeled voted in agreement, then the max of these will be selected to be X_adjusted. If min is selected, then X_adjusted is set to the minimum of all the N or more indicators that voted in agreement above. For example, if N=3, and only X_static_provisioned, X_reactive_thresholds, and X_modeled voted in agreement, then the minimum of these will be selected to be X_adjusted. If median is selected, then X_adjusted is set to the minimedian mum of all the N or more indicators that voted in agreement above. For example, if N=3, and only X_static_provisioned, X_reactive_thresholds, and X_modeled voted in agreement, then the median of these will be selected to be X_adjusted.

The above can be set to run upon one of the methods in Steps 1-4 crossing pre-configured thresholds, and at a regular hourly or sub-hourly cadence. Examples of how the method can operate:

Example 1

0. Customer's software performance falls below a threshold, triggering the dynamic sizing method to be run.
1. X_static_provisioned is calculated.
2. X_reactive_thresholds is calculated.
3. X_arima is calculated.
4. X_modeled is calculated.
5. f(X_current, X_static_provisioned, X_reactive_thresholds, X_arima, X_modeled) outputs X_adjusted=median(X_reactive_thresholds, X_arima, X_modeled being)>X_current, because
   5.1. There is no overriding priority.
   5.2. The voting threshold N is set to 2, and X_reactive_thresholds, X_arima, and X_modeled vote in agreement that X_adjusted should be >X_current, a vote of 3 above the set threshold N of 2 votes.
   5.3, Output selection method is set to "median", hence output X_adjusted=median(X_reactive_thresholds, X_arima, X_modeled being), median of the indicators that voted in agreement.

Example 2

0. Customer's software performance falls below a threshold, triggering the dynamic sizing method to be run.
1. X_static_provisioned is calculated.
2. X_reactive_thresholds is calculated.
3. X_arima is calculated.
4. X_modeled is calculated.
5. f(X_current, X_static_provisioned, X_reactive_thresholds, X_arima, X_modeled) outputs X_adjusted=X_current, because
   5.1. There is overriding priority on X_static_provisioned, and that indicator suggests X_adjusted should be kept at X_current.
   5.2. Voting not computed.
   5.3. Output according to one of (max, min, median) not computed.

Example 3

0. The dynamic sizing method runs upon a regularly hourly trigger.
1. X_static_provisioned is calculated.
2. X_reactive_thresholds is calculated.
3. X_arima is calculated.
4. X_modeled is calculated.
5. f(X_current, X_static_provisioned, X_reactive_thresholds, X_arima, X_modeled) outputs X_adjusted=X_current, because
   5.1. There is no overriding priority.
   5.2. The voting threshold N is set to 3, and X_reactive_thresholds, X_arima vote to output X_adjusted>X_current, and X_static_provisioned and X_modeled vote to output X_adjusted X_current. There is no consensus of 3 or more votes.
   5.3. Output according to one of (max, min, median) not computed.

Example 4

0. The dynamic sizing method runs upon a regularly hourly trigger.
1. X_static_provisioned is calculated.
2. X_reactive_thresholds is calculated.
3. X_arima is calculated.
4. X_modeled is calculated.
5. f(X_current, X_static_provisioned, X_reactive_thresholds, X_arima, X_modeled) outputs X_adjusted=min(X_reactive_thresholds, X_arima, X_modeled being) <X_current, because
   5.1. There is no overriding priority.
   5.2. The voting threshold N is set to 3, and X_reactive_thresholds, X_arima, and X_modeled vote in agreement that X_adjusted should be <X_current, a vote of 3 meeting the set threshold N of 3 votes.
   5.3. Output selection method is set to "min", hence output X_adjusted=min(X_reactive_thresholds, X_arima, X_modeled being), minimum of the indicators that voted in agreement.

This method may be standardized to dynamically size customers for operating one of XYZ Company's major product lines (i.e., software installations). At a high level, the sizing metric to be calculated is a virtual hardware usage metric. The aim is to use the disclosures herein to operate the product in a robust fashion while allowing room to express different preferences over time with regard to overriding priorities, voting thresholds, and level of aggressiveness in dynamically adjusting each customer's size. Based on the model outputs, configurations of the customer's software installations may be changed, as further explained with reference to FIGS. 19-26.

5.0 Example Visualizations

Figure 4:
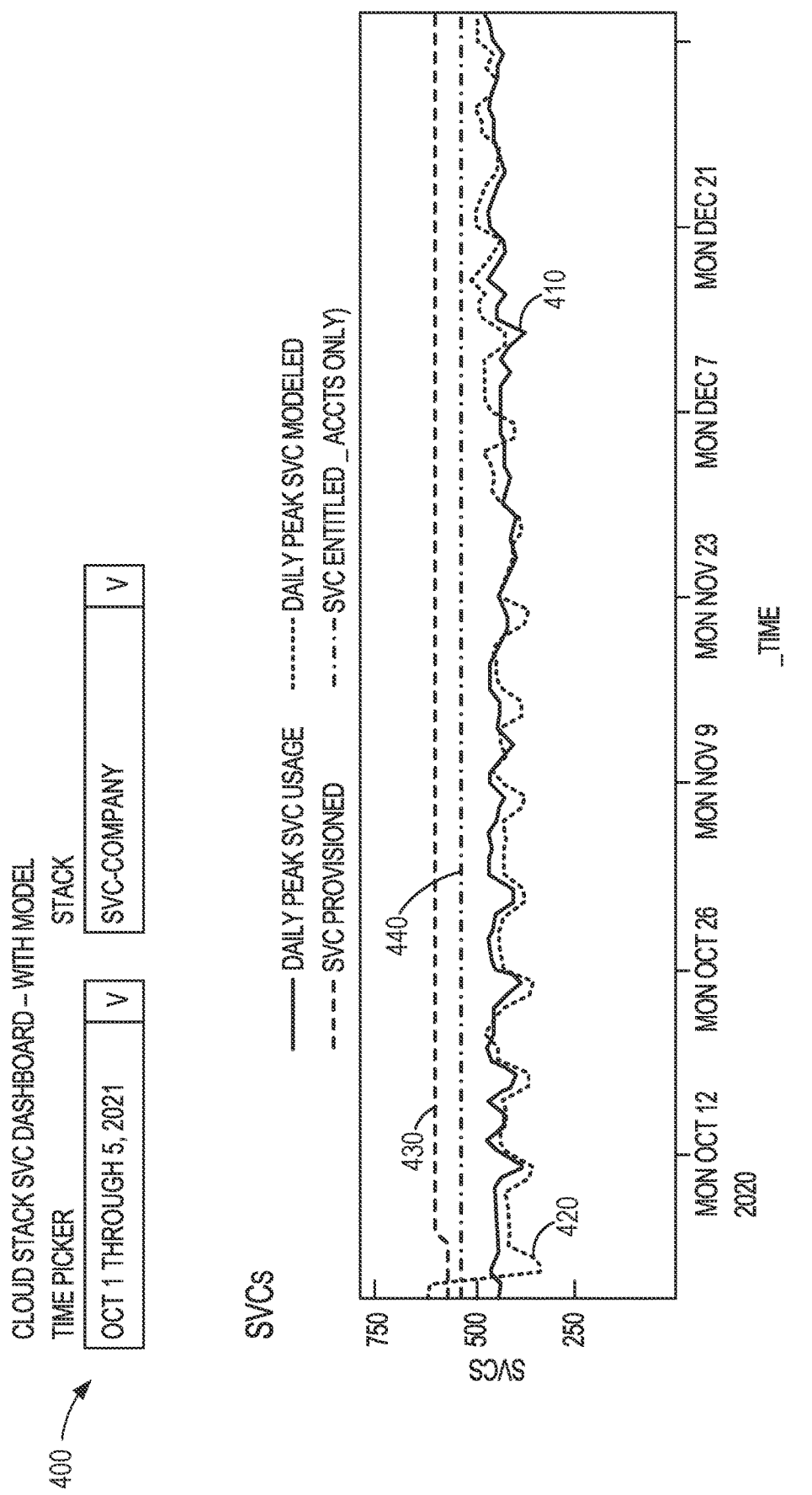
FIG. 4 is a diagram illustrating a user interface, according to an example, for system virtual computes.

FIG. 4 is a diagram illustrating a user interface 400, according to an example. The user interface 400 includes a metric panel to plot counts of system virtual computes (SVC) over an identified period of time for an identified stack. In the present example, the term SVC is defined as a "system virtual compute." The SVC may include one or more virtual central processing units and/or one or more physical central processing units. The central processing units, whether virtual or physical, may be hosted in a cloud (e.g., Amazon Web Services (AWS)) or on proprietary premises. In another example, the SVC may be defined as another type of system resource. In another example, the SVC may be defined as a collection of various types and numbers of system resources. The user interface 400 displays plot a count of SVCs, on a "Y" axis, over time, on an "X" axis. The metrics may include a daily peak SVC usage 410, a daily peaks SVC modeled 420, SVC provisioned 430 and SVC entitled accounts only 440. The user interface 400 may further include user interface mechanisms including a pull-down menu labeled "TIME PICKER" for identifying a period of time and a pull-down menu labeled "STACK" for identifying a cloud entity hosted by a cloud (e.g., Azure). The cloud entity "SVC-COMPANY" (e.g., XYZ-COMPANY), is associated with cloud resources (e.g., SVC's). For example, the user interface 1000 illustrates the pull-down menu "TIME PICKER" being utilized to pick the work-week, "Oct. 1, 2021-Oct. 5, 2021," and the pull-down menu "STACK" to identify the cloud entity, "SVC-COMPANY." In one example, the metric panel being illustrated may be included with one or more other metric panels on a single dashboard.

Figure 5:
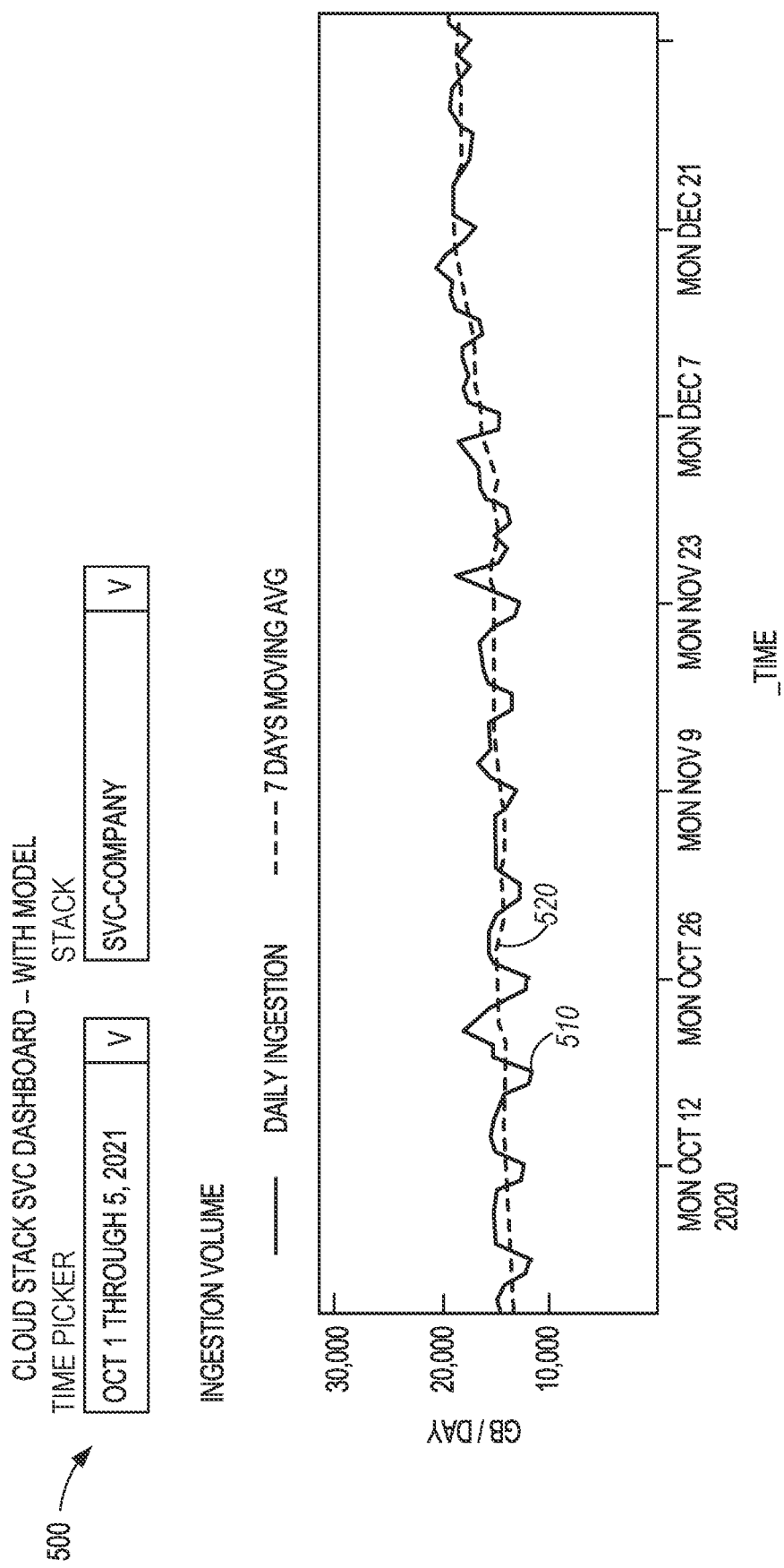
FIG. 5 is a diagram illustrating a user interface, according to an example, for ingestion volume.

FIG. 5 is a diagram illustrating a user interface 500, according to an example. The user interface 500 includes a metric panel for plotting ingestion volume over an identified period of time for an identified stack. The user interface 500 includes a "Y" axis to plot a count of Gigabytes per day (e.g., "GB/day") an "X" axis to plot the counts of Gigabytes per day (e.g., "GB/day") over time (e.g., work-week). The metrics may include a daily ingestion 510 and a seven day moving average 520. The user interface 500 may further include user interface mechanisms including a pull-down menu labeled "TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 6:
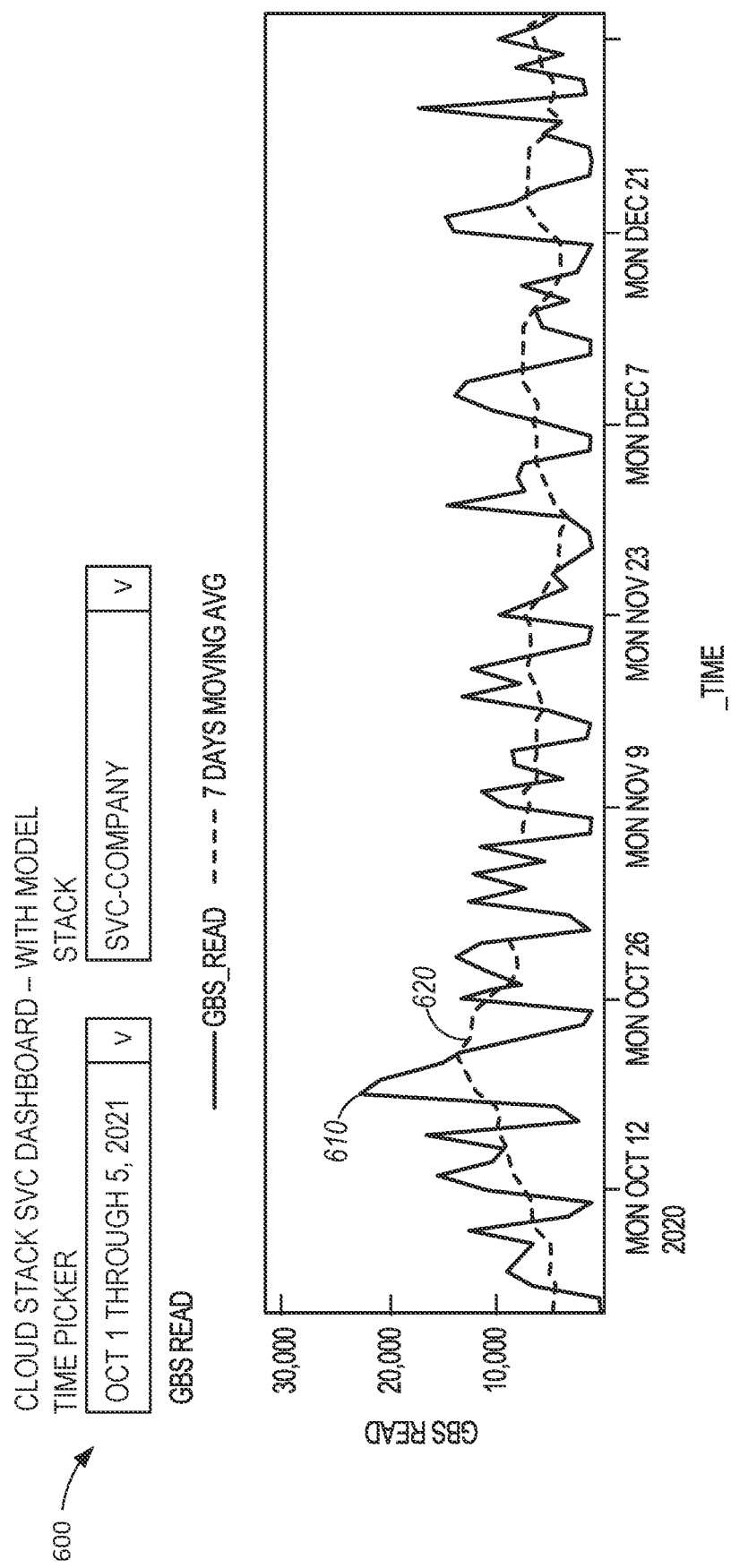
FIG. 6 is a diagram illustrating a user interface, according to an example, for gigabytes read.

FIG. 6 is a diagram illustrating a user interface 600, according to an example. The user interface 600 includes a metric panel for plotting Gigabytes read (e.g., GBs read) over an identified period of time for an identified stack. The user interface 600 includes a "Y" axis to plot a count of Gigabytes read (e.g., "GBs read") an "X" axis describing time (e.g., work-week). The metrics may include gigabytes read 610 (e.g., "GBs_read") and a seven day moving average 620 (e.g., "7 days moving avg"). The user interface 600 may further include user interface mechanisms including a pull-down menu "TIME PICKER" for identifying a period of time and a pull-down menu "STACK" for identifying a cloud entity hosted by a cloud (e.g., Azure), as previously described. In one example, the metric panel being illustrated may be included with one or more other metric panels on a single dashboard.

Figure 7:
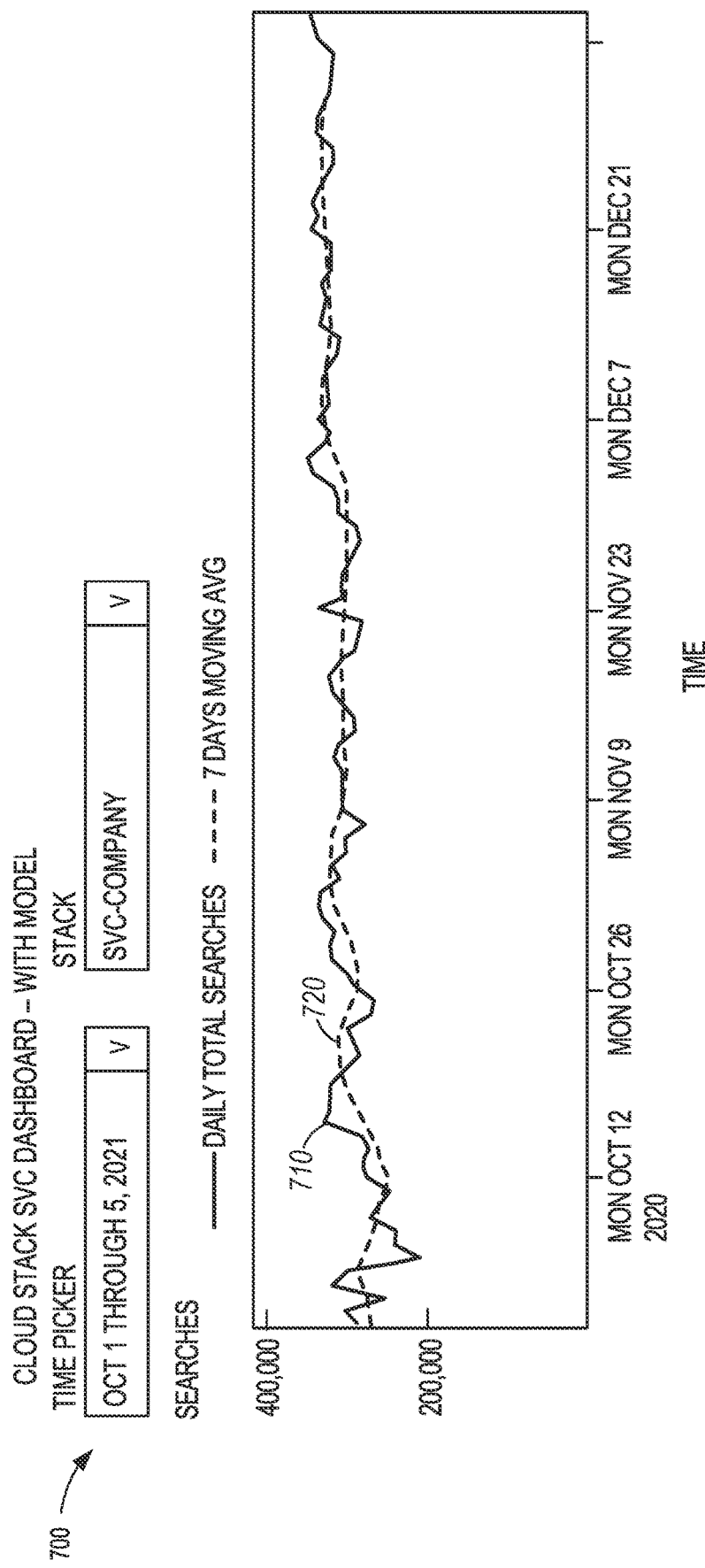
FIG. 7 is a diagram illustrating a user interface, according to an example, for searches.

FIG. 7 is a diagram illustrating a user interface 700, according to an example. The user interface 700 includes a metric panel for plotting searches (e.g., "Searches") over an identified period of time for an identified stack. The user interface 700 includes a "Y" axis to plot a count of searches an "X" axis for time (e.g., work-week). The metrics may include daily total searches 710 and a seven day moving average 720 (e.g., "7 days moving avg"). The user interface 700 may further include user interface mechanisms including a pull-down menu labeled "TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 8:
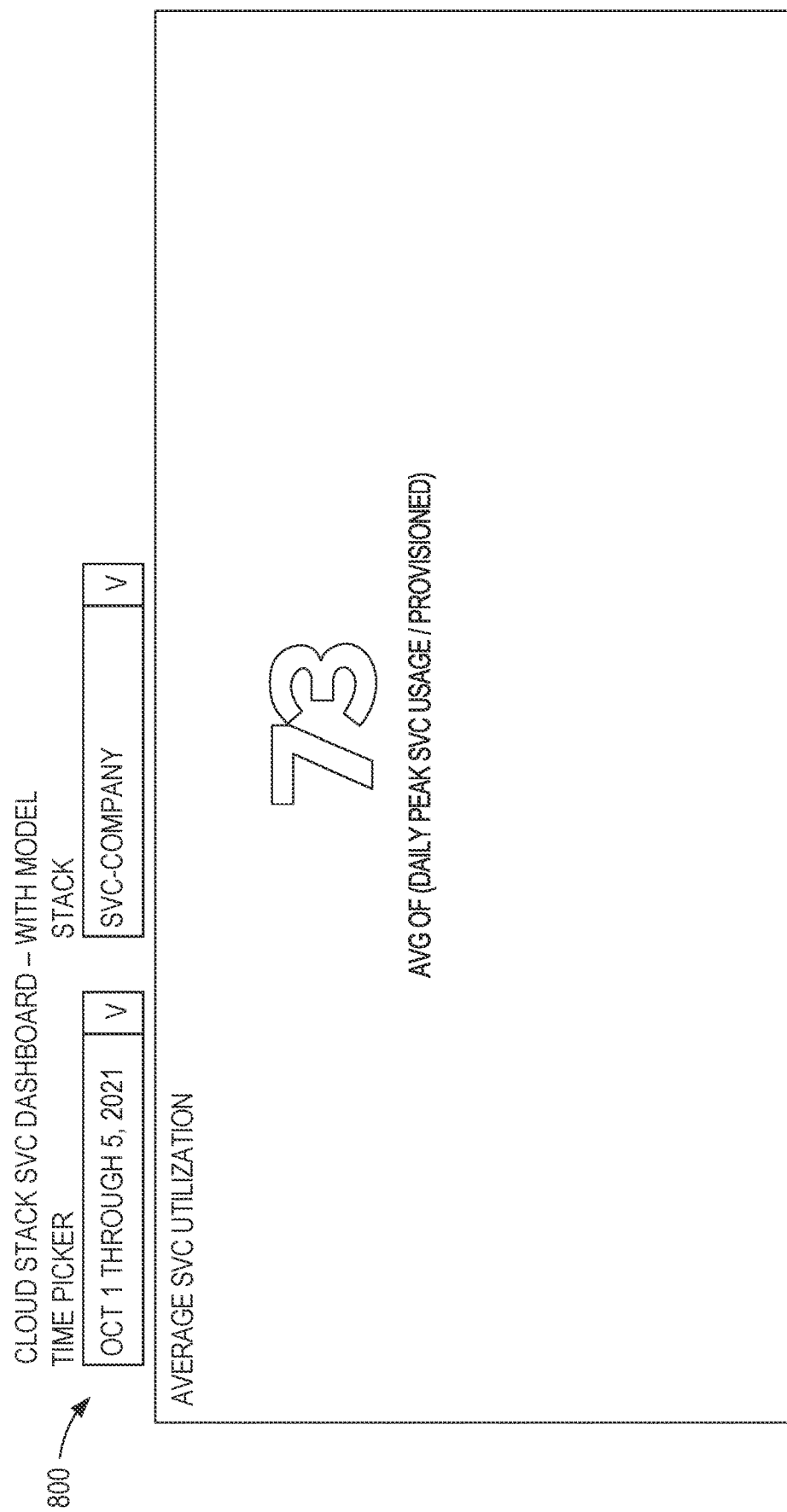
FIG. 8 is a diagram illustrating a user interface, according to an example, for average system virtual computes.

FIG. 8 is a diagram illustrating a user interface 800, according to an example. The user interface 800 includes a metric panel for plotting average SVC utilization (e.g., "Average SVC utilization") over an identified period of time for an identified stack. The user interface 800 includes an average (e.g., "73") that is computed by taking an average for the identified period of time of (daily peak SVC usage/provisioned). The user interface 800 may further include user interface mechanisms including a pull-down menu labeled "TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 9:
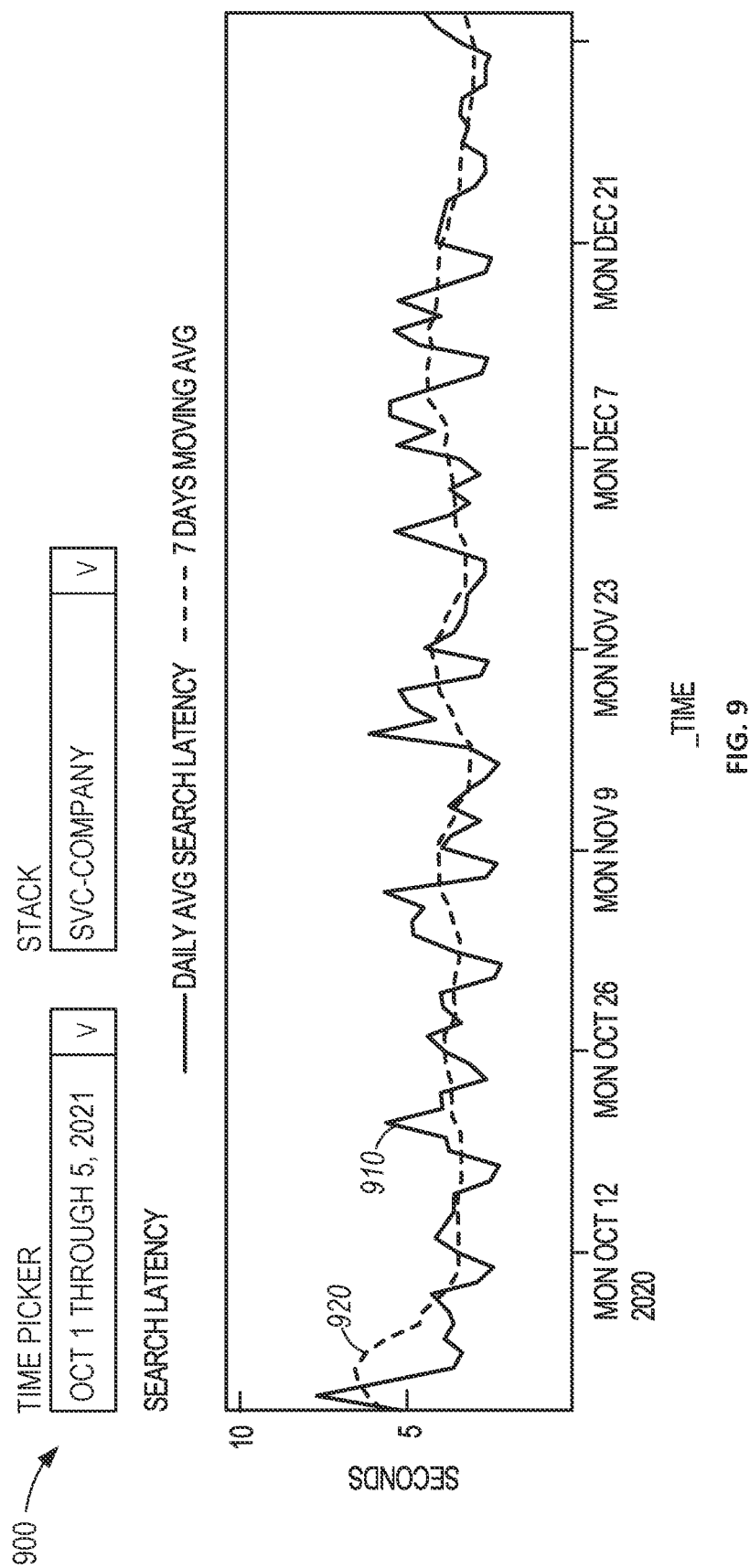
FIG. 9 is a diagram illustrating a user interface, according to an example, for search latency.

FIG. 9 is a diagram illustrating a user interface 900, according to an example. The user interface 900 includes a metric panel for plotting search latency (e.g., "Search latency") over an identified period of time for an identified stack. The user interface 900 includes a "Y" axis to plot a count of searches and an "X" axis for time (e.g., work-week). The metrics may include daily average search latency 910 and a seven day moving average 920 (e.g., "7 days moving avg"). The user interface 900 may further include user interface mechanisms including a pull-down menu labeled "TIME PICKER" for identifying a period of time and a pull-down menu labeled "STACK" for identifying a cloud entity hosted by a cloud (e.g., Azure), as previously described. In one example, the metric panel being illustrated may be included with one or more other metric panels on a single dashboard.

Figure 11:
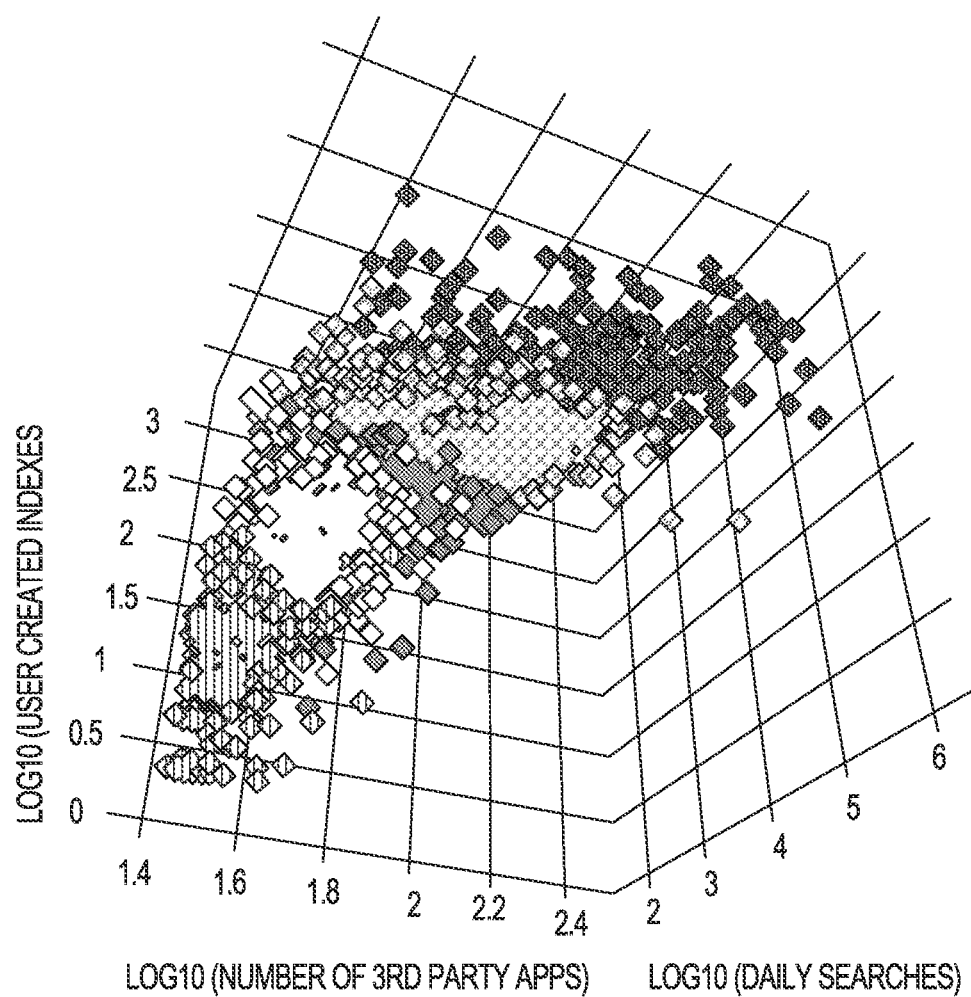
"
FIG. 11 is a diagram illustrating a user interface, according to an example, for visualizing cohorts using the data labeled "Set E
Figure 13:
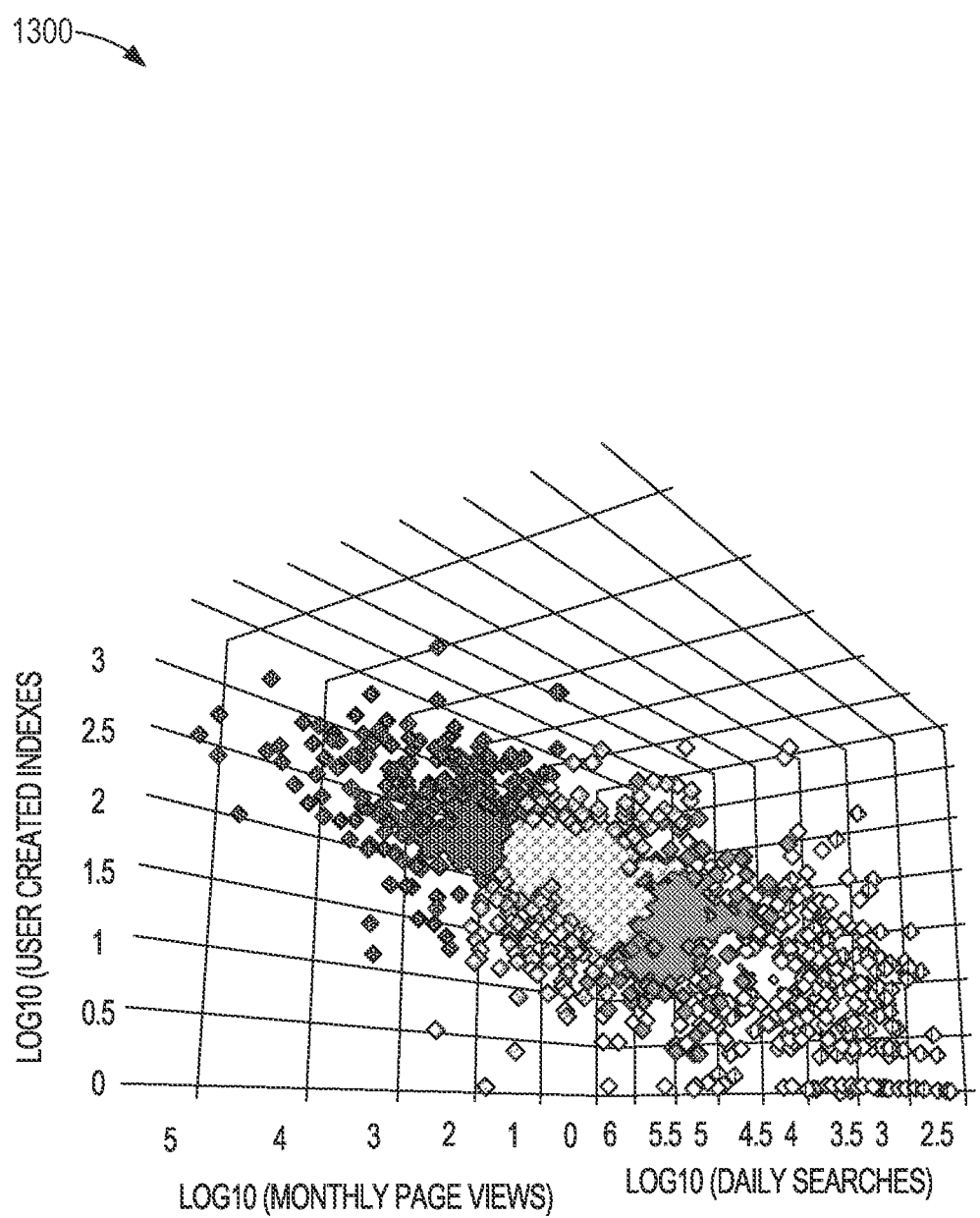
"
FIG. 13 is a diagram illustrating a user interface, according to an example, for visualizing cohorts using the data labeled "Set F.

As described above, FIGS. 10-15 show example cohort definitions generated by a trained model. For example, FIG. 10, FIG. 11, FIG. 12, and FIG. 13 show example visualizations of resulting clusters. FIG. 10 and FIG. 12 show the values of the center points of the clusters; FIG. 11 and FIG. 13 show the positions of the data points in each cluster.

FIG. 10 is a diagram illustrating data 1000, according to an example, labeled "Set E." The data 1000 is arranged according to rows of cohorts and columns of attributes. For example, the respective rows include cohorts identified "Largest stacks," "Larger stacks," "Medium stacks," "Smaller stacks," and "Smallest stacks" and the respective columns include the attributes identified "Cloud stacks," "Daily searches," "Number of $3^{rd}$ party apps installed," and "User created indexes." The intersection of the rows and columns include the corresponding data 1000 labeled "Set E."

FIG. 11 is a diagram illustrating a user interface 1100, according to an example. The user interface 1100 may be utilized for visualizing cohorts. For example, the user interface 1100 may be utilized for visualizing the cohorts of similar cloud stacks in scale dimensions (e.g., "Set E") including log 10 (user created indexes) and log 10 (number of third party searches) and log 10 (daily searches).

FIG. 12 is a diagram illustrating data 1200, according to an example, labeled "Set F." The data 1200 is arranged according to rows of cohorts and columns of attributes. For example, the rows of cohorts are respectively identified "Largest stacks," "Larger stacks," "Medium stacks," "Smaller stacks," and "Smallest stacks" and the columns of attributes are respectively identified "Cloud stacks," "Daily searches," "Number of $3^{rd}$ party apps installed," and "User created indexes." The intersection of the rows and columns include the corresponding data 1200.

FIG. 13 is a diagram illustrating a user interface 1300, according to an example. The user interface 1300 may be utilized for visualizing cohorts. For example, the user interface 1300 may be utilized for visualizing cohorts of similar cloud stacks in scaled dimensions (e.g., "Set F") including log 10 (daily searches) and log 10 (monthly page views) and log 10 (user created indexes).

FIG. 14 is a diagram illustrating a user interface 1400, according to an example. The user interface 1400 nay be utilized for viewing cohorts of similar accounts. The user interface 1400 is arranged according to rows of cohorts and columns of attributes with the intersection of rows and columns presenting corresponding values. For example, the rows of cohorts are respectively identified, ">898K #OF CPUS, MANY YEARS WITH XYZ COMPANY, ~898B HISTORICAL CPUS," "~899K #t OF CPUS, ~2 YEARS WITH XYZ COMPANY, <27 HISTORICAL CPUS," "<898K #OF CPUS, ~5 USE CASES, <180 HISTORICAL CPUS," "<898K #OF CPUS, MANY YEARS WITH XYZ COMPANY, <90 HISTORICAL CPUS," "<90K #OF CPUS, <2 USE CASES, <18 HISTORICAL CPUS," and "<9K #OF CPUS, <2 USE CASES, <8 HISTORICAL CPUS" and the columns of attributes are respectively identified, "#OF CPUS," "CUSTOMER AGE," "HISTORICAL #CPUS" and "PRODUCTS BOUGHT." The intersection of the rows and columns include the corresponding data.

FIG. 15 is a diagram illustrating a user interface 1500, according to an example, for viewing cohorts of similar accounts. The user interface 1500 adds five columns of attributes to the user interface 1500. For example, the rows of cohorts are again respectively identified, ">898K #OF CPUS, MANY YEARS WITH XYZ COMPANY, ~898B HISTORICAL CPUS," "~899K #OF CPUS, ~2 YEARS WITH XYZ COMPANY, <27 HISTORICAL CPUS," "<898K #OF CPUS, ~5 USE CASES, <180 HISTORICAL CPUS," "<898K #OF CPUS, MANY YEARS WITH XYZ COMPANY, <90 HISTORICAL CPUS," "<90K #OF CPUS, <2 USE CASES, <18 HISTORICAL CPUS," and "<9K #OF CPUS, <2 USE CASES, <8 HISTORICAL CPUS" and the columns of attributes are respectively identified, "USE CASES BOUGHT, "% SHARE OF ACCOUNTS," "% SHARE OF #CPUS," "% SHARE OF TOTAL YEARLY CPU USAGE," and "ANNUAL CPUS AS % ACCOUNT'S #OF CPUS." The intersection of the rows and columns include the corresponding data.

6.0 Operational Methods and Architecture

FIG. 16 is a flowchart illustrating an example process 1600 for generating a model from data points and identifying a predicted value for an additional data point. The example process 1600 can be implemented, for example, by a computing device that comprises one or more processors and a non-transitory computer-readable medium. The non-transitory computer readable medium can be storing instructions that, when executed by the one or more processors, can cause the processor to perform the operations of the illustrated process 1600. Alternatively or additionally, the process 1600 can be implemented using a non-transitory computer-readable medium storing instructions that, when executed by one or more processors, case the one or more processors to perform the operations of the process 1600 of FIG. 16.

In operation 1602, the one or more processors generate a first number (N) of preprocessed data points from N data points. Each data point of the N data points has data for a second number (C) of dimensions. The generation of the N preprocessed data points from the N data points includes taking a logarithm of the data for each dimension of the C dimensions for each data point of the N data points. For example, the N data points may include data on linear scales, such as the data points shown in FIG. 2 and the N preprocessed data points may include data on a logarithmic scale, such as the data points shown in FIG. 1.

In operation 1604, the one or more processors determine, based on a predetermined threshold and the N preprocessed data points, a third number (D) of dimensions of the C dimensions, D being less than C. In operation 1606, the one or more processors select, from the C dimensions, D dimensions to be used for modeling. For example, the predetermined threshold may define a minimum amount of information per dimension being used for modeling. Based on the number of data points and the predetermined threshold, D is selected.

As an example, the available number of data points is 1113, C is 8, and the threshold is 2.6. If each of the selected D dimensions carries B bits of information, there are $2^B$ values in each dimension, and $2^{BD}$ data points in total. So, if there are N data points across D dimensions, that means each dimension will have $$B = \frac{1}{D}\log2(N)$$

bits of information. Accordingly, the method determines that D is 3 by determining the value of B for several possible values of D and selecting the largest value of D where B is greater than the predetermined threshold:

$$D = 1, B = \frac{1}{1}\log2(1113) = 10.1 > B\_threshold,$$

model acceptable $$D = 2, B = \frac{1}{2}\log2(1113) = 5.1 > B\_threshold,$$

model acceptable $$D = 3, B = \frac{1}{3}\log2(1113) = 3.4 > B\_threshold,$$

model acceptable $$D = 4, B = \frac{1}{4}\log 2(1113) = 2.5 < \text{B\_threshold},$$

model inappropriate and will overfit

In operation 1608, the one or more processors generate a model based on the selected D dimensions of the N preprocessed data points. For example, multiple candidate models may be constructed, each with a different set of candidate dimensions. Additionally, polynomial regression models of different degrees can be constructed, both in the logarithm normalized space, as well as in the raw, un-normalized space. A large number of candidate models may be constructed, and the choice of the most appropriate model requires a method to compare the model error of all the candidate models. Additionally, the "average error," "bad case error," and "worst case error" of a model all informs whether that model should be selected. A method is disclosed to enumerate all the candidate models, construct them, quantify their error, and compare the candidate models such that the best model may be selected based on a combination of factors. For example, the model with the lowest average error may be selected.

The one or more processors, in operation 1610, receives a request to identify a predicted value for an additional data point. For example, the request may be received using an API call over a network. The API call may include parameters that indicate the values for the additional data in point in each of the D dimensions. The logarithm of the values may be taken to preprocess the additional data point. The preprocessed additional data point is provided to the model as input and the predicted value for the additional data point is generated by the model as output. Thus, the predicted value is based on the additional point and the generated model. In operation 1612, the one or more processors respond to the request with the predicted value.

Example 1 is a computing device, comprising: one or more hardware processors; and a non-transitory computer-readable medium having stored thereon instructions that, when executed by the one or more hardware processors, cause the one or more hardware processors to perform operations including: generating a first number (N) of preprocessed data points from N data points, each data point of the N data points having data for a second number (C) of dimensions, by taking a logarithm of the data for each dimension of the C dimensions for each data point of the N data points; determining, based on a predetermined threshold and the N preprocessed data points, a third number (D) of dimensions to use for modeling the N preprocessed data points; selecting a plurality of dimension sets, wherein each dimension set includes, a different combination of the plurality of dimensions and includes no greater than D dimensions; for each dimension set, generating, via a machine learning model, a candidate model based on dimensions in the dimension set; determining a selected model from the candidate models based on a plurality of model quality measures from model testing results associated with the candidate models.

In Example 2, the subject matter of Example 1 includes, wherein the operations further comprise: receiving a request to identify a predicted value for an additional data point using the selected model, the additional data point including data on dimensions corresponding to the dimension set corresponding to the selected model; and based on the additional data point and the generated model, responding to the request with the predicted value.

In Example 3, the subject matter of Examples 1-2 includes, wherein the operations further comprise: determining, for a candidate number of dimensions, a number of bits of information per dimension (B) based on the candidate number of dimensions and the first number; and comparing B to the predetermined threshold.

In Example 4, the subject matter of Example 3 includes, (N).

In Example 5, the subject matter of Examples 3-4 includes, wherein the operations further comprise: based on a result of the comparing, rejecting the candidate number of dimensions.

In Example 6, the subject matter of Examples 1-5 includes, wherein the generating of the candidate model for each dimension set comprises generating a polynomial model.

In Example 7, the subject matter of Examples 1-6 includes, wherein the operations further comprise: generating the N data points by linking customer relationship management (CRM) and product usage data using shared identifiers.

In Example 8, the subject matter of Example 7 includes, wherein the operations further comprise: accessing CRM data that indicates a parent-subsidiary relationship between a parent account and a subsidiary account; and accessing first product usage data that is linked to both the parent account and the subsidiary account; wherein the generating of the N data points comprises generating a data point that links the first product usage data to the subsidiary account.

In Example 9, the subject matter of Example 8 includes, wherein the generating of the N data points excludes generating a second data point that links the first product usage data to the parent account.

Example 10 is a computer-implemented method, comprising: generating a first number (N) of preprocessed data points from N data points, each data point of the N data points having data for a second number (C) of dimensions, by taking a logarithm of the data for each dimension of the C dimensions for each data point of the N data points; determining, based on a predetermined threshold and the N preprocessed data points, a third number (D) of dimensions to use for modeling the N preprocessed data points; selecting a plurality of dimension sets, wherein each dimension set includes, a different combination of the plurality of dimensions and includes no greater than D dimensions; for each dimension set, generating, via a machine learning model, a candidate model based on dimensions in the dimension set; determining a selected model from the candidate models based on a plurality of model quality measures from model testing results associated with the candidate models.

In Example 11, the subject matter of Example 10 includes, receiving a request to identify a predicted value for an additional data point using the selected model, the additional data point including data on dimensions corresponding to the dimension set corresponding to the selected model; and based on the additional data point and the generated model, responding to the request with the predicted value.

In Example 12, the subject matter of Examples 10-11 includes, determining, for a candidate number of dimensions, a number of bits of information per dimension (B) based on the candidate number of dimensions and the first number; and comparing B to the predetermined threshold.

In Example 13, the subject matter of Example 12 includes, (N).

In Example 14, the subject matter of Examples 12-13 includes, based on a result of the comparing, rejecting the candidate number of dimensions.

In Example 15, the subject matter of Examples 10-14 includes, wherein the generating of the candidate model for each dimension set comprises generating a polynomial model.

In Example 16, the subject matter of Examples 10-15 includes, generating the N data points by linking customer relationship management (CRM) and product usage data using shared identifiers.

In Example 17, the subject matter of Example 16 includes, accessing CRM data that indicates a parent-subsidiary relationship between a parent account and a subsidiary account; and accessing first product usage data that is linked to both the parent account and the subsidiary account; wherein the generating of the N data points comprises generating a data point that links the first product usage data to the subsidiary account.

Example 18 is a non-transitory computer-readable medium having stored thereon instructions that, when executed by one or more processors, cause the one or more processors to perform operations including: generating a first number (N) of preprocessed data points from N data points, each data point of the N data points having data for a second number (C) of dimensions, by taking a logarithm of the data for each dimension of the C dimensions for each data point of the N data points; determining, based on a predetermined threshold and the N preprocessed data points, a third number (D) of dimensions to use for modeling the N preprocessed data points; selecting a plurality of dimension sets, wherein each dimension set includes, a different combination of the plurality of dimensions and includes no greater than D dimensions; for each dimension set, generating, via a machine learning model, a candidate model based on dimensions in the dimension set; determining a selected model from the candidate models based on a plurality of model quality measures from model testing results associated with the candidate models.

In Example 19, the subject matter of Example 18 includes, wherein the operations further comprise: receiving a request to identify a predicted value for an additional data point using the selected model, the additional data point including data on dimensions corresponding to the dimension set corresponding to the selected model; and based on the additional data point and the generated model, responding to the request with the predicted value.

In Example 20, the subject matter of Examples 18-19 includes, wherein the operations further comprise: determining, for a candidate number of dimensions, a number of bits of information per dimension (B) based on the candidate number of dimensions and the first number; and comparing B to the predetermined threshold.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

FIG. 17 is a flowchart illustrating an example process 1700 for evaluating models from data points and causing display of a user interface with information about the determined models. The example process 1700 can be implemented, for example, by a computing device that comprises a processor and a non-transitory computer-readable medium. The non-transitory computer readable medium can be storing instructions that, when executed by the processor, can cause the processor to perform the operations of the illustrated process 1700, Alternatively or additionally, the process 1700 can be implemented using a non-transitory computer-readable medium storing instructions that, when executed by one or more processors, case the one or more processors to perform the operations of the process 1700 of FIG. 17.

In operation 1702, the one or more processors generate a plurality of models based on N data points. Each data point of the N data points has data for a second number (C) of dimensions. The N data points may be preprocessed by taking a logarithm of the data values. The plurality of models may be generated based on various subsets of the C dimensions. For example, if C is 8, the number of dimensions used to generate the models may be only 3, and multiple models may be generated based on different combinations of one or more of 3 of the 8 available dimensions. Additionally, polynomial regression models of different degrees can be constructed, both in a logarithm normalized space, as well as in a raw, un-normalized space.

In operation 1704, the one or more processors determine, for each model in the plurality of models, a median model error. To determine the median model error for a model, the model error for each of the N data points is determined and the median value is selected. A large number of candidate models may be constructed, and the choice of the most appropriate model requires an algorithm to compare the model error of all the candidate models. One or more of the "average error," "bad case error," and "worst case error" of a model may additionally, or alternatively, inform whether that model should be selected. In other examples, $60^{th}$ percentile error, $80^{th}$ percentile error, or maximum error is used in place of the media model error.

The one or more processors, in operation 1706, causes a user interface to be presented on a display device. The user interface comprises the median model error of at least a subset of the plurality of models. For example, a table may be presented that identifies the dimensions used for each model and the resulting median model error, $60^{th}$ percentile error, $80^{th}$ percentile error, or maximum error for each model. The user interface may be operable to select one of the plurality of models. In response to detecting a user selection of one of the models, the model is used to predict values for additional data points.

Example 25 is a computing device, comprising: one or more hardware processors; and a non-transitory computer-readable medium having stored thereon instructions that, when executed by the one or more hardware processors, cause the one or more hardware processors to perform operations including: generating, using a machine learning model, a plurality of candidate models from a first number (N) data points based on a selected set of dimensions having a second number (C) dimensions, each data point of the N data points having data in the selected set of dimensions; for each model in the plurality of candidate models, determining at least a median model error; and causing a user interface to be presented on a display device, the user interface comprising at least the median model error of the plurality of candidate models.

In Example 26, the subject matter of Example 25, wherein the determining of the plurality of models comprises: determining C linear models based on logarithm normalized values for the N data points.

In Example 27, the subject matter of Examples 25-26, wherein the determining of the plurality of models comprises: determining C linear models based on un-normalized values for the N data points.

In Example 28, the subject matter of Examples 25-27, wherein the determining of the plurality of models comprises: determining $(_2^C)$ quadratic models based on logarithm normalized values for the N data points.

In Example 29, the subject matter of Examples 25-28, wherein the operations further comprise: for each model in the plurality of models, determining a 60th percentile model error; wherein the user interface further comprises the 60th percentile model error of the at least a subset of the plurality of models.

In Example 30, the subject matter of Examples 25-29, wherein the operations further comprise: for each model in the plurality of models, determining an 80th percentile model error; wherein the user interface further comprises the 80th percentile model error of the at least a subset of the plurality of models.

In Example 31, the subject matter of Examples 25-30, wherein the operations further comprise: in response to detecting, via the user interface, a user selection of a number of dimensions, causing display of the median model error of only models using the selected number of dimensions.

In Example 32, the subject matter of Examples 25-31, wherein: the determining of the plurality of models comprises determining a first model based on D dimensions of the N data points, D being an integer less than or equal to C; and the operations further comprise: determining a second model based on the D dimensions of M data points; determining a first coefficient vector for the first model; determining a second coefficient vector for the second model; determining a change value between the first model and the second model based on a difference between the first coefficient vector and the second coefficient vector; and causing display of a second user interface on the display device, the second user interface comprising the change value.

In Example 33, the subject matter of Example 32, wherein the determining of the change value is further based on a magnitude of the first coefficient vector.

In Example 34, the subject matter of Examples 32-33, wherein the M data points represent events occurring after events represented by the N data points.

Example 35 is a computer-implemented method, comprising: generating, by one or more processors using a machine learning model, a plurality of candidate models from a first number (N) data points based on a selected set of dimensions having a second number (C) dimensions, each data point of the N data points having data in the selected set of dimensions: for each model in the plurality of candidate models, determining at least a median model error; and causing a user interface to be presented on a display device, the user interface comprising at least the median model error of the plurality of candidate models.

In Example 36, the subject matter of Example 35, wherein the determining of the plurality of models comprises: determining C linear models based on logarithm normalized values for the N data points.

In Example 37, the subject matter of Examples 35-36, wherein the determining of the plurality of models comprises: determining C linear models based on un-normalized values for the N data points.

In Example 38, the subject matter of Examples 35-37, wherein the determining of the plurality of models comprises: determining $(_2^C)$ quadratic models based on logarithm normalized values for the N data points.

In Example 39, the subject matter of Examples 35-38 includes, for each model in the plurality of models, determining a 60th percentile model error; wherein the user interface further comprises the 60th percentile model error of the at least a subset of the plurality of models.

In Example 40, the subject matter of Examples 35-39 includes, for each model in the plurality of models, determining an 80th percentile model error; wherein the user interface further comprises the 80th percentile model error of the at least a subset of the plurality of models.

In Example 41, the subject matter of Examples 35-40 includes, in response to detecting, via the user interface, a user selection of a number of dimensions, causing display of the median model error of only models using the selected number of dimensions.

Example 42 is a non-transitory computer-readable medium having stored thereon instructions that, when executed by one or more processors, cause the one or more processors to perform operations including: generating, using a machine learning model, a plurality of candidate models from a first number (N) data points based on a selected set of dimensions having a second number (C) dimensions, each data point of the N data points having data in the selected set of dimensions; for each model in the plurality of candidate models, determining at least a median model error; and causing a user interface to be presented on a display device, the user interface comprising at least the median model error of the plurality of candidate models.

In Example 43, the subject matter of Example 42, wherein the determining of the plurality of models comprises: determining C linear models based on logarithm normalized values for the N data points.

In Example 44, the subject matter of Examples 42-43, wherein the determining of the plurality of models comprises: determining C linear models based on un-normalized values for the N data points.

Example 45 is at least one machine-readable medium including instructions that, when executed by processing circuitry, cause the processing circuitry to perform operations to implement any of Examples 25-44.

Example 46 is an apparatus comprising means to implement any of Examples 25-44.

Example 47 is a system to implement any of Examples 25-44.

Example 48 is a method to implement any of Examples 25-44.

FIG. 18 is a flowchart illustrating an example process 1800 for determining computing resources for a customer and causing display of a user interface with information about the determined computer resources. The example process 1800 can be implemented, for example, by a computing device that comprises a processor and a non-transitory computer-readable medium. The non-transitory computer readable medium can be storing instructions that, when executed by the processor, can cause the processor to perform the operations of the illustrated process 1800. Alternatively or additionally, the process 1800 can be implemented using a non-transitory computer-readable medium storing instructions that, when executed by one or more processors, case the one or more processors to perform the operations of the process 1800 of FIG. 18. The process 1800 may be performed in response to detecting that a customer's software performance falls below a predetermined threshold.

In operation 1802, the one or more processors select, based on data for a customer, a model from among a plurality of models. For example, data for the cluster may be used to select a cohort for the customer. Each cohort may have a different model for predicting computing resource usage by customers.

In operation 1804, the one or more processors determine a first quantity of computing resources for the customer based on time series analysis of the customer's recent quantity of computing resources using the selected model. For example, a cohort-wide ARIMA time series analysis of the customer's recent historical computing resource usage may be used to determine the first quantity of computing resources. The one or more processors, in operation 1806, determine a second quantity of computing resources for the customer based on static customer data. For example, a table may be used to look up the second quantity of computing resources based on a number of licenses granted to the customer.

Additional quantities of computing resources may be determined using other methods, such as determining a reactive quantity of computing resources based on the software performance of the customer, determining a modeled quantity of computing resources based on a non-cohort-specific model, determining a current amount of computing resources allocated to the customer, or any suitable combination thereof. In operation 1808, the one or more processors determine a third quantity of computing resources based on the first and second quantities of computing resources. Additional determined quantities of computing resources may also be used in operation 1808. For example, a mean or median value from the multiple determined quantities of computing resources may be used as the third quantity of computing resources.

In operation 1810, the one or more processors cause a user interface to be presented on a display device, the user interface comprising an indication of the determined third quantity of computing resources. The user interface may further comprise an indication of the first quantity of computing resources, the second quantity of computing resources, or other quantities of computing resources determined for the customer. The user interface may be operable to change the allocation of computing resources to the customer. For example, a user interaction with an element of the user interface may be detected and, in response, an amount of computing resources corresponding to the element (e.g., the first quantity of computing resources, the second quantity of computing resources, or the third quantity of computing resources) may be allocated to the customer.

Example 49 is a computing device, comprising: one or more hardware processors; and a non-transitory computer-readable medium having stored thereon instructions that, when executed by the one or more hardware processors, cause the one or more hardware processors to perform operations including: generating a plurality of candidate models using a machine learning model, wherein the plurality of candidate models are generated based on a plurality of dimension sets, wherein each dimension set includes, a different combination of a plurality of dimensions in a first set of data points; determining, using a selected model of the plurality of candidate models, a first quantity of computing resources or operating states of a software installation for a customer based on a second set of data points corresponding to a recent quantity of computing resources or operating states of the customer; determining a second quantity of computing resources or operating states of the software installation based on one or more of the following: static customer data, software performance data, and time series analysis of a quantity of computing resources or operating states of the customer; determining a third quantity of computing resources or operating states of the software installation based on the first quantity of computing resources or operating states and the second quantity of computing resources or operating states; and adjusting a parameter or operating state of the software installation according to the third quantity.

In Example 50, the subject matter of Example 49, wherein the operations further comprise: determining to adjust the parameter of the software installation based on a majority of the first quantity of computing resources, the second quantity of computing resources, and the third quantity of computing resources being larger than a current quantity of computing resources.

In Example 51, the subject matter of Example 50, wherein the operations further comprise: determining, as voting indicators, which of the first quantity of computing resources, the second quantity of computing resources, are larger than a current quantity of computing resources; wherein the determining of the third quantity of computing resources or operating states comprises selecting a quantity of computing resources from among the voting indicators.

In Example 52, the subject matter of Examples 49-51, wherein: the determining of the third quantity of computing resources or operating states comprises selecting, either the first quantity of computing resources or the second quantity of computing resources.

In Example 53, the subject matter of Examples 49-52, wherein: the determining of the third quantity of computing resources or operating states comprises selecting the larger of the first quantity of computing resources and the second quantity of computing resources.

In Example 54, the subject matter of Examples 49-53, wherein the parameter of the software installation for the customer is adjusted based on the first quantity of computing resources being larger than a current quantity of computing resources.

In Example 55, the subject matter of Examples 49-54, wherein the determining of the second quantity of computing resources or operating states of the software installation is based on the static customer data.

In Example 56, the subject matter of Examples 49-55, wherein the determining of the second quantity of computing resources or operating states of the software installation is based on the software performance data.

In Example 57, the subject matter of Examples 49-56, wherein the determining of the second quantity of computing resources or operating states of the software installation is based on the time series analysis of the quantity of computing resources or operating states of the customer.

Example 58 is a computer-implemented method, comprising: generating, by one or more hardware processors, a plurality of candidate models using a machine learning model, wherein the plurality of candidate models are generated based on a plurality of dimension sets, wherein each dimension set includes, a different combination of a plurality of dimensions in a first set of data points; determining, using a selected model of the plurality of candidate models, a first quantity of computing resources or operating states of a software installation for a customer based on a second set of data points corresponding to a recent quantity of computing resources or operating states of the customer; determining a second quantity of computing resources or operating states of the software installation based on one or more of the following: static customer data, software performance data, and time series analysis of a quantity of computing resources or operating states of the customer; determining a third quantity of computing resources or operating states of the software installation based on the first quantity of computing resources or operating states and the second quantity of computing resources or operating states; and adjusting a parameter or operating state of the software installation according to the third quantity.

In Example 59, the subject matter of Example 58 includes determining to adjust the parameter of the software installation based on a majority of the first quantity of computing resources, the second quantity of computing resources, and the third quantity of computing resources being larger than a current quantity of computing resources.

In Example 60, the subject matter of Example 59 includes determining, as voting indicators, which of the first quantity of computing resources, the second quantity of computing resources, are larger than the current quantity of computing resources; wherein the determining of the third quantity of computing resources or operating states comprises selecting a quantity of computing resources from among the voting indicators.

In Example 61, the subject matter of Examples 58-60, wherein: the determining of the third quantity of computing resources or operating states comprises selecting either the first quantity of computing resources or the second quantity of computing resources.

In Example 62, the subject matter of Examples 58-61, wherein: the determining of the third quantity of computing resources or operating states comprises selecting the larger of the first quantity of computing resources and the second quantity of computing resources.

In Example 63, the subject matter of Examples 58-62, wherein the parameter of the software installation for the customer is adjusted based on the first quantity of computing resources being larger than a current quantity of computing resources.

In Example 64, the subject matter of Examples 58-63, wherein the determining of the second quantity of computing resources or operating states of the software installation is based on the static customer data.

In Example 65, the subject matter of Examples 58-64, wherein the determining of the second quantity of computing resources or operating states of the software installation is based on the software performance data.

Example 66 is a non-transitory computer-readable medium having stored thereon instructions that, when executed by one or more processors, cause the one or more processors to perform operations including: generating a plurality of candidate models using a machine learning model, wherein the plurality of candidate models are generated based on a plurality of dimension sets, wherein each dimension set includes, a different combination of a plurality of dimensions in a first set of data points; determining, using a selected model of the plurality of candidate models, a first quantity of computing resources or operating states of a software installation for a customer based on a second set of data points corresponding to a recent quantity of computing resources or operating states of the customer; determining a second quantity of computing resources or operating states of the software installation based on one or more of the following: static customer data, software performance data, and time series analysis of a quantity of computing resources or operating states of the customer; determining a third quantity of computing resources or operating states of the software installation based on the first quantity of computing resources or operating states and the second quantity of computing resources or operating states; and adjusting a parameter or operating state of the software installation according to the third quantity.

In Example 67, the subject matter of Example 66, wherein the operations further comprise: determining to adjust the parameter of the software installation based on a majority of the first quantity of computing resources, the second quantity of computing resources, and the third quantity of computing resources being larger than a current quantity of computing resources.

In Example 68, the subject matter of Example 67, wherein the operations further comprise: determining, as voting indicators, which of the first quantity of computing resources, the second quantity of computing resources, are larger than the current quantity of computing resources; wherein the determining of the third quantity of computing resources or operating states comprises selecting a quantity of computing resources from among the voting indicators.

Example 69 is at least one machine-readable medium including instructions that, when executed by processing circuitry, cause the processing circuitry to perform operations to implement any of Examples 49-68.

Example 70 is an apparatus comprising means to implement any of Examples 49-68.

Example 71 is a system to implement any of Examples 49-68.

Example 72 is a method to implement any of Examples 49-68.

Figure 19:
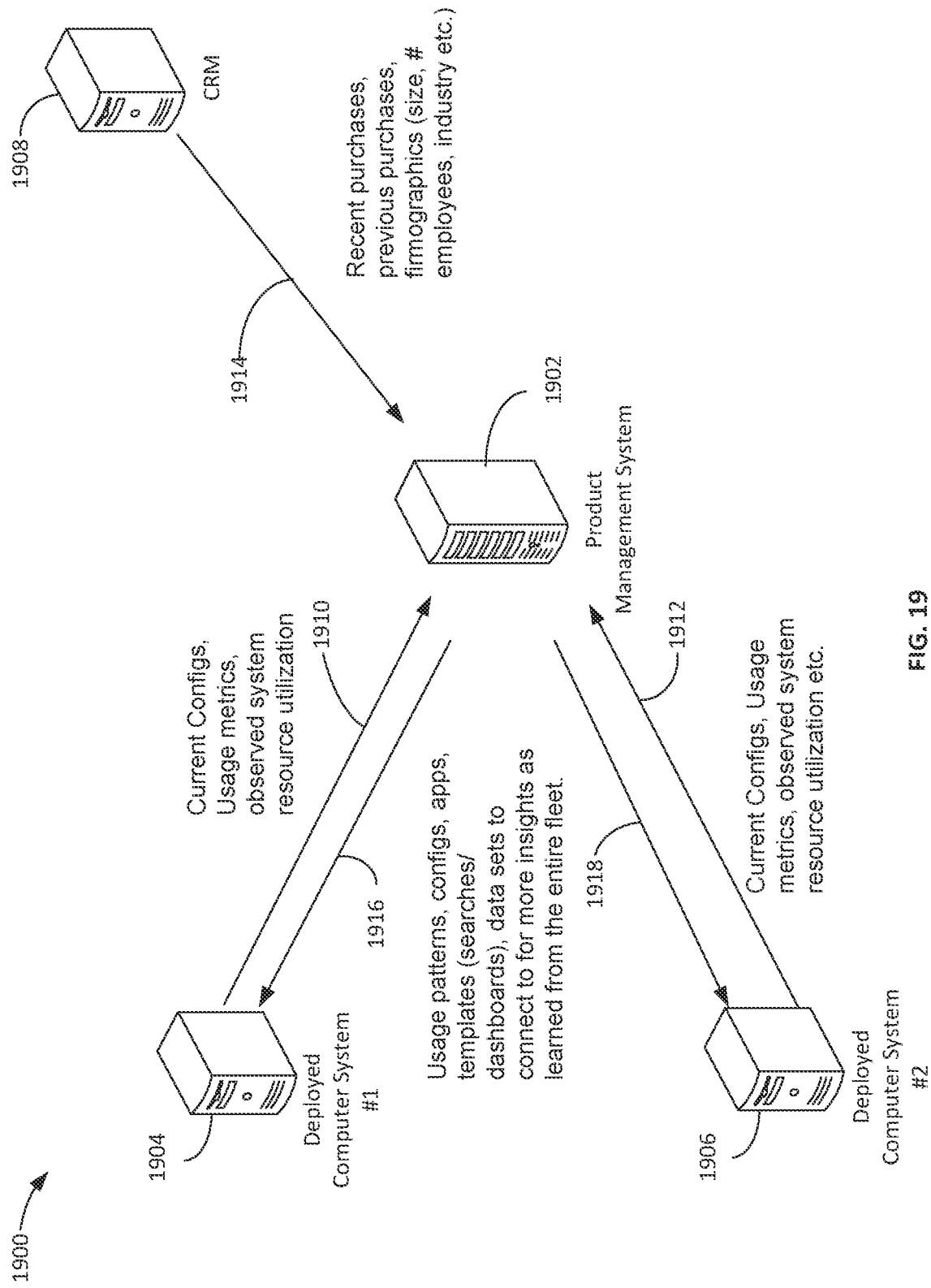
FIG. 19 is an overview diagram of a computing system implementing one or more of the disclosed examples.

FIG. 19 is an overview diagram of a computing system implementing one or more of the disclosed examples. The computing system may be utilized to implement one or more of the methods and systems for customer cohort identification described herein. FIG. 19 shows a product management system 1902 in communication with two deployed computer systems, a first deployed computer system 1904 and a second deployed computer system 1906. The first deployed computer system 1904 and the second deployed computer system 1906 are both examples of a data intake and query system. Each of deployed computer systems 1902 and 1904 may further be examples of systems utilized by a customer of XYZ Company. The product management system 1902 trains a model based on input from each of the first deployed computer system 1904 and second deployed computer system 1906. For example, each of the first deployed computer system 1904 and the second deployed computer system 1906 provide usage information and resource utilization information, installed product information to the product management system 1902. This supplied information is shown as message 1910 and message 1912, transmitted by the first deployed computer system 1904 and the second deployed computer system 1906 respectively.

The product management system 1902 also receives customer relational information from a customer relationship management (CRM) system 1908, via a CRM info message 1914. The CRI system 1908 provides information pertaining to a plurality of customers. Information such as recent purchases, previous purchases, firmographics (e.g., data regarding the customer, such as data analogous to demographic information of a user). Firmographics includes, in various examples, one or more of a number of employees at the customer, the customer's line of business/industry, terms of the customer's license, or other information. In some examples, the product management system 1902 trains the model based on the CRM information received from the CRI system 1908, as discussed below.

As shown in FIG. 19, product management system 1902 receives product usage data from each of deployed computer systems 1903 and 1906, including: current configurations, usage metrics, and observed system resource utilization. This product usage data may be received via messages 1910 and 1912.

One or more trained models, as described, may be generated and maintained at the product management system 1902. In some embodiments, one or more of the trained models is provided by the product management system 1902 to each of the first deployed computer system 1904 and the second deployed computer system 1906 via a first deployment message 1916 and a second deployment message 1918. A selected trained model maps usage information determined locally at each of the first deployed computer system 1904 and deployed computer system 1906 to one of a plurality of predefined states. Each of the predefined states define values for a plurality of configuration parameters. Each of the first deployed computer system 1904 and the second deployed computer system 1906 determine, from the model, which of the predefined states is appropriate for their current operating environment. Based on the predefined state most appropriate for their operating environment, each of the first deployed computer system 1904 and second deployed computer system 1906 update their operating system parameters defined by the predefined state.

Figure 20:
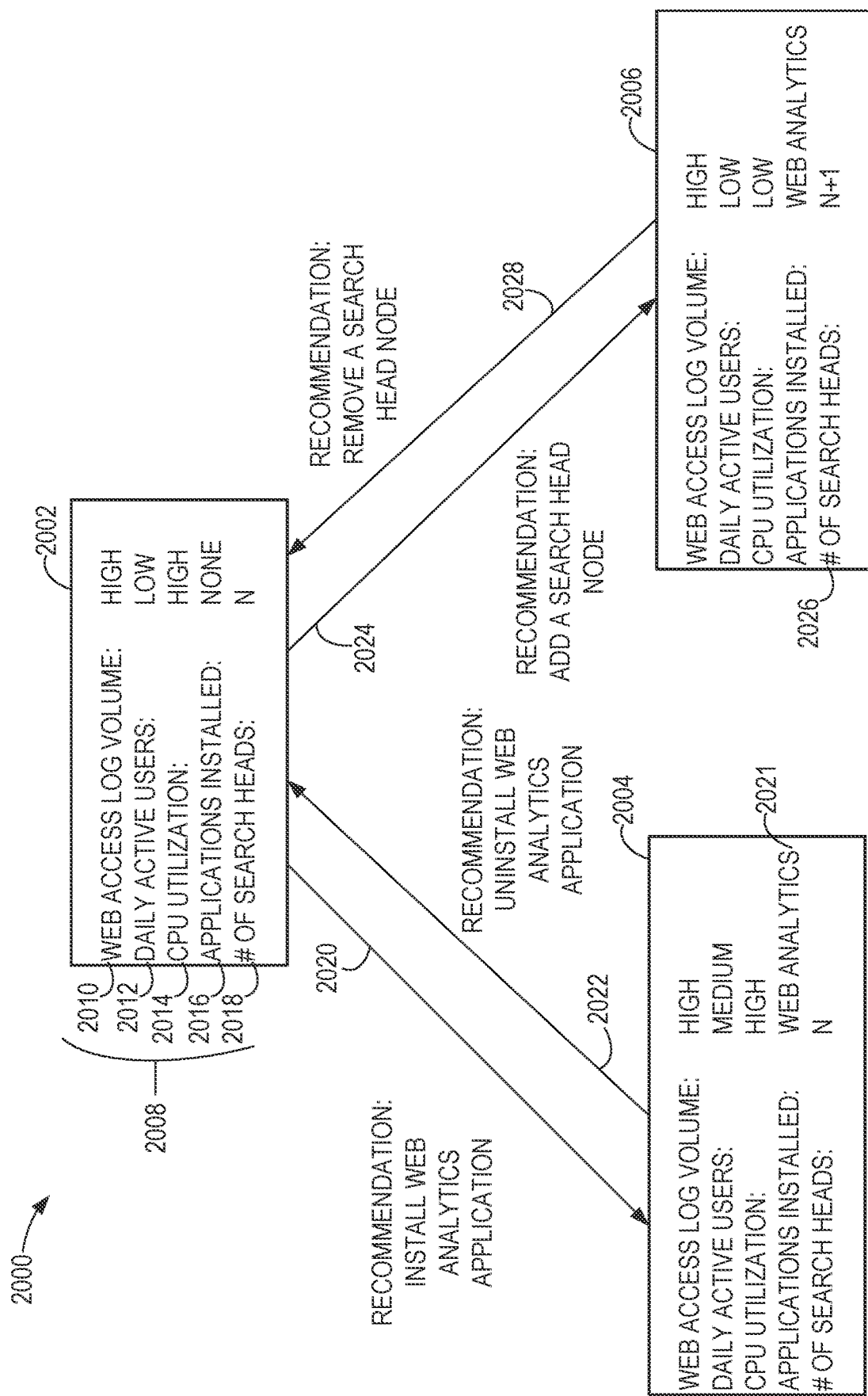
FIG. 20 is a state transition diagram illustrating example state transitions implemented in one or more of the disclosed embodiments.

FIG. 20 is a state transition diagram 2000 illustrating example state transitions implemented in one or more of the disclosed embodiments. FIG. 20 shows three states, a first state 2002, a second state 2004, and a third state 2006. Each state is defined by a plurality of parameter values, such as parameter values 2008. In the example of FIG. 20, the parameter values 2008 include a web access log volume 2010, a number of daily active users 2012, CPU utilization 2014, a list of installed applications 2016, and a number of search heads parameter 2018.

FIG. 20 shows that, while an example installation of a software program is operating in the first state 2002, it receives a recommendation from a model to install a "web analytics" application. This causes a state transition 2020 from the first state 2002 to the second state 2004. Due to the state transition 2020, the example installation of a software program implementing the second state 2004 initiates an installation of a "web analytics" application, as defined by the second state 2004. Thus, the parameter 2021 shows that, as a result of operating in the second state 2004, the example installation of a software program installs the "web analytics" application.

FIG. 20 also shows a state transition 2022 from the second state 2004 back to the first state 2002. The state transition 2022 is in response, in at least some embodiments, to output from a machine learning model indicating that the first state 2002 is preferred or recommended for an installation of a software program given a current set of operational parameter values. As a result, the example installation of a software program uninstalls the "web analytics" application, as reflected in the list of installed applications 2016.

FIG. 20 further illustrates a state transition 2024 that indicates a recommendation to add a search node. As a result, the example installation of a software program transitions from the first state 2002 to the third state 2006. As a result of operating in the third state 2006, the example installation of a software program increases the number of search heads from a number indicated by the number of search heads parameter 2018 to a different number of search heads shown by the parameter 2026.

FIG. 20 further shows a state transition 2028 from the third state 2006 back to the first state 2002 based on a recommendation from a model to reduce a number of search heads from the number specified by the parameter 2026 to the number specified by the number of search heads parameter 2018. Thus, the example installation of a software program operates in the first state 2002.

Figure 21:
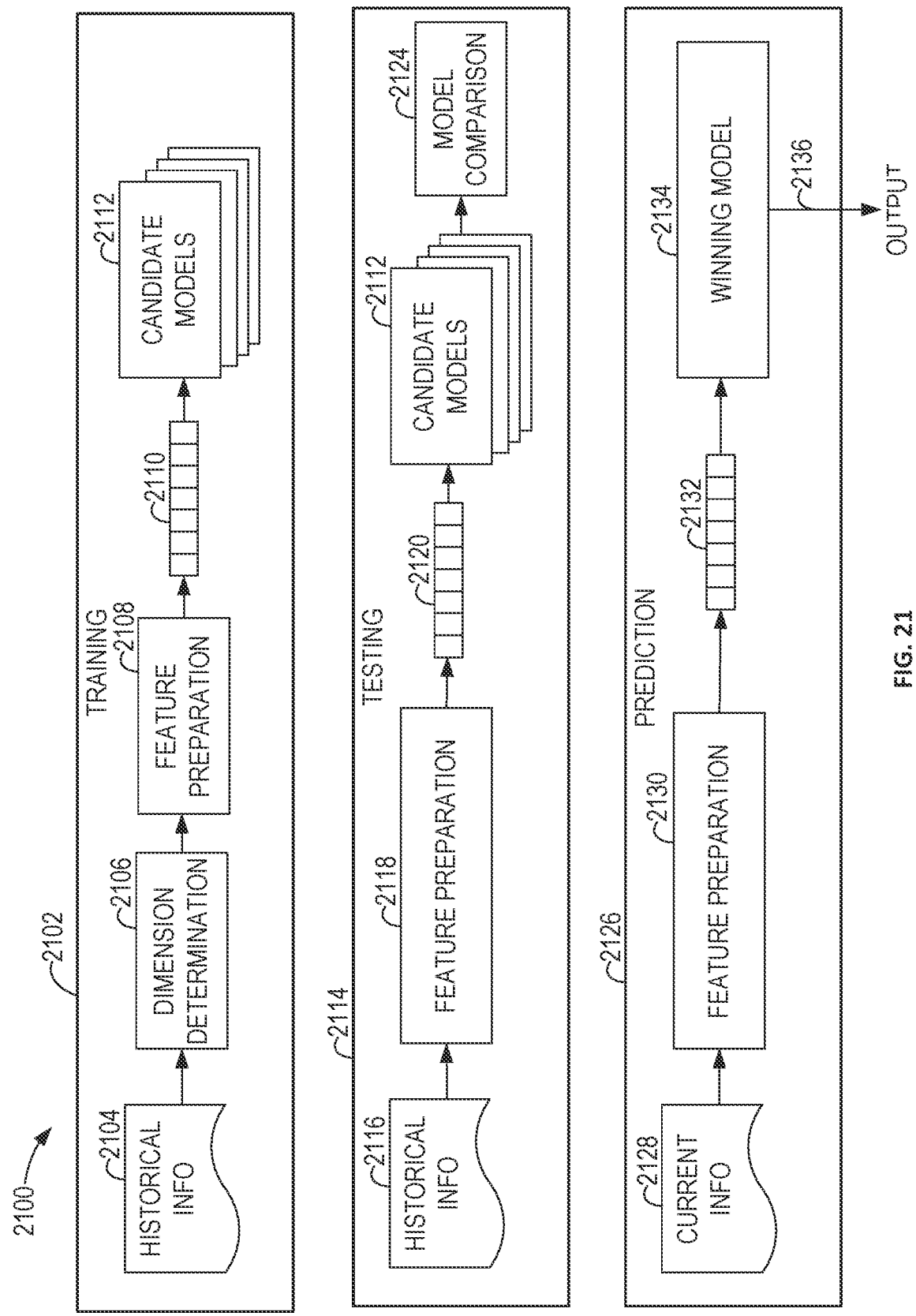
FIG. 21 shows an example machine learning module according to some examples of the present disclosure.

FIG. 21 shows an example machine learning module 2100 according to some examples of the present disclosure. In various embodiments, machine learning module 2100 is deployed by product management system 1902. Machine learning module 2100 utilizes a training module 2102, a testing module 2114, and a prediction module 2126. The training module 2102 inputs historical information 2104 into dimension determination module 2106. The historical information 2104 represents, in some embodiments, a training database that stores training data for training a clustering algorithm. In some embodiments, the historical information 2104 is labeled. Example historical information includes operational parameter values experienced by a plurality of different installations of the software program. Historical information may also include CRM data, or customer relational information, provided by the CRM system. The historical operational parameters values are associated, via the training data store, preferred or recommended states of the installation of a software program. Labels included in the training library indicate which operational parameter values are commended or preferred given the historical operational parameter values included in the historical information 2104.

The dimension determination module 2106 determines a number of dimensions of the historical information 2104 to use for modeling, as previously described, and with reference to FIG. 16. Once the number of dimensions is determined, various combinations of dimensions may be selected to train and generate a model.

The feature preparation module 2108 prepares data for modeling. For each combination of dimensions, feature preparation module 2108 determines and configures one or more features 2110 from this historical information 2104 based on the corresponding dimensions. Stated generally, features 2110 are a set of the information input and are determined to be predictive of a particular outcome. In some examples, the features 2110 may be all the historical information 2104, but in other examples, the features 2110 are a subset of the historical information 2104. For example, a base-10 or base-2 logarithm of the historical data values may be taken before modeling is performed.

The prepared features 2110 are used by machine learning module 2100 to prepare candidate models 2112 via training. A different candidate model 2112 is prepared for each different combination of dimensions. For example, if the historical information 2104 comprises N data points of C dimensions each and the dimension determination module 2106 determines that D of the C dimensions should be used for modeling, there are C/D combinations of candidate input dimensions and C/D candidate models 2112. A model comprises identification of the D dimensions taken as inputs and a function of those D dimensions to generate an output.

The testing module 2114 determines which of the candidate models 2112 to use for modeling based on various cohort quality measures. Different historical information 2116 is used for testing. For example, a large data set may be divided into a training set and a testing set (e.g., with 90% of the data points randomly selected to be in the training set and the remaining 10% composing the testing set). As another example, data from a first period of time may be used as the training set and data from a second period of time may be used as the testing set. The feature preparation module 2118 prepares the features of the historical information 2118 for modeling based on the selected dimensions corresponding to the particular candidate model. The prepared features 2120 are provided to the corresponding candidate models 2112 and an error measure for each candidate model 2112 is determined (e.g., the mean distance between each data point and the predicted value from the model), as previously described and with reference to FIG. 17. The error measures are compared by the model comparison module 2124 and a winning model is selected based on various cohort quality measures. For example, the candidate model 2112 with the lowest median error may be selected as the winning model.

In the prediction module 2126, current information 2128 may be input to the feature preparation module 2130. The current information 2128 in the disclosed embodiments include similar indications of that described above with respect to the historical information 2104 and the historical information 2116. The current information 2128 may correspond to product usage of a target customer to be modeled. For example, an installation of a computer program provides, in various embodiments, one or more of the operational parameter values discussed above, that characterize a current operating environment of the installation.

Feature preparation module 2130 determines, in some embodiments, an equivalent set of features or a different set of features from the current information 2128 as the feature preparation modules 2108 and 2118. In some examples, the feature preparation modules 2108, 2118, and 2130 are the same module. The feature determination module 2130 produces the features 2132, based on the particular combination of dimensions corresponding to the winning model, which are input into the winning model 2134 to generate an identification of a modeled value based on the current information 2128. For example, the output of the model may correspond to selection of a preferred or recommended operating state of an installation of a software program.

The training module 2102 may operate in an offline manner to generate the candidate models 2112. The training module 2102 also operates, in some embodiments, in an online manner. For example, some embodiments of the training module 2102 receive historical information 2104 from one or more installations of a software program and use this information to generate the candidate models 2112. This also applies to the testing module 2114. In some embodiments, testing module 2114 may be the same module, or a different configuration of, training module 2102.

The prediction module 2126, generally operates locally at an installation of a software program. For example, the prediction module 2126 may be implemented by product management system 1902. However prediction module 2126 may also be implemented on any one of the systems described with reference to FIG. 19. The installation invokes the winning model 2134 to determine whether installation of software on customer systems corresponding to the target customer should transition from an existing or first operating state to a second operating state, as discussed above. In some embodiments, this determination may be based on software configuration characteristics of a cohort that the target customer is associated with by the winning model.

In some embodiments, the winning model 2134 is made available via a web service or other technology that provides for remote invocation of the model. For example, in some embodiments, the product deployment server 1902 executes the winning model 2134, and each of the installations of a software program (e.g. 1904 and/or 1906) remotely provide input (e.g. current information 2128) to the winning model 2134 executing at the product management server 1902. As discussed above, the winning model 2134 may be periodically updated via additional training and/or user feedback.

The prediction module 2126 generates one or more outputs 2136. The outputs include, in some embodiments, a selection of a recommended or preferred operating mode or state of an installation of a software product.

The candidate models 2112 may be generated using many different algorithms. Examples of modeling algorithms include linear regression, decision trees, support vector regression, lasso regression, and random forests.

Figure 22:
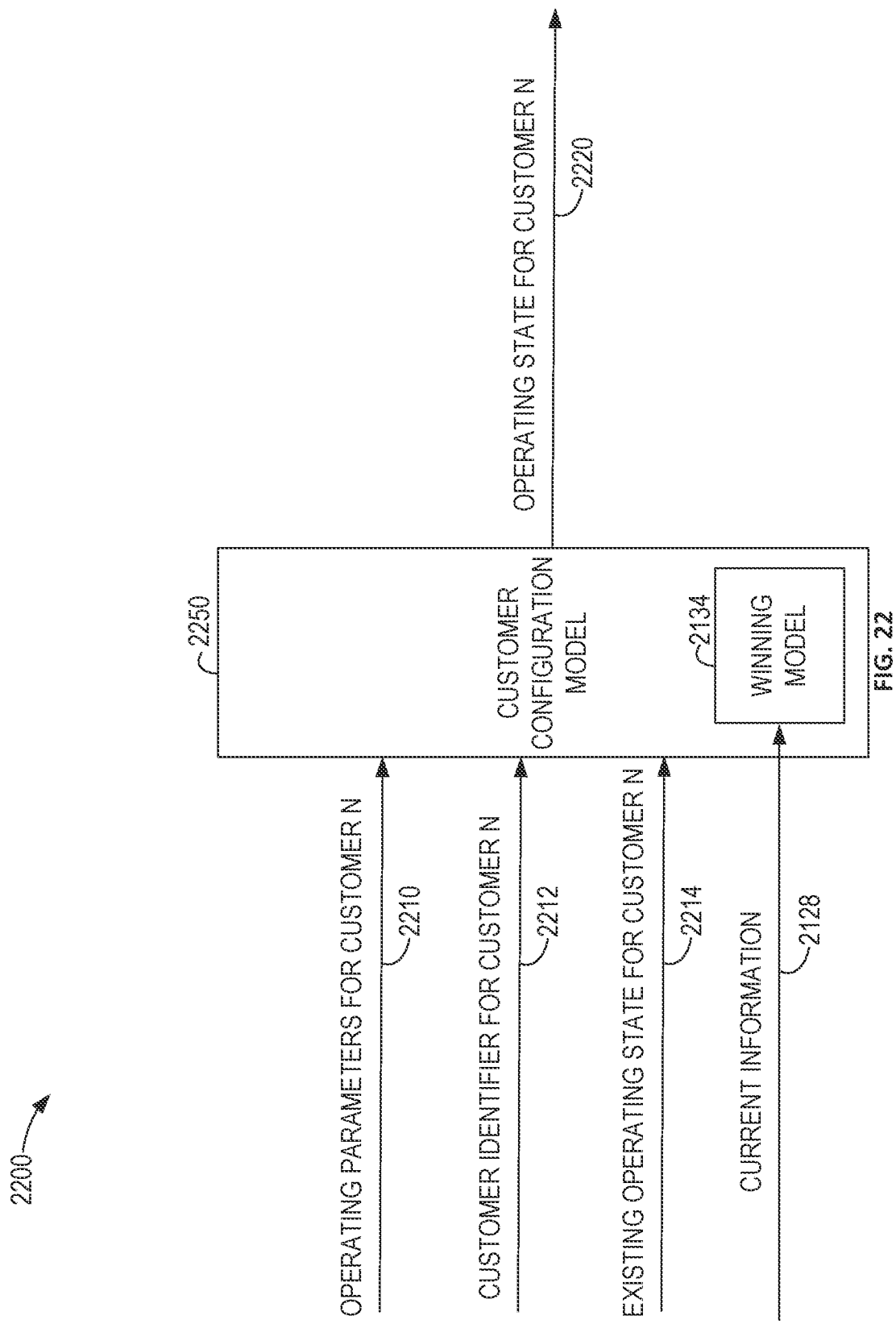
FIG. 22 illustrates data flow during a model training process that is implemented in one or more of the disclosed embodiments.

FIG. 22 illustrates data flow during a customer configuration model usage process that is implemented in one or more of the disclosed embodiments. The data flow 2200 shows operating parameter values 2210 of an installation of a software program for a customer being provided to customer configuration model 2250, In various embodiments, customer configuration model 2250 may be a model including the winning model 2134. In some embodiments customer configuration model 2250 is the same model as the winning model. Based on the current information 2128 being input into the winning model 2134, as described with reference to prediction module 2126, the product usage information may be predicted and analyzed. Based on the operating parameter values 2210, a customer identifier 2212, and an existing operating state of the customer 2214, the customer configuration module 2250 identifies a recommended or selected operating state 2220 for the target customer's software installation.

Thus, the data flow 2200 illustrated with respect to FIG. 22 relies, in at least some embodiments, on the winning model 2134 resulting from the machine learning module 2100. As shown in FIG. 22, a deployed computer system (1904 or 1906) provides operating parameter values 2210 and a customer identifier 2212 to the customer configuration model. Based on the provided operating parameter values 2210 and the customer identifier 2212, and the existing operating state 2214, the customer configuration module 2250 generates an operating state indicator 2220. The operating state indicator 2220 indicates a suggested operating state for the installation of a software program to operate in, based on the installation of the software program's operating parameter values 2210.

As discussed above, the operating state defines a plurality of parameters or sub-states that govern operation of the installation of a software program. These include, for example, a number of search heads, a number of processing threads, a list of installed applications, or other configuration information. The winning model 2134 utilizes the customer identifier 2212 to identify an existing operating state of the customer, which can affect, which operating state is recommended or selected via the operating state indicator 2220.

Figure 23:
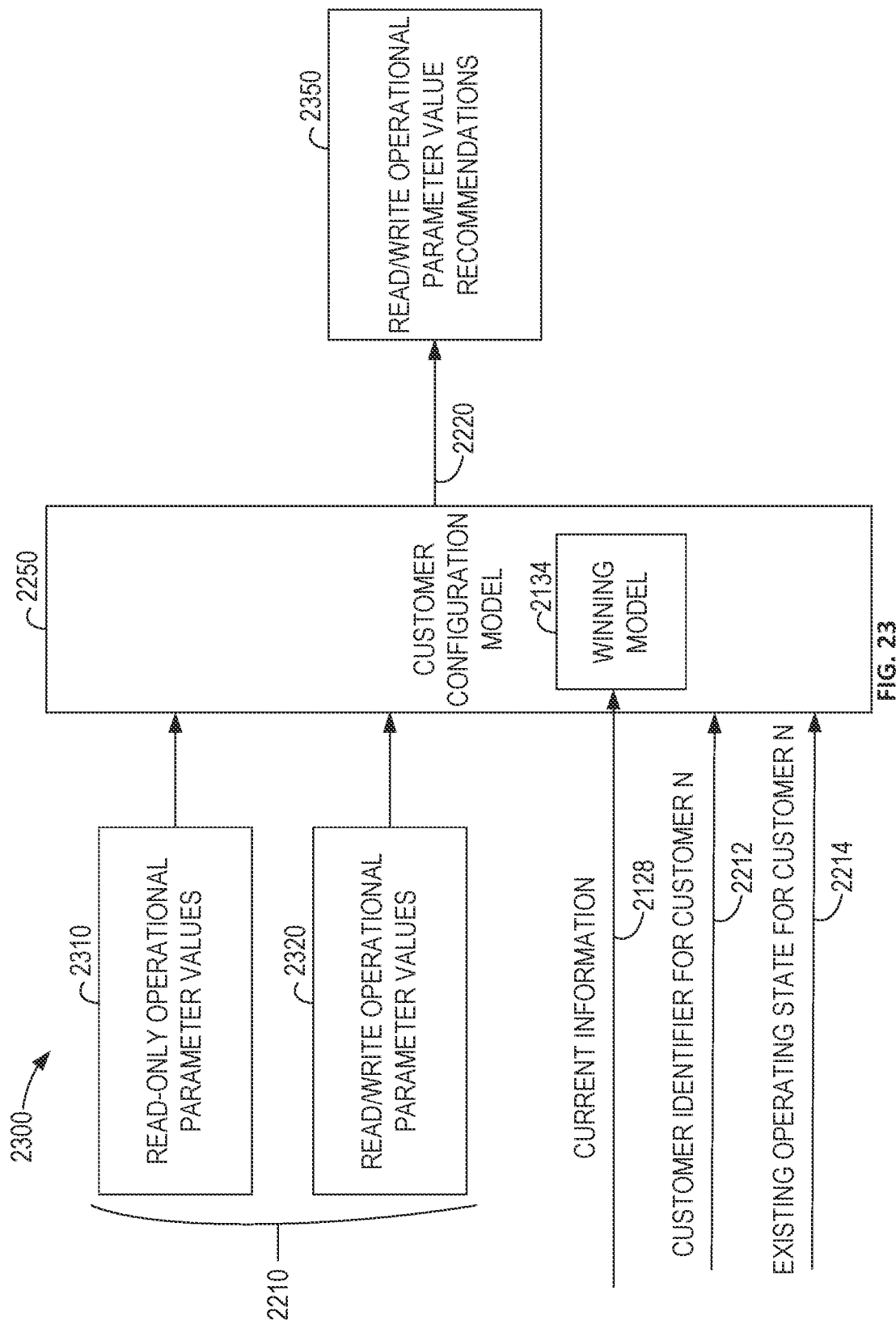
FIG. 23 illustrates data flow through a model in one or more of the disclosed embodiments.

FIG. 23 illustrates data flow through a customer configuration model in one or more of the disclosed embodiments. The data flow 2300 shows the customer configuration model 2250 being provided with operational parameter values 2210, a customer identifier 2212, and an indication of an existing operating state 2214 of an installation of a software program at the customer. Input 2210, 2212, and 2214 may be transmitted by, or received from, a deployed computer system (1904 or 1906) of the customer.

The operational parameter values 2210 both include read-only operational parameter values 2310 and read/write operational parameter values 2320. The read-only operational parameter values 2310 are those that cannot be directly modified based on, for example, output from the customer configuration model. Some examples of read-only operational parameter values include resource utilization metrics, such as CPU utilization, memory utilization, or performance metrics, such as latency or throughput metrics. Read/write operational parameter values 2320 are those that can be modified directly by the disclosed embodiments, for example, based on the operating state indicator 2220 output by the winning model 2134. These include, for example, a list of applications installed as part of an installation of a software program, a number of search heads (e.g., an instance that distributes searches to other indexers, and in some embodiments, does not include any indexes itself, or a reception point or process for incoming computational requests), a number of processing threads, or other parameters.

As discussed above, the customer configuration model outputs predefined states 2220 for one or more operational parameter values. The selected operating state 2220 may include only read/write operational parameter value recommendations 2350. Customer configuration model 2250 thus relies on output from the winning model 2134 to determine operational parameter values according to those defined by the state indicated by the predicted product usage.

Figure 24:
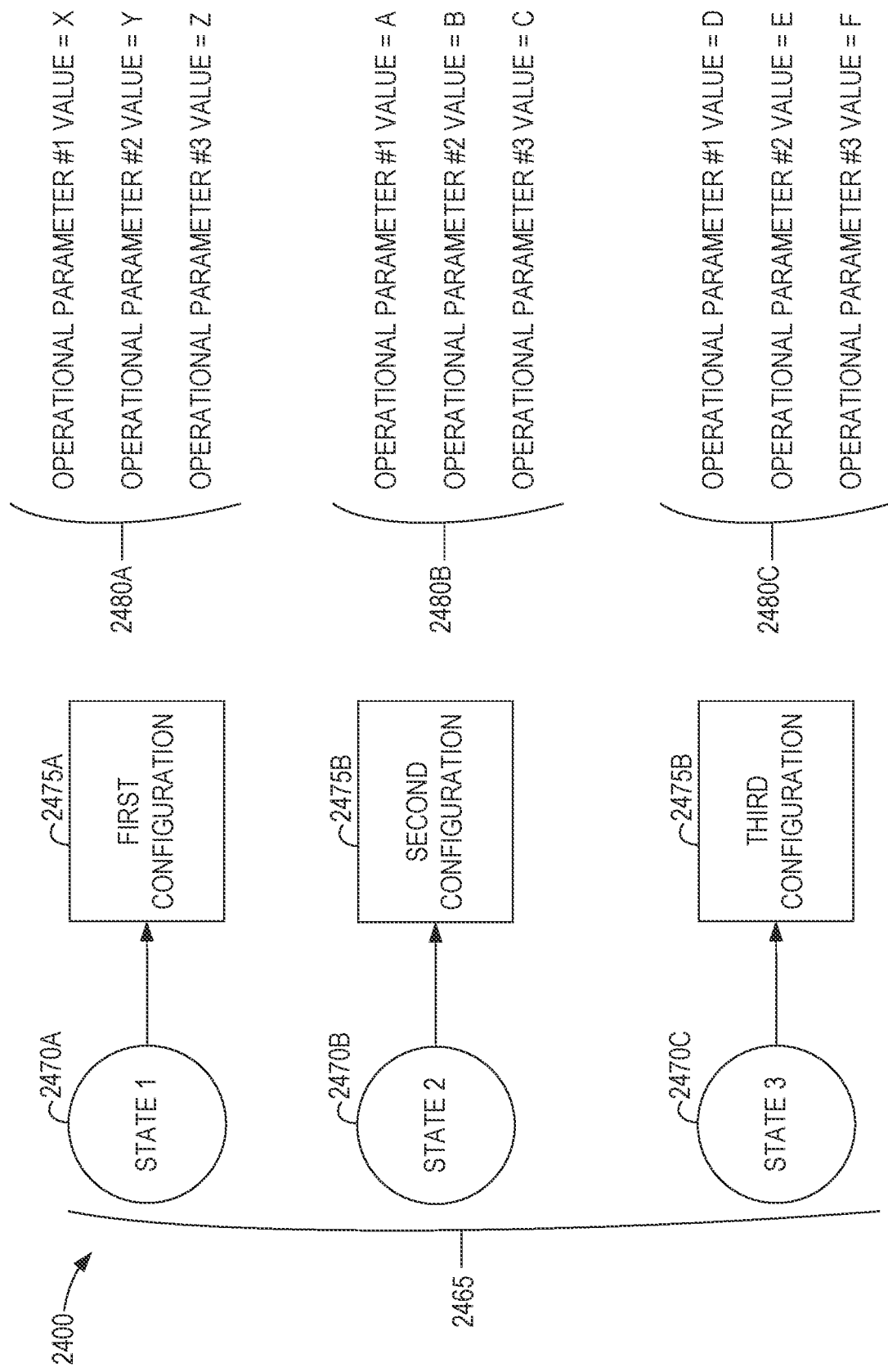
FIG. 24 illustrates a mapping from a plurality of pre-defined states to configurations defining or associated with operational parameter values.

FIG. 24 illustrates a mapping 2400 from a plurality of predefined states 2465 to configurations defining or being associated with operational parameter values. The plurality of predefined states 2465 include a first state 2470A, a second state 2470B, and a third state 2470C. Each state maps to a first configuration 2475A, a second configuration 2475B, or a third configuration 2475C, respectively. Each configuration defines a plurality of operational parameter values associated with the particular configuration. For example, the first configuration 2475A defines a first plurality of operational parameter values 2480A. The second configuration 2475B defines a second plurality of operational parameter values 2480B. The third configuration 2475C defines a third plurality of operational parameter values 2480C.

As discussed above, in some embodiments, a machine learning model is trained so as to select one of a plurality of predefined states, such as one of the states 2470A-2470C illustrated in FIG. 24. In some embodiments, when an installation of a software program receives an indication of a selected state from the model, the installation of a software program is able to map from the selected state to a configuration, in a similar manner to that illustrated in FIG. 24 (e.g., the first state 2470A maps to the first configuration 2475A). The configuration defines a plurality of operational parameter values, as also illustrated in FIG. 24 (e.g. the first configuration 2475A defines operational parameter values 2480A).

Some examples of specific operational parameter values associated with one or more of the states 2470A-2470C include one or more of a number of search heads utilized by the installation, a set of installed applications included in the installation of the software program, a number of computer processors executing one or more processes of the installation of the software program, a memory size of a computer allocated for execution of the installation of the software program, a number of computing instances allocated for execution of the installation of the software program, a number of storage devices, utilized or allocated to the installation, a type of one or more storage devices in use by the installation, a type of memory device used by the installation, a topology definition describing how computing instances are interconnected and how they connection is configured, a level of data replication, an algorithm for data resiliency or fault recovery, a data compression algorithm, a list of user limits or capability (e.g. for a plurality of users), an application limit or capability, a number of workload pools (e.g. units and aggregations around which performance-related resource allocations and configurations are applied), a resource allocation to each workload pool, a data retention policy of one or more computing instances of the installation, an amount of pre-processing of incoming data, a type of pre-processing of incoming data, a definition of a schedule of automated computations performed by the installation, a definition of automated generation of notifications generated by the installation, a measurement of a number of concurrent computations, an order of computations, a level of fan-in and fan-out for data flows (e.g. degrees of parallelism in aggregating results of computations from different locations or subroutines, degrees of parallelism in distributing computation tasks to different locations or subroutines), a definition of which features of the installation are enabled and which features of the installation are disabled.

Figure 25:
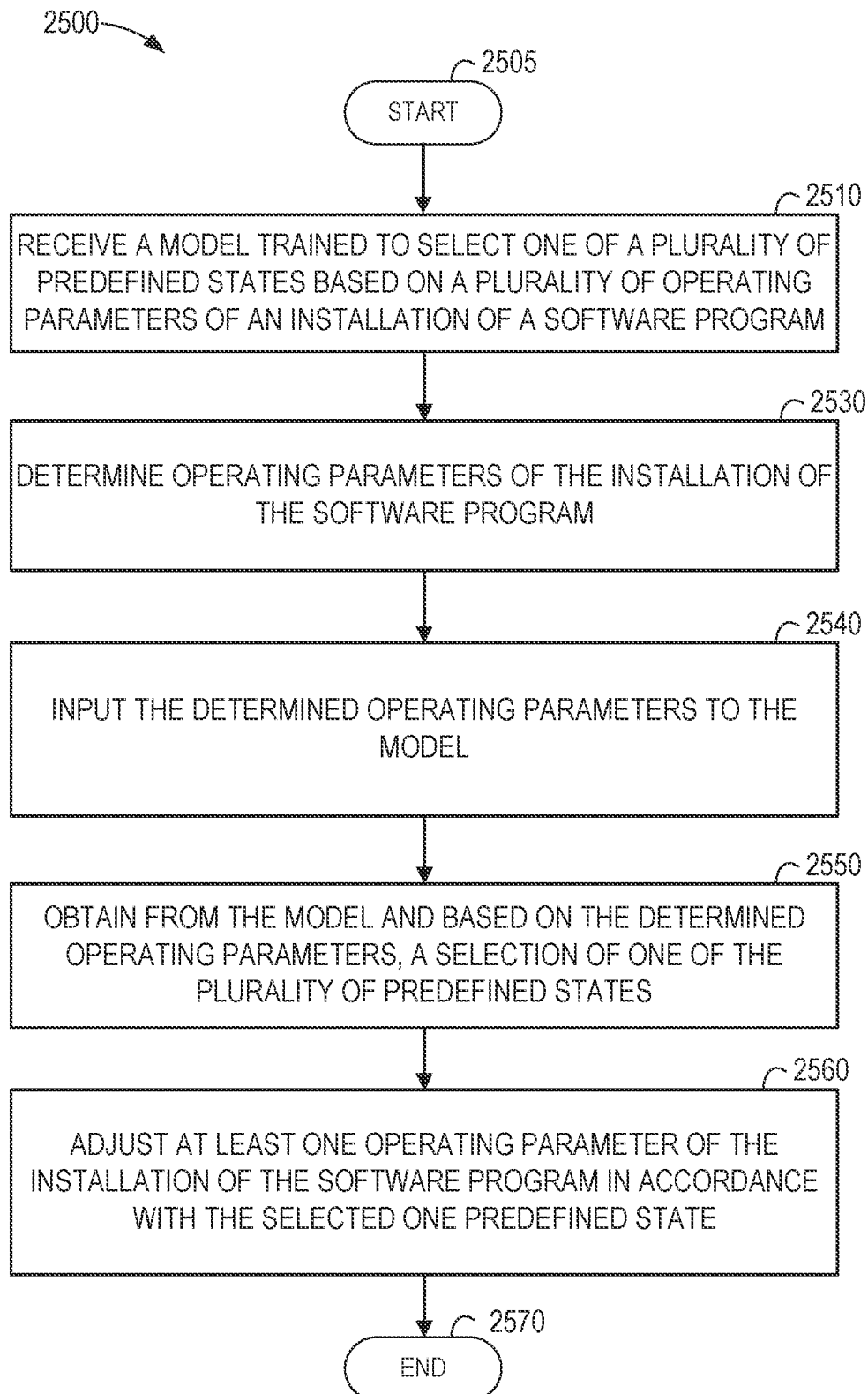
FIG. 25 is a flowchart of an example method for operating an installation of a software program.

FIG. 25 is a flowchart of an example method 2500 for operating an installation of a software program (e.g. the first installation of a software program 1904 and/or the second installation of a software program 1906). In some embodiments, one or more of the functions discussed below with respect to FIG. 25 and method 2500 is performed by hardware processing circuitry. For example, in some embodiments, instructions stored in a memory configure hardware processing circuitry to perform one or more of the functions discussed below with respect to FIG. 25. In some embodiments, the method 2500 is performed by the first installation of a software program 1904 and/or the second installation of a software program 1906).

After start operation 2505, method 2500 moves to operation 2510, where a model is received or otherwise obtained. The model, such as customer configuration model 2250, is obtained, in some embodiments, from a product management system, such as the product management system 1902, discussed above with respect to FIG. 19. The model is trained to select one of a predefined set of operating states based on operating parameters of an installation of a software program. In some embodiments, the plurality of operating parameters include a list of applications installed on the installation of a software program, a number of configured and/or active users, a number of search heads, one or more resource utilization measurements, such as CPU utilization, memory utilization, or a rate of access of log data. In some embodiments, the plurality of operating parameters includes one or more performance metrics, such as one or more latency metrics, or one or more throughput metrics. In some embodiments, the plurality of operating parameters include configuration parameters, such as a number of computer processors, a number of computing instances, a number of processing threads, a number of computing instances, a memory size, a swap space size, available disk memory, available swap memory, or other configuration parameters. Other operational parameter values associated with each of the predefined states is discussed above, for example, with respect to FIG. 24.

In operation 2530, operating parameters of the installation of a software program are collected or measured. For example, in embodiments that include resource utilization and/or performance metrics in their set of operating parameters, operation 2530 includes, in some embodiments, recording values of these parameters. A list of applications installed on the installation of a software program is similarly updated and/or recorded in some embodiments. In some embodiments, collecting or measuring operating parameters includes copying or storing configuration files that define one or more operating parameter values.

In some embodiments, operation 2530 includes collecting or measuring one or more of, during a predefined time period, a number of active users (e.g. users who have logged in within a predefined time period), a number of active users having each of a plurality of different predefined sets of access privileges or capabilities, workload characteristics of the installation, CPU utilization, memory utilization, utilization of storage media, available read or write bandwidth of storage media, network utilization, a rate of ingestion of log data, a rate of access of log data, a profile of ingested log data categories, a profile of accessed log data categories, a rate at which each of a plurality of log data categories has been accessed, a number of each of a plurality of different types of computations initiated by a user, a data access latency, a data access success rate, a response latency to user actions, a computation success rate of user initiated actions, a computation latency, errors, one or more queueing delay metrics, a response rate of automated computations, a success rate of automated computations, a computation latency of automated computations, one or more error metrics or error status codes of automated computations, one or more queueing delay measurements of automated computations, a system uptime measurement, a system availability measurement, a measurement of amounts of user generated computations of different types, number of automated computations of different types, number of data sources, number of user-created indexes or other organization of data, a number of page views, a number of sessions, a number of applications installed, an identification of features accessed during a predefined time period, a number of accesses to each of one or more features, a virtual compute utilization (e.g., a metric combining CPU, memory, disk, and network utilization metrics), a number or type of devices connecting to the installation, a number or type of visualizations viewed within a predefined time period, a number or location of physical sites at which the software is deployed, a list and/or versions of applications installed.

In operation 2540, the collected or measured operating parameters of operation 2530 are provided to the model received or obtained in operation 2510.

In operation 2550, a selection of one of the predefined states is received from the model. For example, as discussed above with respect to FIG. 22, in some embodiments, the model 2134 provides the operating state indicator 2220 based on one or more of operating parameter values 2210 (e.g. measured or collected operating parameters of operation 2530), a customer identifier 2212, and an indication of an existing or current operating state 2214.

In operation 2560, at least one operating parameter of the installation of a software program is adjusted based on the selected one predefined state. Thus, for example, if the one predefined state indicates a particular set of applications are installed on an installation of a software program operating in the one predefined state (e.g. network monitoring or user behavior monitoring), operation 2560 installs any applications included in the particular set of applications that are not currently installed (e.g. firewall monitoring), and uninstalls any applications that are currently installed (and included within a domain of applications controlled or managed by the disclosed embodiments) but are not included in the one predefined state. As another example, the one predefined state defines, in some embodiments, a number of search heads or a number of process threads allocated for certain tasks performed by the installation of a software program. Thus, operation 2560 includes, in some embodiments, spawning new processing threads and/or deleting processing threads such that a number of processing threads in use by the installation of a software program is consistent with thread specifications indicated by the one predefined state.

As an additional example, in some embodiments, a predefined state selected by the model is associated with, or defines a set of automated computations to generate a set of customized reports and alerts. Thus, operation 2560 includes, in some embodiments, the actual and automated scheduling and execution of the required computations, the actual and automated generation of customized reports, and the actual and automated sending of alert notifications via email or other integrated communication systems.

As a further example, a predefined state defines, in some embodiments, a set of soft are features and capabilities to be highlighted. Thus, operation 2560 includes, in some embodiments, automated highlighting of certain software features and capabilities, and the automated disabling of certain software features and capabilities, either through user dialog and other user interface communications, or silently without notifying the user.

After operation 2560 completes, method 2500 moves to end operation 2570.

In some embodiments, method 2500 includes periodically receiving or otherwise obtaining an update to the model that is local to the installation of the software program from the product management system. The updated local model is then used to obtain a recommended operating state for the installation of a software program as described above. In some embodiments, the receiving of an updated model is not necessarily periodic, but is obtained asynchronously at unpredictable time intervals.

Some embodiments of method 2500 include transmitting any one or more of the operating parameters discussed above to the product management system. The product management system, as described above, utilizes this transmitted information, in at least some embodiments to train an updated model for later deployment to one or more installations of the software program. As discussed above, in some embodiments, the updated model is also trained based on CRM information obtained from a CRM system, such as the CRM system 1908, discussed above with respect to FIG. 19.

In some embodiments, the installation of a software program (e.g. the first installation of a software program 1904 and/or the second installation of a software program 1906) becomes disconnected or otherwise unable to communicate with the product management system (e.g. the product management system 1902). In this case, the installation of a software program relies on the received model (of operation 2510) for perhaps an extended period of time until communication is reestablished and/or an updated model is available from the product management system. Thus, in some embodiments, a local model drives an installation of a software program through a series of state changes and product configuration modifications without any further input being provided from the installation of a software program.

Figure 26:
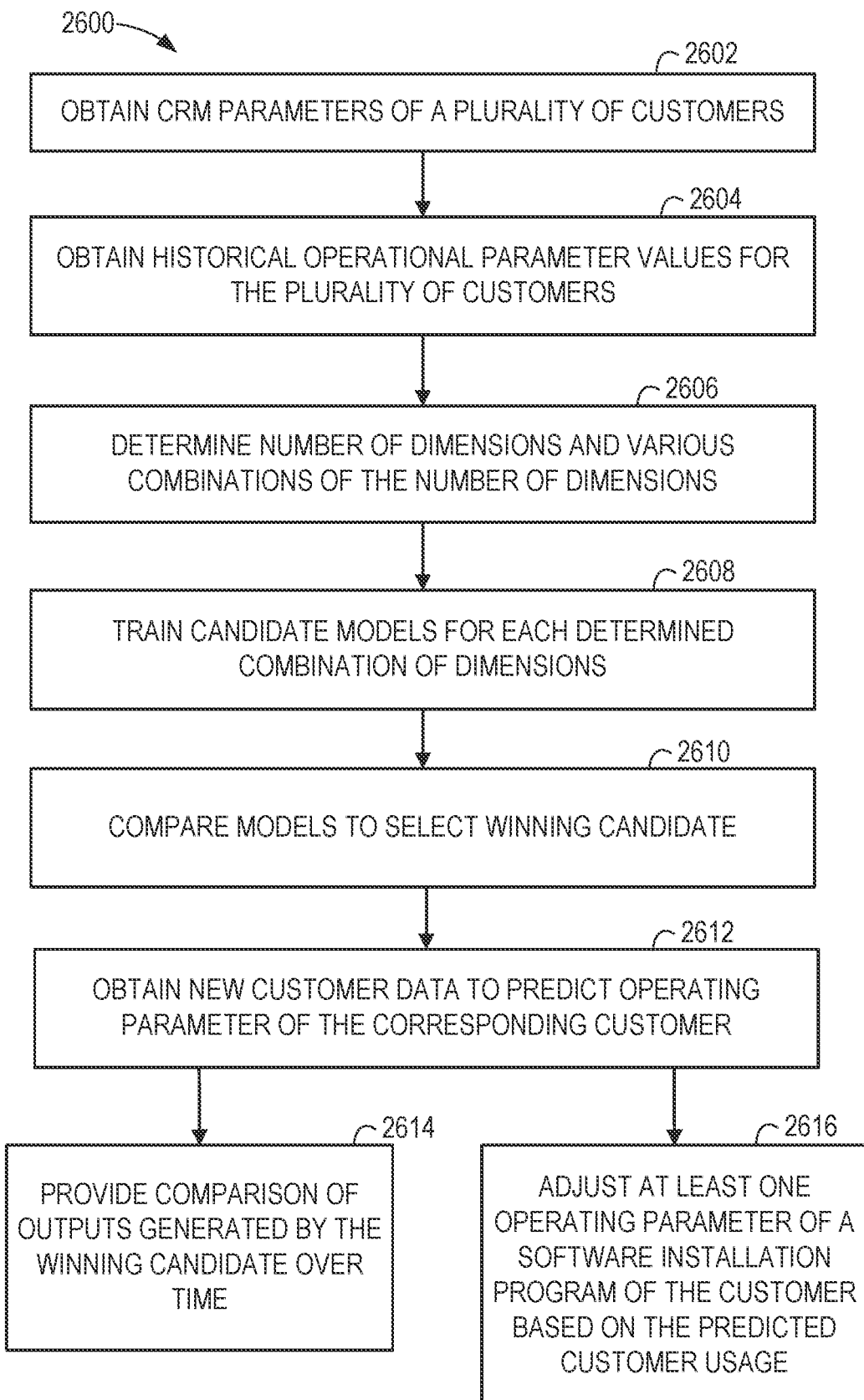
FIG. 26 is a flowchart illustrating an example process for training cohort configurations and using the trained cohort configurations to provide comparison of outputs over time or adjust operating parameters of a software installation program.

FIG. 26 is a flowchart illustrating an example process 2600 for training cohort configurations and using the trained cohort configurations to provide comparison of outputs over time or adjust operating parameters of a software installation program. The process 2600 includes operations 2602, 2604, 2606, 2608, 2610, 2612, 2614, and 2616. By way of example and not limitation, the process 2600 is described as being performed by the product management system 1902 of FIG. 19.

In operation 2602, the product management system 1902 obtains CRM parameters of a plurality of customers. For example, the CRM system 1908 may provide CRM information messages 1914 with CRM/I parameters for multiple customers.

The product management system 1902, in operation 2604, obtains historical operational parameter values for the plurality of customers. For example, historical operational parameter values may be accessed from a database, from the deployed computer systems 1904 and 1906, from the CRM system 1908, or any suitable combination thereof.

In operation 2606, the product management system 1902 determines a number of dimensions to use for modeling and various combinations of the number of dimensions. For example, as discussed above, the number of data points and the number of bits of information per data point may be used in combination with a predetermined threshold to determine a maximum number of dimensions to use. If the maximum number of dimensions to use is less than the number of dimensions available, multiple possible selections of combinations of dimensions are determined. Operations 1602, 1604, and 1606 of the method 1600 may be applied to the historical operational parameters to determine the number of dimensions in operation 2606.

The product management system 1902 trains candidate models for each determined combination of dimensions (operation 2608). As an example, the machine learning module 2100 of FIG. 21 may generate the candidate models 2112. Operation 1702 of the method 1700 may be used to perform the determining of the candidate models. Operation 1608 of the method 1600 also relates to the training of the model.

Using the testing module 2114, a winning model 2134 is determined in operation 2610. Operations 1704 and 1706 of the method 1700 may be used to generate a user interface that is operable to receive a selection of the winning model 2134 from the trained candidate models.

In operation 2612, the product management system 1902 obtains new customer data and uses the new customer data to predict an operating parameter of the corresponding customer. For example, the messages 1910 and 1912 of FIG. 19 may include new customer data. Features of the new customer data may be prepared by the feature preparation module 2130 of FIG. 21 and provided to the winning model 2134, The features may be provided as the additional data point in operation 1610 of the method 1600 to generate an output.

Operation 2612 may be performed repeatedly as new data is obtained. For example, operation 2612 may be performed hourly, weekly, or monthly. The product management system 1902, in operation 2614, provides a comparison of outputs generated by the winning candidate over time. Thus, a change in the operating parameters for the customer may be detected and displayed.

In operation 2616, the product management system 1902 adjusts at least one operating parameter of a software installation program of the customer based on the output of the model. For example, the model may predict that additional computing resources will be consumed by the customer and, in response, additional computing resources may be allocated to the customer.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 27:
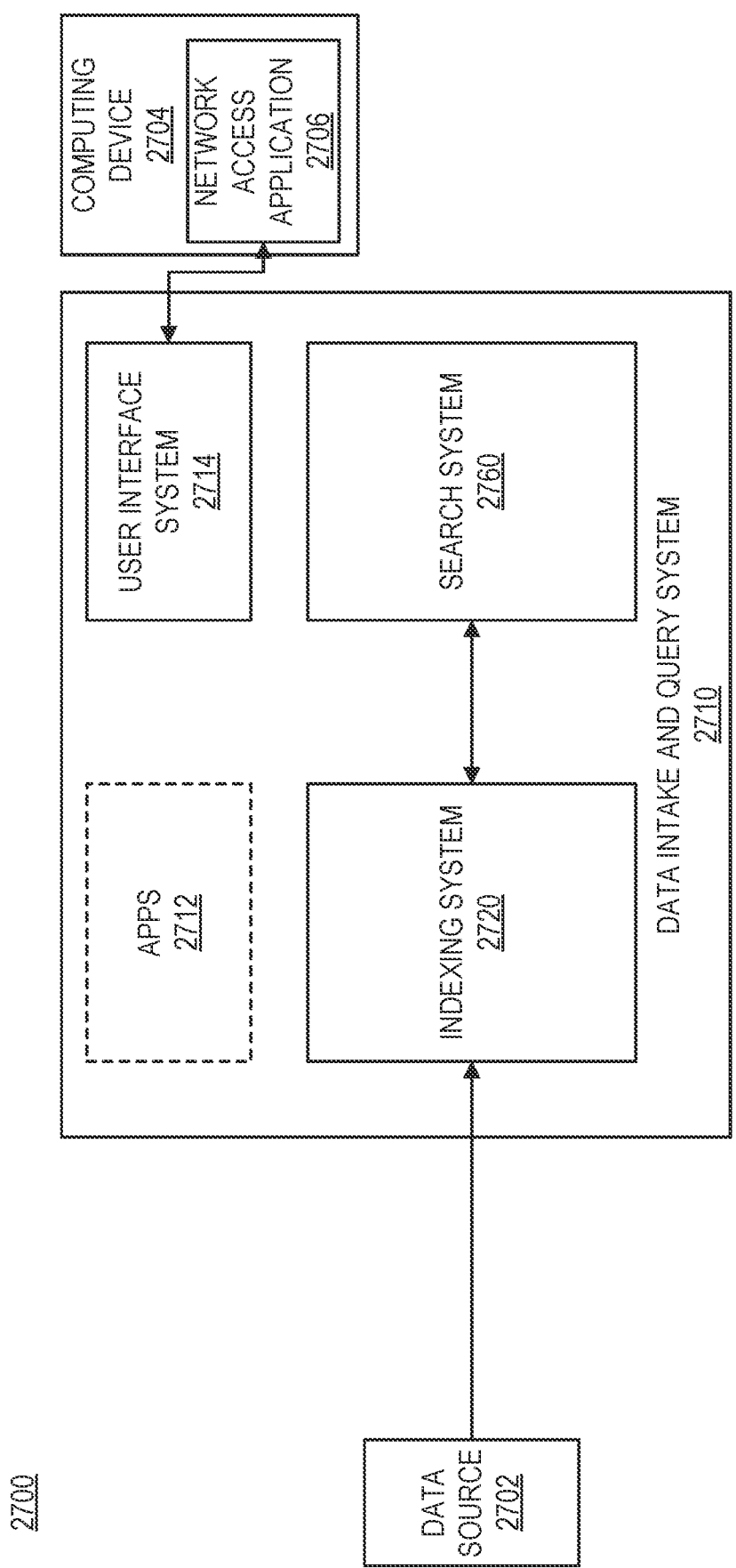
FIG. 27 is a block diagram illustrating an example computing environment that includes a data intake and query system.

FIG. 27 is a block diagram illustrating an example computing environment 2700 that includes a data intake and query system 2710. The data intake and query system 2710 obtains data from a data source 2702 in the computing environment 2700, and ingests the data using an indexing system 2720. A search system 2760 of the data intake and query system 2710 enables users to navigate the indexed data. Though drawn with separate boxes, in some implementations the indexing system 2720 and the search system 2760 can have overlapping components. A computing device 2704, running a network access application 2706, can communicate with the data intake and query system 2710 through a user interface system 2714 of the data intake and query system 2710. Using the computing device 2704, a user can perform various operations with respect to the data intake and query system 2710, such as administration of the data intake and query system 2710, management and generation of "knowledge objects," initiating of searches, and generation of reports, among other operations. The data intake and query system 2710 can further optionally include apps 2712 that extend the search, analytics, and/or visualization capabilities of the data intake and query system 2710.

The data intake and query system 2710 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 2710 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 2710 can execute on a single computing device, or may be distributed over multiple computing devices. For example, the program code can include instructions for executing both indexing and search components (which may be part of the indexing system 2720 and/or the search system 2760, respectively), and can be executed on a computing device that also provides the data source 2702. As another example, the program code can execute on one computing device, where the program code executes both indexing and search components, while another copy of the program code executes on a second computing device that provides the data source 2702. As another example, the program code can execute only an indexing component or only a search component. In this example, a first instance of the program code that is executing the indexing component and a second instance of the program code that is executing the search component can be executing on the same computing device or on different computing devices.

The data source 2702 of the computing environment 2700 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 2702 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 2720 obtains machine date from the data source 2702 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 2720 does not require prior knowledge of the structure of incoming data (e.g., the indexing system 2720 does not need to be provided with a schema describing the data). Additionally, the indexing system 2720 retains a copy of the data as it was received by the indexing system 2720 such that the original data is always available for searching (e.g., no data is discarded, though, in some examples, the indexing system 2720 can be configured to do so).

The search system 2760 searches the data stored by the indexing 2720 system. As discussed in greater detail below, the search system 2760 enables users associated with the computing environment 2700 (and possibly also other users) to navigate the data, generate reports, and visualize results in "dashboards" output using a graphical interface. Using the facilities of the search system 2760, users can obtain insights about the data, such as retrieving events from an index, calculating metrics, searching for specific conditions within a rolling time window, identifying patterns in the data, and predicting future trends, among other examples. To achieve greater efficiency, the search system 2760 can apply map-reduce methods to parallelize searching of large volumes of data. Additionally, because the original data is available, the search system 2760 can apply a schema to the data at search time. This allows different structures to be applied to the same data, or for the structure to be modified if or when the content of the data changes. Application of a schema at search time may be referred to herein as a late-binding schema technique.

The user interface system 2714 provides mechanisms through which users associated with the computing environment 2700 (and possibly others) can interact with the data intake and query system 2710. These interactions can include configuration, administration, and management of the indexing system 2720, initiation and/or scheduling of queries to the search system 2760, receipt or reporting of search results, and/or visualization of search results. The user interface system 2714 can include, for example, facilities to provide a command line interface or a web-based interface.

Users can access the user interface system 2714 using a computing device 2704 that communicates with data intake and query system 2710, possibly over a network. A "user,"

in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 2700. For example, a person can log in as a particular user and, using the user's digital information, can access the data intake and query system 2710. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 2704 can provide a human-machine interface through which a person can have a digital presence in the computing environment 2700 in the form of a user. The computing device 2704 is an electronic device having one or more processors and a memory capable of storing instructions for execution by the one or more processors. The computing device 2704 can further include input/output (I/O) hardware and a network interface. Applications executed by the computing device 2704 can include a network access application 2706, which can a network interface of the client computing device 2704 to communicate, over a network, with the user interface system 2714 of the data intake and query system 2710. The user interface system 2714 can use the network access application 2706 to generate user interfaces that enable a user to interact with the data intake and query system 2710. A web browser is one example of a network access application. A shell tool can also be used as a network access application. In some examples, the data intake and query system 2710 is an application executing on the computing device 2706. In such examples, the network access application 2706 can access the user interface system 2714 without needed to go over a network.

The data intake and query system 2710 can optionally include apps 2712. An app of the data intake and query system 2710 is a collection of configurations, knowledge objects (a user-defined entity that enriches the data in the data intake and query system 2710), views, and dashboards that may provide additional functionality, different techniques for searching the data, and/or additional insights into the data. The data intake and query system 2710 can execute multiple applications simultaneously. Example applications include an information technology service intelligence application, which can monitor and analyze the performance and behavior of the computing environment 2700, and an enterprise security application, which can include content and searches to assist security analysts in diagnosing and acting on anomalous or malicious behavior in the computing environment 2700.

Though FIG. 27 illustrates only one data source, in practical implementations, the computing environment 2700 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 2700, the data intake and query system 2710 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation xvhere an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 2700 can include on-prem and cloud-based computing resources, or only cloud-based resources. For example, an entity may have on-prem computing devices and a private cloud. In this example, the entity operates the data intake and query system 2710 and can choose to execute the data intake and query system 2710 on an on-prem computing device or in the cloud. In another example, a provider entity operates the data intake and query system 2710 in a public cloud and provides the functionality of the data intake and query system 2710 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 2710. In some implementations, the entity providing the data intake and query system 2710 is itself subscribing to the cloud services of a cloud service provider. As an example, a first entity provides computing resources under a public cloud service model, a second entity subscribes to the cloud services of the first provider entity and uses the cloud computing resources to operate the data intake and query system 2710, and a third entity can subscribe to the services of the second provider entity in order to use the functionality of the data intake and query system 2710. In this example, the data sources are associated with the third entity, users accessing the data intake and query system 2710 are associated with the third entity, and the analytics and insights provided by the data intake and query system 2710 are for purposes of the third entity's operations.

Figure 28:
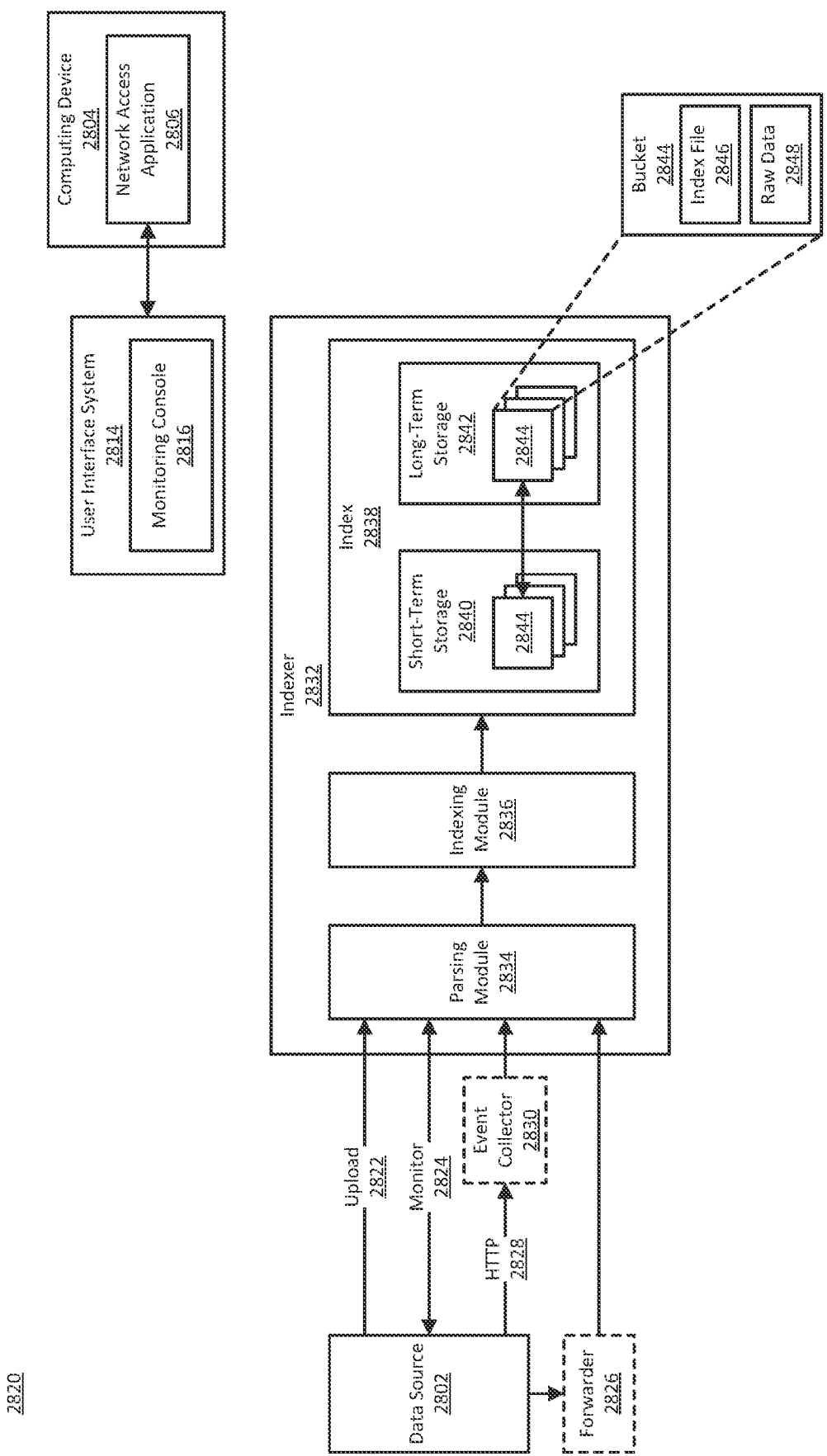
FIG. 28 is a block diagram illustrating in greater detail an example of an indexing system of a data intake and query system, such as the data intake and query system of FIG. 27.

FIG. 28 is a block diagram illustrating in greater detail an example of an indexing system 2820 of a data intake and query system, such as the data intake and query system 2710 of FIG. 27. The indexing system 2820 of FIG. 28 uses various methods to obtain machine data from a data source 2802 and stores the data in an index 2838 of an indexer 2832. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 2820 enables the data intake and query system to obtain the machine data produced by the data source 2802 and to store the data for searching and retrieval.

Users can administer the operations of the indexing system 2820 using a computing device 2804 that can access the indexing system 2820 through a user interface system 2814 of the data intake and query system. For example, the computing device 2804 can be executing a network access application 2806, such as a web browser or a terminal, through which a user can access a monitoring console 2816 provided by the user interface system 2814. The monitoring console 2816 can enable operations such as: identifying the data source 2802 for indexing; configuring the indexer 2832 to index the data from the data source 2832; configuring a data ingestion method; configuring, deploying, and managing clusters of indexers; and viewing the topology and performance of a deployment of the data intake and query system, among other operations. The operations performed by the indexing system 2820 may be referred to as "index time" operations, which are distinct from "search time" operations that are discussed further below.

The indexer 2832, which may be referred to herein as a data indexing component, coordinates and performs most of the index time operations. The indexer 2832 can be implemented using program code that can be executed on a computing device. The program code for the indexer 2832 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 2832. In some implementations, the indexer 2832 executes on the computing device 2804 through which a user can access the indexing system 2820. In some implementations, the indexer 2832 executes on a different computing device.

The indexer 2832 may be executing on the computing device that also provides the data source 2802 or may be executing on a different computing device. In implementations wherein the indexer 2832 is on the same computing device as the data source 2802, the data produced by the data source 2802 may be referred to as "local data." In other implementations the data source 2802 is a component of a first computing device and the indexer 2832 executes on a second computing device that is different from the first computing device. In these implementations, the data produced by the data source 2802 may be referred to as "remote data." In some implementations, the first computing device is "on-prem" and in some implementations the first computing device is "in the cloud." In some implementations, the indexer 2832 executes on a computing device in the cloud and the operations of the indexer 2832 are provided as a service to entities that subscribe to the services provided by the data intake and query system.

For a given data produced by the data source 2802, the indexing system 2820 can be configured to use one of several methods to ingest the data into the indexer 2832. These methods include upload 2822, monitor 2824, using a forwarder 2826, or using HyperText Transfer Protocol (HTTP 2828) and an event collector 2830. These and other methods for data ingestion may be referred to as "getting data in" (GI) methods.

Using the upload 2822 method, a user can instruct the indexing system to 2802 to specify a file for uploading into the indexer 2832. For example, the monitoring console 2816 can include commands or an interface through which the user can specify where the file is located (e.g., on which computing device and/or in which directory of a file system) and the name of the file. Once uploading is initiated, the indexer 2832 processes the file, as discussed further below. Uploading is a manual process and occurs when instigated by a user. For automated data ingestion, the other ingestion methods are used.

The monitor 2824 method enables the indexing system 2802 to monitor the data source 2802 and continuously or periodically obtain data produced by the data source 2802 for ingestion by the indexer 2832. For example, using the monitoring console 2816, a user can specify a file or directory for monitoring. In this example, the indexing system 2802 can execute a monitoring process that detects whenever data is added to the file or directory and causes the data to be sent to the indexer 2832. As another example, a user can specify a network port for monitoring. In this example, a monitoring process can capture data received at or transmitting from the network port and cause the data to be sent to the indexer 2832. In various examples, monitoring can also be configured for data sources such as operating system event logs, performance data generated by an operating system, operating system registries, operating system directory services, and other data sources.

Monitoring is available when the data source 2802 is local to the indexer 2832 (e.g., the data source 2802 is on the computing device where the indexer 2832 is executing). Other data ingestion methods, including forwarding and the event collector 2830, can be used for either local or remote data sources.

A forwarder 2826, which may be referred to herein as a data forwarding component, is a software process that sends data from the data source 2802 to the indexer 2832. The forwarder 2826 can be implemented using program code that can be executed on the computer device that provides the data source 2802. A user launches the program code for the forwarder 2826 on the computing device that provides the data source 2802. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 2826 can provide various capabilities. For example, the forwarder 2826 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 2826 can break the data into individual events (event generation is discussed further below) and send the events to a receiver. Other operations that the forwarder 2826 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 2830 provides an alternate method for obtaining data from the data source 2802. The event collector 2830 enables data and application events to be sent to the indexer 2832 using HTTP 2828. The event collector 2830 can be implemented using program code that can be executing on a computing device. The program code may be a component of the data intake and query system or can be a standalone component that can be executed independently of the data intake and query system and operates in cooperation with the data intake and query system.

To use the event collector 2830, a user can, for example using the monitoring console 2816 or a similar interface provided by the user interface system 2814, enable the event collector 2830 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 2802 as an alternative method to using a username and password for authentication.

To send data to the event collector 2830, the data source 2802 is supplied with a token and can then send HTTP 2828 requests to the event collector 2830. To send HTTP 2828 requests, the data source 2802 can be configured to use an HTTP client and/or to use logging libraries such as those supplied by Java, JavaScript, and .NET libraries. An HTTP client enables the data source 2802 to send data to the event collector 2830 by supplying the data, and a Uniform Resource Identifier (URI) for the event collector 2830 to the HTTP client. The HTTP client then handles establishing a connection with the event collector 2830, transmitting a request containing the data, closing the connection, and receiving an acknowledgment if the event collector 2830 sends one. Logging libraries enable HTTP 2828 requests to the event collector 2830 to be generated directly by the data source. For example, an application can include or link a logging library, and through functionality provided by the logging library manage establishing a connection with the event collector 2830, transmitting a request, and receiving an acknowledgement.

An HTTP 2828 request to the event collector 2830 can contain a token, a channel identifier, event metadata, and/or event data. The token authenticates the request with the event collector 2830. The channel identifier, if available in the indexing system 2820, enables the event collector 2830 to segregate and keep separate data from different data sources. The event metadata can include one or more key-value pairs that describe the data source 2802 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 2830 extracts events from HTTP 2828 requests and sends the events to the indexer 2832. The event collector 2830 can further be configured to send events or event data to one or more indexers. Extracting the events can include associating any metadata in a request with the event or events included in the request. In these implementations, event generation by the indexer 2832 (discussed further below) is bypassed, and the indexer 2832 moves the events directly to indexing. In some implementations, the event collector 2830 extracts event data from a request and outputs the event data to the indexer 2832, and the indexer generates events from the event data. In some implementations, the event collector 2830 sends an acknowledgement message to the data source 2802 to indicate that the event collector 2830 has received a particular request form the data source 2802, and/or to indicate to the data source 2802 that events in the request have been added to an index.

The indexer 2832 ingests incoming data and transforms the data into searchable knowledge in the form of events. In the data intake and query system, an event is a single piece of data that represents activity of the component represented in FIG. 28 by the data source 2802. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 2832 can include a parsing module 2834 and an indexing module 2836 for generating and storing the events. The parsing module 2834 and indexing module 2836 can be modular and pipelined, such that one component can be operating on a first set of data while the second component is simultaneously operating on a second sent of data. Additionally, the indexer 2832 may at any time have multiple instances of the parsing module 2834 and indexing module 2836, with each set of instances configured to simultaneously operate on data from the same data source or from different data sources. The parsing module 2834 and indexing module 2836 are illustrated to facilitate discussion, with the understanding that implementations with other components are possible to achieve the same functionality.

The parsing module 2834 determines information about event data, where the information can be used to identify events within the event data. For example, the parsing module 2834 can associate a source type with the event data. A source type identifies the data source 2802 and describes a possible data structure of event data produced by the data source 2802. For example, the source type can indicate which fields to expect in events generated at the data source 2802 and the keys for the values in the fields, and possibly other information such as sizes of fields, an order of the fields, a field separator, and so on. The source type of the data source 2802 can be specified when the data source 2802 is configured as a source of event data. Alternatively, the parsing module 2834 can determine the source type from the event data, for example from an event field or using machine learning.

Other information that the parsing module 2834 can determine includes timestamps. In some cases, an event includes a timestamp as a field, and the timestamp indicates a point in time when the action represented by the event occurred or was recorded by the data source 2802 as event data. In these cases, the parsing module 2834 may be able to determine from the source type associated with the event data that the timestamps can be extracted from the events themselves. In some cases, an event does not include a timestamp and the parsing module 2834 determines a timestamp for the event, for example from a name associated with the event data from the data source 2802 (e.g., a file name when the event data is in the form of a file) or a time associated with the event data (e.g., a file modification time). As another example, when the parsing module 2834 is not able to determine a timestamp from the event data, the parsing module 2834 may use the time at which it is indexing the event data. As another example, the parsing module 2834 can use a user-configured rule to determine the timestamps to associate with events.

The parsing module 2834 can further determine event boundaries. In some cases, a single line (e.g., a sequence of characters ending with a line termination) in event data represents one event while in other cases, a single line represents multiple events. In yet other cases, one event may span multiple lines within the event data. The parsing module 2834 may be able to determine event boundaries from the source type associated with the event data, for example from a data structure indicated by the source type. In some implementations, a user can configure rules to the parsing module 2834 can use to identify event boundaries.

The parsing module 2834 can further extract data from events and possibly also perform transformations on the events. For example, the parsing module 2834 can extract a set of fields for each event, such as a host or hostname, source or source name, and/or source type. The parsing module 2834 may extract certain fields by default or based on a user configuration. Alternatively or additionally, the parsing module 2834 may add fields to events, such as a source type or a user-configured field. As another example of a transformation, the parsing module 2834 can anonymize fields in events to mask sensitive information, such as social security numbers or account numbers. Anonymizing fields can include changing or replacing values of specific fields. The parsing component 2834 can further perform user-configured transformations.

The parsing module 2834 outputs the results of processing incoming event data to the indexing module 2836, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 2832 can be configured to identify searchable segments that are parts of fields, searchable segments that are entire fields, or both. The parsing module 2834 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 2846, to find event data that matches a search query. In some implementations, segmentation can alternatively be performed by the forwarder 2826. Segmentation can also be disabled, in which case the indexer 2832 will not build a lexicon for the event data. When segmentation is disabled, the search system searches the event data directly.

Building index data structures generates the index 2838. The index 2838 is a storage data structure on a storage device (e.g., a disk drive or other physical device for storing digital data). The storage device may be a component of the computing device on which the indexer 2832 is operating (referred to herein as local storage) or may be a component of a different computing device (referred to herein as remote storage) that the indexer 2838 has access to over a network. The indexer 2832 can include more than one index and can include indexes of different types. For example, the indexer 2832 can include event indexes, which impose minimal structure on stored data and can accommodate any type of data. As another example, the indexer 2832 can include metrics indexes, which use a highly structured format to handle the higher volume and lower latency demands associated with metrics data.

The indexing module 2836 organizes files in the index 2838 in directories referred to as buckets. The files in a bucket 2844 can include raw data files, index files, and possibly also other metadata files. As used herein, "raw data" means data as when the data was produced by the data source 2802, without alteration to the format or content. As noted previously, the parsing component 2834 may add fields to event data and/or perform transformations on fields in the event data, and thus a raw data file 2848 can include, in addition to or instead of raw data, what is referred to herein as enriched raw data. The raw data file 2848 may be compressed to reduce disk usage. An index file 2846, which may also be referred to herein as a "time-series index" or tsidx file, contains metadata that the indexer 2832 can use to search a corresponding raw data file 2848. As noted above, the metadata in the index file 2846 includes a lexicon of the event data, which associates each unique keyword in the event data in the raw data file 2848 with a reference to the location of event data within the raw data file 2848. The keyword data in the index file 2846 may also be referred to as an inverted index. In various implementations, the data intake and query system can use index files for other purposes, such as to store data summarizations that can be used to accelerate searches.

A bucket 2844 includes event data for a particular range of time. The indexing module 2836 arranges buckets in the index 2838 according to the age of the buckets, such that buckets for more recent ranges of time are stored in short-term storage 2840 and buckets for less recent ranges of time are stored in long-term storage 2842. Short-term storage 2840 may be faster to access while long-term storage 2842 may be slower to access. Buckets may move from short-term storage 2840 to long-term storage 2842 according to a configurable data retention policy, which can indicate at what point in time a bucket is old enough to be moved.

A bucket's location in short-term storage 2840 or long-term storage 2842 can also be indicated by the bucket's status. As an example, a bucket's status can be "hot," "warm," "cold," "frozen," or "thawed." In this example, hot bucket is one to which the indexer 2832 is writing data and the bucket becomes a warm bucket when the index 2832 stops writing data to it. In this example, both hot and warm buckets reside in short-term storage 2840. Continuing this example, when a warm bucket is moved to long-term storage 2842, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 2820 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 2820 through the monitoring console 2816 provided by the user interface system 2814. Using the monitoring console 2816, the user can configure and monitor an index cluster, and see information such as disk usage by an index, volume usage by an indexer, index and volume size over time, data age, statistics for bucket types, and bucket settings, among other information.

Figure 29:
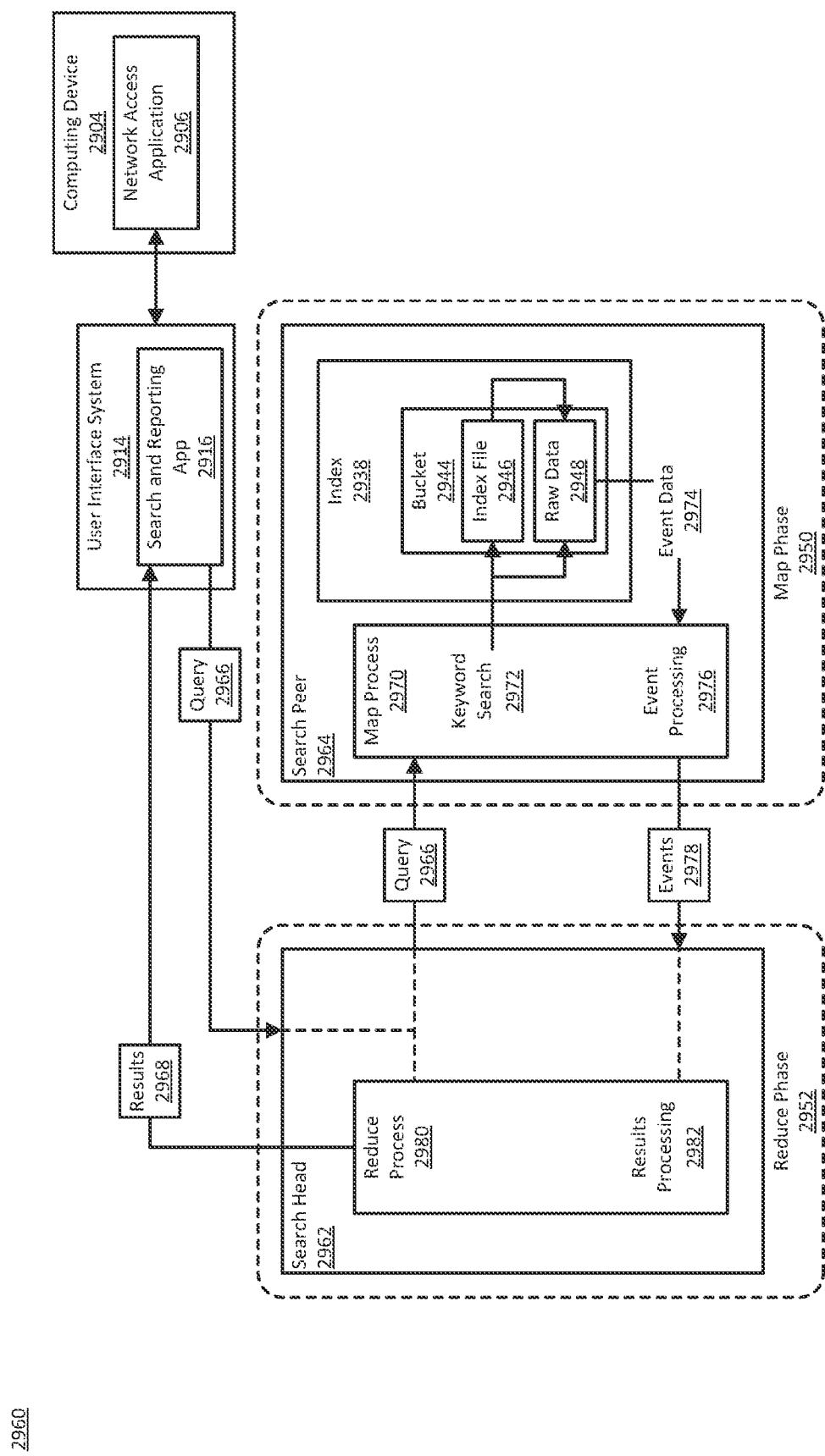
FIG. 29 is a block diagram illustrating in greater detail an example of the search system of a data intake and query system, such as the data intake and query system of FIG. 27.

FIG. 29 is a block diagram illustrating in greater detail an example of the search system 2960 of a data intake and query system, such as the data intake and query system 2710 of FIG. 27. The search system 2960 of FIG. 29 issues a query 2966 to a search head 2962, which sends the query 2966 to a search peer 2964. Using a map process 2970, the search peer 2964 searches the appropriate index 2938 for events identified by the query 2966 and sends events 2978 so identified back to the search head 2962. Using a reduce process 2982, the search head 2962 processes the events 2978 and produces results 2968 to respond to the query 2966. The results 2968 can provide useful insights about the data stored in the index 2938. These insights can aid in the administration of information technology systems, in security analysis of information technology systems, and/or in analysis of the development environment provided by information technology systems.

The query 2966 that initiates a search is produced by a search and reporting app 2916 that is available through the user interface system 2914 of the data intake and query system. Using a network access application 2906 executing on a computing device 2904, a user can input the query 2966 into a search field provided by the search and reporting app 2916. Alternatively or additionally, the search and reporting app 2916 can include pre-configured queries or stored queries that can be activated by the user. In some cases, the search and reporting app 2916 initiates the query 2966 when the user enters the query 2966. In these cases, the query 2966 maybe referred to as an "ad-hoc" query. In some cases, the search and reporting app 2916 initiates the query 2966 based on a schedule. For example, the search and reporting app 2916 can be configured to execute the query 2966 once per hour, once per day, at a specific time, on a specific date, or at some other time that can be specified by a date, time, and/or frequency. These types of queries maybe referred to as scheduled queries.

The query 2966 is specified using a search processing language. The search processing language includes commands that the search peer 2964 will use to identify events to return in the search results 2968. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 2966 to include sequential commands, where a subsequent command may operate on the results of a prior command. As an example, sequential commands may be separated in the query 2966 by a vertical line ("|" or "pipe") symbol.

In addition to one or more search commands, the query 2966 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 2966 occurs in two broad phases: a map phase 2950 and a reduce phase 2952. The map phase 2950 takes place across one or more search peers. In the map phase 2950, the search peers locate event data that matches the search terms in the search query 2966 and sorts the event data into field-value pairs. When the map phase 2950 is complete, the search peers send events that they have found to one or more search heads for the reduce phase 2952. During the reduce phase 2952, the search heads process the events through commands in the search query 2966 and aggregate the events to produce the final search results 2968.

A search head, such as the search head 2962 illustrated in FIG. 29, is a component of the search system 2960 that manages searches. The search head 2962, which may also be referred to herein as a search management component, can be implemented using program code that can be executed on a computing device. The program code for the search head 2962 can be stored on a non-transitory computer-readable medium and from this medium can be loaded or copied to the memory of a computing device. One or more hardware processors of the computing device can read the program code from the memory and execute the program code in order to implement the operations of the search head 2962.

Upon receiving the search query 2966, the search head 2962 directs the query 2966 to one or more search peers, such as the search peer 2964 illustrated in FIG. 29. "Search peer" is an alternate name for "indexer" and a search peer may be largely similar to the indexer described previously. The search peer 2964 may be referred to as a "peer node" when the search peer 2964 is part of an indexer cluster. The search peer 2964, which may also be referred to as a search execution component, can be implemented using program code that can be executed on a computing device. In some implementations, one set of program code implements both the search head 2962 and the search peer 2964 such that the search head 2962 and the search peer 2964 form one component. In some implementations, the search head 2962 is an independent piece of code that performs searching and no indexing functionality. In these implementations, the search head 2962 may be referred to as a dedicated search head.

The search head 2962 may consider multiple criteria when determining whether to send the query 2966 to the particular search peer 2964. For example, the search system 2960 may be configured to include multiple search peers that each have duplicative copies of at least some of the event data. In this example, the sending the search query 2966 to more than one search peer allows the search system 2960 to distribute the search workload across different hardware resources. As another example, search system 2960 may include different search peers for different purposes (e.g., one has an index storing a first type of data or from a first data source while a second has an index storing a second type of data or from a second data source). In this example, the search query 2966 may specify which indexes to search, and the search head 2962 will send the query 2966 to the search peers that have those indexes.

To identify events 2978 to send back to the search head 2962, the search peer 2964 performs a map process 2970 to obtain event data 2974 from the index 2938 that is maintained by the search peer 2964. During a first phase of the map process 2970, the search peer 2964 identifies buckets that have events that are described by the time indicator in the search query 2966. As noted above, a bucket contains events whose timestamps fall within a particular range of time. For each bucket 2944 whose events can be described by the time indicator, during a second phase of the map process 2970, the search peer 2964 performs a keyword search 2974 using search terms specified in the search query 2966, The search terms can be one or more of keywords, phrases, fields, Boolean expressions, and/or comparison expressions that in combination describe events being searched for. When segmentation is enabled at index time, the search peer 2964 performs the keyword search 2972 on the bucket's index file 2946. As noted previously, the index file 2946 includes a lexicon of the searchable terms in the events stored in the bucket's raw data 2948 file. The keyword search 2972 searches the lexicon for searchable terms that correspond to one or more of the search terms in the query 2966. As also noted above, the lexicon incudes, for each searchable term, a reference to each location in the raw data 2948 file where the searchable term can be found. Thus, when the keyword search identifies a searchable term in the index file 2946 that matches query 2966, the search peer 2964 can use the location references to extract from the raw data 2948 file the event data 2974 for each event that include the searchable term.

In cases where segmentation was disabled at index time, the search peer 2964 performs the keyword search 2972 directly on the raw data 2948 file. To search the raw data 2948, the search peer 2964 may identify searchable segments in events in a similar manner as when the data was indexed. Thus, depending on how the search peer 2964 is configured, the search peer 2964 may look at event fields and/or parts of event fields to determine whether an event matches the query 2966. Any matching events can be added to the event data 2974 read from the raw data 2948 file. The search peer 2964 can further be configured to enable segmentation at search time, so that searching of the index 2938 causes the search peer 2964 to build a lexicon in the index file 2946.

The event data 2974 obtained from the raw data 2948 file includes the full text of each event found by the keyword search 2972. During a third phase of the map process 2970, the search peer 2964 performs event processing 2976 on the event data 2974, with the steps performed being determined by the configuration of the search peer 2964 and/or commands in the search query 2966. For example, the search peer 2964 can be configured to perform field discovery and field extraction. Field discovery is a process by which the search peer 2964 identifies and extracts key-value pairs from the events in the event data 2974. The search peer 2964 can, for example, be configured to automatically extract the first 100 fields (or another number of fields) in the event data 2974 that can be identified as key-value pairs. As another example, the search peer 2964 can extract any fields explicitly mentioned in the search query 2966. The search peer 2964 can, alternatively or additionally, be configured with particular field extractions to perform.

Other examples of steps that can be performed during event processing 2976 include: field aliasing (assigning an alternate name to a field); addition of fields from lookups (adding fields from an external source to events based on existing field values in the events); associating event types with events; source type renaming (changing the name of the source type associated with particular events), and tagging (adding one or more strings of text, or a "tags" to particular events), among other examples.

The search peer 2964 sends processed events 2978 to the search head 2962, which performs a reduce process 2980. The reduce process 2980 potentially receives events from multiple search peers and performs various results processing 2982 steps on the events. The results processing 2982 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 2982 can further include applying commands from the search query 2966 to the events. The query 2966 can include, for example, commands for evaluating and/or manipulating fields (e.g., to generate new fields from existing fields or parse fields that have more than one value). As another example, the query 2966 can include commands for calculating statistics over the events, such as counts of the occurrences of fields, or sums, averages, ranges, and so on, of field values. As another example, the query 2966 can include commands for generating statistical values for purposes of generating charts of graphs of the events.

Through results processing 2982, the reduce process 2980 produces the events found by processing the search query 2966, as well as some information about the events, which the search head 2962 outputs to the search and reporting app 2916 as search results 2968. The search and reporting app 2916 can generate visual interfaces for viewing the search results 2968. The search and reporting app 2916 can, for example, output visual interfaces for the network access application 2906 running on a computing device 2904 to generate.

The visual interfaces can include various visualizations of the search results 2968, such as tables, line or area charts, Chloropleth maps, or single values. The search and reporting app 2916 can organize the visualizations into a dashboard, where the dashboard includes a panel for each visualization.

A dashboard can thus include, for example, a panel listing the raw event data for the events in the search results 2968, a panel listing fields extracted at index time and/or found through field discovery along with statistics for those fields, and/or a timeline chart indicating how many events occurred at specific points in time (as indicated by the timestamps associated with each event). In various implementations, the search and reporting app 2916 can provide one or more default dashboards. Alternatively or additionally, the search and reporting app 2916 can include functionality that enables a user to configure custom dashboards.

The search and reporting app 2916 can also enable further investigation into the events in the search results 2916. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 2966. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the methods described herein can be performed in a different sequence, can be added, merged, or left out altogether (e.g., not all are necessary for the practice of the methods). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A computing device, comprising:
   one or more hardware processors; and
   a non-transitory computer-readable medium having stored thereon instructions that, when executed by the one or more hardware processors, cause the one or more hardware processors to perform operations including:
   generating a plurality of candidate models using a machine learning model, wherein the plurality of candidate models predict values for a first set of data points indicating product usage, each data point included in the first set of data points has a first set of dimensions, and each candidate model included in the plurality of candidate models is generated based on the first set of data points using data from a different subset of the first set of dimensions;
   generating respective model testing results for each candidate model based on an evaluation of the respective candidate model;
   selecting a model from the plurality of candidate models by identifying a model from the plurality of candidate models with a lowest median error based upon the model testing results;
   determining, using the selected model, a first quantity of computing resources or operating states of a software installation for a customer based on a time series analysis of a recent quantity of computing resources or operating states of the customer;

determining a second quantity of computing resources or operating states of the software installation based on one or more of the following: static customer data, software performance data, and time series analysis of a quantity of computing resources or operating states of the customer;

determining a third quantity of computing resources or operating states of the software installation based on the first quantity of computing resources or operating states and the second quantity of computing resources or operating states; and causing the software installation to be executed based on a parameter or operating state of the software installation that has been adjusted according to the third quantity.

2. The computing device of claim 1, wherein the operations further comprise:

determining to adjust the parameter of the software installation based on a majority of the first quantity of computing resources, the second quantity of computing resources, and the third quantity of computing resources being larger than a current quantity of computing resources.

3. The computing device of claim 2, wherein the operations further comprise:

determining, as voting indicators, which of the first quantity of computing resources, the second quantity of computing resources, are larger than a current quantity of computing resources;

wherein the determining of the third quantity of computing resources or operating states comprises selecting a quantity of computing resources from among the voting indicators.

4. The computing device of claim 1, wherein:

the determining of the third quantity of computing resources or operating states comprises selecting either the first quantity of computing resources or the second quantity of computing resources.

5. The computing device of claim 1, wherein:

the determining of the third quantity of computing resources or operating states comprises selecting the larger of the first quantity of computing resources and the second quantity of computing resources.

6. The computing device of claim 1, wherein the parameter of the software installation for the customer is adjusted based on the first quantity of computing resources being larger than a current quantity of computing resources.

7. The computing device of claim 1, wherein the determining of the second quantity of computing resources or operating states of the software installation is based on the static customer data.

8. The computing device of claim 1, wherein the determining of the second quantity of computing resources or operating states of the software installation is based on the software performance data.

9. The computing device of claim 1, wherein the determining of the second quantity of computing resources or operating states of the software installation is based on the time series analysis of the quantity of computing resources or operating states of the customer.

10. A computer-implemented method, comprising:

generating, by one or more hardware processors, a plurality of candidate models using a machine learning model, wherein the plurality of candidate models predict values for a first set of data points indicating product usage, each data point included in the first set of data points has a first set of dimensions, and each candidate model included in the plurality of candidate models is generated based on the first set of data points using data from a different subset of the first set of dimensions;

generating respective model testing results for each candidate model based on an evaluation of the respective candidate model;

selecting a model from the plurality of candidate models by identifying a model from the plurality of candidate models with a lowest median error based upon the model testing results;

determining, using the selected model, a first quantity of computing resources or operating states of a software installation for a customer based on a second set of data points corresponding to a recent quantity of computing resources or operating states of the customer;

determining a second quantity of computing resources or operating states of the software installation based on one or more of the following: static customer data, software performance data, and time series analysis of a quantity of computing resources or operating states of the customer;

determining a third quantity of computing resources or operating states of the software installation based on the first quantity of computing resources or operating states and the second quantity of computing resources or operating states; and causing the software installation to be executed based on a parameter or operating state of the software installation that has been adjusted according to the third quantity.

11. The computer-implemented method of claim 10, further comprising:

determining to adjust the parameter of the software installation based on a majority of the first quantity of computing resources, the second quantity of computing resources, and the third quantity of computing resources being larger than a current quantity of computing resources.

12. The computer-implemented method of claim 11, further comprising:

determining, as voting indicators, which of the first quantity of computing resources, the second quantity of computing resources, are larger than the current quantity of computing resources, wherein the determining of the third quantity of computing resources or operating states comprises selecting a quantity of computing resources from among the voting indicators.

13. The computer-implemented method of claim 10, wherein:

the determining of the third quantity of computing resources or operating states comprises selecting either the first quantity of computing resources or the second quantity of computing resources.

14. The computer-implemented method of claim 10, wherein:

the determining of the third quantity of computing resources or operating states comprises selecting the larger of the first quantity of computing resources and the second quantity of computing resources.

15. The computer-implemented method of claim 10, wherein the parameter of the software installation for the customer is adjusted based on the first quantity of computing resources being larger than a current quantity of computing resources.

16. The computer-implemented method of claim 10, wherein the determining of the second quantity of computing resources or operating states of the software installation is based on the static customer data.

17. The computer-implemented method of claim 10, wherein the determining of the second quantity of computing resources or operating states of the software installation is based on the software performance data.

18. A non-transitory computer-readable medium having stored thereon instructions that, when executed by one or more processors, cause the one or more processors to perform operations including:
- generating a plurality of candidate models using a machine learning model, wherein the plurality of candidate models predict values for a first set of data points indicating product usage, each data point included in the first set of data points has a first set of dimensions, and each candidate model included in the plurality of candidate models is generated based on the first set of data points using data from a different subset of the first set of dimensions;
- generating respective model testing results for each candidate model based on an evaluation of the respective candidate model;
- selecting a model from the plurality of candidate models by identifying a model from the plurality of candidate models with a lowest median error based upon the model testing results;
- determining, using the selected model, a first quantity of computing resources or operating states of a software installation for a customer based on a second set of data points corresponding to a recent quantity of computing resources or operating states of the customer;
- determining a second quantity of computing resources or operating states of the software installation based on one or more of the following: static customer data, software performance data, and time series analysis of a quantity of computing resources or operating states of the customer;
- determining a third quantity of computing resources or operating states of the software installation based on the first quantity of computing resources or operating states and the second quantity of computing resources or operating states; and
- causing the software installation to be executed based on adjusting a parameter or operating state of the software installation that has been adjusted according to the third quantity.

19. The non-transitory computer-readable medium of claim 18, wherein the operations further comprise:
- determining to adjust the parameter of the software installation based on a majority of the first quantity of computing resources, the second quantity of computing resources, and the third quantity of computing resources being larger than a current quantity of computing resources.

20. The non-transitory computer-readable medium of claim 19,
wherein the operations further comprise:
- determining, as voting indicators, which of the first quantity of computing resources, the second quantity of computing resources, are larger than the current quantity of computing resources,
wherein the determining of the third quantity of computing resources or operating states comprises selecting a quantity of computing resources from among the voting indicators.

\* \* \* \* \*